(12) United States Patent
Yasutomo

(10) Patent No.: US 9,868,248 B2
(45) Date of Patent: Jan. 16, 2018

(54) STRETCHED FILM AND METHOD FOR PRODUCING THE SAME

(75) Inventor: Norikazu Yasutomo, Otsu (JP)

(73) Assignee: KANEKA CORPORATION, Osaka-shi, Osaka (JP)

( * ) Notice: Subject to any disclaimer, the term of this patent is extended or adjusted under 35 U.S.C. 154(b) by 442 days.

(21) Appl. No.: 13/880,536

(22) PCT Filed: Nov. 16, 2011

(86) PCT No.: PCT/JP2011/076412
§ 371 (c)(1),
(2), (4) Date: Apr. 19, 2013

(87) PCT Pub. No.: WO2012/070451
PCT Pub. Date: May 31, 2012

(65) Prior Publication Data
US 2013/0231455 A1    Sep. 5, 2013

(30) Foreign Application Priority Data

Nov. 26, 2010 (JP) ................................ 2010-264213

(51) Int. Cl.
*B29C 55/02* (2006.01)
*B29C 55/04* (2006.01)

(52) U.S. Cl.
CPC ............ *B29C 55/02* (2013.01); *B29C 55/045* (2013.01); *B29K 2995/0018* (2013.01)

(58) Field of Classification Search
CPC ............ B29C 47/0057; B29C 47/0021; B29C 55/045

(Continued)

(56) References Cited

U.S. PATENT DOCUMENTS 4,483,814 A * 11/1984 Krajec ................... B29C 61/02
264/230
4,835,245 A *  5/1989 Takasa .................. B29C 55/005
264/210.7

(Continued)

FOREIGN PATENT DOCUMENTS

JP          8-108467 A     4/1996
JP       2002-86554 A     3/2002

(Continued)

OTHER PUBLICATIONS

English Translation of International Preliminary Report on Patentability dated Jun. 20, 2013.

*Primary Examiner* — Nahida Sultana
(74) *Attorney, Agent, or Firm* — Sughrue Mion, PLLC

(57) ABSTRACT

A method for producing a stretched film comprising a first step of stretching a long film by increasing a holding distance in the width direction and a second step of shrinking by decreasing the holding distance in the width direction. One side edge of the long film has a traveling direction with at least three bending travels, while the other side edge has a traveling direction with at least two bending travels. The first step or the second step performs the bending travel at one or both of the side edges. The first step or the second step has a traveling trajectory in which the both side edges of the long film travel to the same side. The method achieves suppression of wrinkles formed on the stretched film, limitation of biaxiality of the stretched film, and provides a stretched film having optical properties suitably usable as a retardation plate.

35 Claims, 22 Drawing Sheets

(58) Field of Classification Search
USPC ........ 264/210.1, 291, 1.6, 2.7, 210.7, 288.4, 264/288.8, 290.2; 425/66
See application file for complete search history.

(56) References Cited

U.S. PATENT DOCUMENTS

| | | | | |
|---|---|---|---|---|
| 4,946,930 A * | 8/1990 | Takasa | ................. | B29C 55/005 264/210.7 |
| 4,963,428 A * | 10/1990 | Harvey | ................. | B29C 47/14 156/244.14 |
| 5,156,789 A * | 10/1992 | Amaral | ................. | B32B 27/08 264/160 |
| 6,746,633 B2 * | 6/2004 | Sakamaki | ............ | B29C 55/045 264/1.34 |
| 7,939,002 B2 * | 5/2011 | Inagaki | ................. | B29C 41/28 264/210.1 |
| 8,097,200 B2 * | 1/2012 | Asada | ................. | B29C 55/045 264/1.34 |
| 2006/0115610 A1 * | 6/2006 | Nagashima | ............ | B29C 55/08 428/1.3 |
| 2006/0145387 A1 * | 7/2006 | Seth | ................. | A44B 18/0053 264/145 |
| 2007/0096366 A1 * | 5/2007 | Schneider | ............ | B29C 51/24 264/284 |
| 2007/0134446 A1 * | 6/2007 | Inagaki | ................. | B29C 41/28 428/1.31 |
| 2007/0138698 A1 * | 6/2007 | Gerndt | ............ | A61F 13/15707 264/287 |
| 2007/0275183 A1 * | 11/2007 | Hashimoto | ............. | B29C 55/06 428/1.2 |
| 2008/0088060 A1 * | 4/2008 | Ito | ............... | C08J 5/18 264/291 |
| 2008/0280072 A1 * | 11/2008 | Arai | ................. | B29C 41/26 428/1.33 |
| 2009/0130341 A1 * | 5/2009 | Asada | ................. | B29C 55/045 428/1.1 |
| 2010/0002170 A1 * | 1/2010 | Itadani | ................. | B29C 55/045 349/96 |
| 2011/0287224 A1 * | 11/2011 | Shirafuji | ................ | B29C 55/08 428/156 |
| 2015/0048549 A1 * | 2/2015 | Inagaki | ................. | B29C 55/12 264/291 |
| 2015/0076734 A1 * | 3/2015 | Hatakeyama | ........ | G02B 5/3033 264/288.4 |
| 2016/0130415 A1 * | 5/2016 | Miyasaka | ................. | C08J 5/18 428/355 N |

FOREIGN PATENT DOCUMENTS

| | | |
|---|---|---|
| JP | 2004-20827 A | 1/2004 |
| JP | 2005-262678 A | 9/2005 |
| JP | 2008-110573 A | 5/2008 |
| JP | 2009-78474 A | 4/2009 |
| JP | 2009-119774 A | 6/2009 |
| JP | 2011-235610 A | 11/2010 |
| WO | 2007/066538 A1 | 6/2007 |
| WO | 2007/111313 A1 | 10/2007 |
| WO | WO2009/041273 A1 * | 4/2009 ........... B29C 55/045 |

* cited by examiner

| PATTERN | EXPLANATORY VIEW | α 10 |
|---------|------------------|------|
| A-A |  | 163 degrees |
| A-B |  | 167 degrees |
| A-C |  | 170 degrees |

FIG. 15

| PATTERN | EXPLANATORY VIEW | α 10 |
|---|---|---|
| B-A | | 170 degrees |
| C-A | | 170 degrees |

STRETCHED FILM AND METHOD FOR PRODUCING THE SAME

CROSS REFERENCE TO RELATED APPLICATIONS

This application is a National Stage of International Application No. PCT/JP2011/076412, filed on Nov. 16, 2011, which claims priority from Japanese Patent Application No. 2010-264213, filed on Nov. 26, 2010, the contents of all of which are incorporated herein by reference in their entirety.

TECHNICAL FIELD

The present invention relates to a stretched film and a method for producing the same. The present invention relates particularly to a stretched film having a molecular orientation axis inclined with respect to one side of the film and being excellent in optical properties and to a method for producing said stretched film.

BACKGROUND ART

Recently, liquid crystal display devices represented by monitors (displays) for personal computers and television receivers are in widespread use as various display means. In these liquid crystal display devices, it is known that visibility of display is enhanced by technology such that a polarizer is arranged at each side of a liquid crystal cell and further a retardation film is provided between the liquid crystal cell and the polarizer.

Herein, a retardation film is formed in a rectangle shape to fit on a liquid crystal display device. Such a retardation film for use in the liquid crystal display device may be required to be molecularly oriented in an oblique direction relative to each side of the rectangle shape. This kind of film is generally produced by stretching or relaxation heat treating of a strip-shaped polymer film so as to be molecularly oriented in a desired direction. Such methods for producing a stretched film include a method disclosed in Patent Document 1 specified below.

In the invention disclosed in Patent Document 1, when a film (polymer film) is conveyed in a longitudinal direction while both side edges of the film are held, a distance between a starting point and a releasing point of holding of one side edge is made longer than a distance between a starting point and a releasing point of holding of the other side edge. By this arrangement, though holding positions of the both side edges are located at the same position in the longitudinal direction (conveying direction) at the beginning, a holding position of the one side edge lies behind a holding position of the other side edge in the conveying direction. Therefore, the holding position of the other side edge is pulled backward in the conveying direction, so that the film is stretched in an oblique direction.

Stretching or relaxation heat treatment of a polymer film may disadvantageously wrinkle the polymer film. Wrinkles of the polymer film may damage flatness of a retardation film to be formed, resulting in deterioration of quality. Hence, various methods have designated to stretch or carry out relaxation heat treatment on a polymer film with preventing or removing wrinkles formed on the polymer film. Such methods include, for example, a method disclosed in Patent Document 2 specified below.

The method disclosed in Patent Document 2 suppresses wrinkles of a stretched film by giving a tensile force on the film in a width direction and simultaneously providing a means to support the own weight of the film when the stretched film undergoes relaxation heat treatment.

There are the other known arts described in Patent Documents 3 and 4 as methods for producing a stretched film.

The invention disclosed in Patent Document 3 outwardly broadens both side edges of a stretched film when the stretched film is conveyed in a longitudinal direction with its both side edges held. By the invention disclosed in Patent Document 3, the both side edges of the stretched film are further moved inwardly.

The invention disclosed in Patent Document 4 curves overall a conveying path of a stretched film when the stretched film is conveyed in a longitudinal direction with its both side edges held.

PATENT DOCUMENT

Patent Document 1: JP 2002-86554 A
Patent Document 2: JP 8-108467 A
Patent Document 3: JP 2009-119774 A
Patent Document 4: JP 2005-262678 A

DISCLOSURE OF INVENTION

Technical Problem

However, the conventional methods for producing a film including the methods disclosed in Patent Documents 1 and 2 have sometimes failed to sufficiently suppress wrinkles formed in stretching of a polymer film. Even if wrinkles are suppressed or prevented, there is another problem that a produced stretched film has an extremely high biaxiality when being used as a retardation film. This problem lies in the fact that it is difficult to have an Nz coefficient within a range of 0.5 to 2.5. More specifically, the problem is that a following formula (1) required for a common retardation plate is not satisfied:

$$0.5 \leq (nx-nz)/(nx-ny) \leq 2.5 \tag{1},$$

when "nx" indicates a refractive index in an in-plane slow axis direction of a stretched film, "ny" indicates a refractive index in a direction perpendicular to in-plane slow axis thereof, and "nz" indicates a refractive index in a thickness direction.

In sum, the producing methods in the known arts have failed to achieve simultaneously suppression or prevention of wrinkles and reduction of biaxiality.

The methods disclosed in Patent Documents 1, 3, and 4 have a problem that a number of producing devices cannot be arranged in a factory because each producing device occupies large floor space. Besides, the methods for producing a stretched film disclosed in Patent Documents 3 and 4 each need a dedicated stretching machine because the methods cannot be conducted with a conventional tenter stretching machine. In other words, a new dedicated stretching machine must be introduced for producing a stretched film by the methods disclosed in Patent Documents 3 and 4, resulting in increased cost for introduction.

In view of the above-described problems of the known arts, the present invention aims at providing a method for producing a stretched film, the method being capable of suppressing wrinkles formed on the stretched film and keeping biaxiality within a desired range and being carried out with simple facilities.

Further, the present invention aims at providing a stretched film having optical properties suitably usable as a retardation plate.

Solution to Problem

An aspect of the present invention to solve the above-mentioned problems is a method for producing a stretched film, the method stretching a long film in a desired direction by moving both side edges in a width direction of the long film along respective constant trajectories with the film held at the both side edges in the width direction, the both side edges consisting of a pair of one side edge and the other side edge, wherein the method performs at least once each a first step of stretching the long film by increasing a holding distance in the width direction of the film and a second step of shrinking the long film having been stretched in the first step by decreasing the holding distance, the one side edge of the long film being designed to travel in a traveling direction with at least three bending travels, the other side edge thereof being designed to travel in a traveling direction with at least two bending travels, both the first step and the second step including performance of a bending travel at either one or both of the side edges, at least one of the first step and the second step including such a traveling trajectory that the both side edges of the long film travel as bending to either the right or the left of the traveling direction, and the traveling direction of the long film before the firstly performed-first step being substantially the same as that after the lastly performed-second step. Herein, the word "bending travel" means "traveling in a direction different from an immediately preceding traveling direction."

Preferably, the long film has a center line formed by connecting centers in the width direction of the long film, the center line of the long film in the first step bending to either one of the both side edges of the long film before the firstly-performed first step with respect to the center line of the long film before the firstly-performed first step, and the stretched film having undergone the first step and the second step having a width larger than a width of the long film before the firstly performed-first step.

Another aspect of the present invention is a method for producing a stretched film, the method stretching a long film in a desired direction by moving both side edges in a width direction of the long film along respective constant trajectories with the film held at the both side edges in the width direction, the both side edges consisting of a pair of one side edge and the other side edge, wherein the method performs at least once each a first step of stretching the long film by increasing a holding distance in the width direction of the film and a second step of shrinking the long film having been stretched at the first step by decreasing the holding distance, the one side edge of the long film being designed to travel in a traveling direction with at least three bending travels, the other side edge thereof being designed to travel in a traveling direction with at least two bending travels, both the first step and the second step including performance of a bending travel at either one or both of the side edges, at least one of the first step and the second step including such a traveling trajectory that the both side edges of the long film travel as bending to either the right or the left of the traveling direction, and wherein the long film has a center line formed by connecting centers in the width direction of the long film, the center line of the long film in the firstly-performed first step bending to either one of the both side edges of the immediately preceding long film with respect to the center line of the immediately preceding long film, the stretched film having undergone all the first steps and the second steps having a width larger than a width of the long film before the firstly-performed first step, the traveling direction of the long film immediately before the firstly-performed first step of all the first steps being substantially the same as that of the long film immediately after performing all the first steps and the second steps.

Herein, when the first step is performed several times, it is desired to determine the above-mentioned requirements based on the traveling direction of the long film immediately before the firstly-performed first step.

Similarly, when the second step is performed several times, it is desired to determine the above-mentioned requirements based on the traveling direction of the long film immediately after the lastly-performed second step.

Herein, "the center line formed by connecting the centers in the width direction of the long film" is also referred to simply as "the center line of the long film" ("the center line of the polymer film") or the like.

As well, "the side edge in the width direction of the long film" is also referred to simply as "the side edge of the long film."

In the description below, "the traveling direction of the long film immediately before the firstly-performed first step being substantially the same as that of the long film after performing the second step" denotes that an angle formed by a line parallel to the traveling direction of the long film immediately before the first step and a line parallel to the traveling direction of the long film after the second step is at 0 degree or more and 3 degrees or less. Specifically, the traveling direction of the long film after the second step faces in the same direction or a direction inclined at plus or minus 3 degrees with respect to the traveling direction of the long film immediately before the first step.

This aspect performs at least once each the first step of stretching the long film by increasing a holding distance in the width direction of the film and the second step of shrinking the long film having been stretched in the first step by decreasing the holding distance. The first step and/or the second step perform the bending travel, which is performed by making either one or both of the side edges in the width direction of the long film travel in a direction different from its immediately preceding traveling direction.

In this aspect, the one side edge of the long film is designed to travel with at least three bending travels, while the other side edge thereof is designed to travel with at least two bending travels.

Further, at least one of the first step and the second step includes such traveling trajectories that the both side edges of the long film travel as bending to the same direction and that the one side edge travels in parallel to the traveling direction of the long film immediately before the first step and the other side edge travels in a direction inclined with respect to the traveling direction of the long film immediately before the first step.

In this way, the bending travels of the both side edges of the long film perform stretching and shrinkage, thereby enlarging an inclination angle of an molecular orientation axis (hereinafter also referred to as simply an orientation axis) of the long film and a retardation value (hereinafter also referred to as a Re (retardation) or simply a Re) even when the long film has a short distance from a pull-out position to a take-up position.

Further, in this aspect, each of the stretching and the shrinkage is performed at least once so as to enlarge the inclination angle of the orientation axis of the long film and the Re (retardation). This aspect allows enlargement of the inclination angle of the orientation axis and the Re (retardation) without largely differentiating a traveling distance between the both side edges of the long film.

In this aspect, the traveling direction of the long film immediately before the firstly-performed first step of all the first steps and the second steps is substantially the same as that of the long film immediately after performing the first steps or the second steps. In this aspect, the long film is pulled out and taken up in substantially the same direction, so that a well-known tenter stretching machine capable of adjusting a width and a traveling direction can be used to conduct the producing method of this invention. It is not necessary to newly develop a stretching machine, thereby advantageously reducing an introduction cost.

It is desired that the center line of the long film in the second step bends to either one of the both side edges of the immediately preceding long film with respect to the center line of the immediately preceding long film.

More specifically, the second step performs shrinkage of the long film, thereby enlarging the inclination angle of the orientation axis. However, on the other hand, the shrinkage may reduce the Re (retardation). Hence, it is recommended that, in the second step, the shrinkage of the long film is performed with the center line of the long film changed in direction with respect to the center line of the long film in the immediately preceding traveling direction. That reduces a reduction ratio of the Re (retardation) compared with a case of the shrinkage of the long film performed while the long film travels in the same direction as the immediately preceding traveling direction. Herein, it is desired to heat the long film so as to shrink the film.

In the forgoing aspects, it is recommended that the center line of the long film in the second step bends with respect to at least one of the center line immediately before the firstly-performed first step and a line parallel to the latter center line, the center line of the long film in the first step bends to either one of the both side edges of the long film immediately before the firstly-performed first step, and the center line of the long film in the second step bends to the other of the both side edges of the long film immediately before the firstly-performed first step.

In this aspect, the traveling direction of the long film in the first step and the traveling direction of the long film in the second step each face in a direction intersecting with the traveling direction of the long film immediately before the first step. Specifically, when the traveling direction bends to the left (or the right) of the traveling direction immediately before the first step at a starting position of the first step, the traveling direction in the second step extends as bending to the right (or the left) of the traveling direction immediately before the first step.

Referring to FIG. 11, for example, under the assumption that a traveling direction 103b in the first step (an area B in FIG. 11) bends to the left (a direction approaching one side edge 101 in the width direction and upwardly in FIG. 11) of the immediately preceding traveling direction (in an area A in FIG. 11), the traveling direction in the second step (an area C in FIG. 11) bends to the right (a direction approaching the other side edge 102 in the width direction and downwardly in FIG. 11) of a line 105 parallel to a traveling direction 103a immediately before the first step (in the area A in FIG. 11).

In this aspect, the traveling direction when the long film is stretched includes a component of the traveling direction (a direction from a pull-out side to a take-up side and a direction shown by an arrow X in FIG. 11) of the long film f, the component being hereinafter referred to as a component of a traveling direction, and a component of a direction intersecting with the traveling direction of the long film f (a vertical direction in FIG. 11), the component being hereinafter referred to as the component of the intersecting direction. Additionally, the traveling direction when the long film is shrunk includes at least the component of the traveling direction of the long film f. Further, in a case where the traveling direction when the long film is shrunk includes the component of the intersecting direction, the component of the intersecting direction in stretching has a direction opposite to that of the component of the intersecting direction in shrinkage.

Such an arrangement produces a stretched film with less wrinkles and simultaneously with a greater inclination angle of an orientation axis and a larger Re (retardation) compared with a case where the traveling direction bends to the left (or the right) of the traveling direction at the starting position of the first step and the traveling direction in the second step bends to the left (or the right) of the traveling direction immediately before the first step or a case where the traveling direction in the first step or the second step faces in the same direction as the immediately preceding traveling direction.

It is further recommended that the method performs the bending travels three times at each of the both side edges of the long film, the bending travels at the one side edge having three starting points located respectively at the same position as or in the vicinity of those at the other side edge relative to a longitudinal direction of the long film.

By such a configuration, the traveling trajectory of the long film has roughly a configuration as shown in FIG. 11.

Specifically, the basic configuration of this aspect is as follows. In the first step, the one side edge in the width direction travels as bending, while the other side edge continues to straightly travel or travel as bending to the same side as that of the bending travel at the one side edge. In the second step, the one side edge travels as bending, while the other side edge continues to straightly travel or travels as bending. Under such a condition, three bending travels performed respectively at both of the side edges of the long film with starting positions of the bending travels at the both side edges respectively aligned stretch or shrink in the width direction of the long film, starting from a changing point where the center line of the long film is changed in direction. More specifically, as shown in FIG. 11, a center line 103 formed by connecting the centers in the width direction of the long film is changed in direction of inclination between at upstream and at downstream of a boundary 104, which is the starting position of the bending travel, in the traveling direction (between in the area A and in the area B and between in the area B and in the area C, for example). The traveling direction of the center line 103 at downstream in the traveling direction goes in an oblique direction relative to the traveling direction of the center line 103 at upstream in the traveling direction (in FIG. 11, for example, a direction shown by an arrow 103b relative to a direction shown by an arrow 103a or a direction shown by an arrow 103c relative to the direction shown by the arrow 103b).

In sum, when the first step or the second step is performed, the traveling direction of the center line 103 is changed in direction on the boundary 104, which is the starting position of the performance, and then, the long film is stretched or shrunk in the width direction. That reduces a reduction ratio of the Re (retardation) in the second step, thereby keeping the stretched film after the shrinkage from lowering the Re (retardation).

It is also recommended to perform a third step of longitudinal stretching of the long film in the traveling direction after the second step.

This aspect performs the third step of longitudinal stretching of the film in the traveling direction in addition to the first step and the second step. Such a configuration allows production of a stretched film without wrinkles even when the stretched film having a large inclination angle of the orientation axis is produced. Specifically, in order to enlarge an inclination angle of an orientation axis of a stretched film to be produced, it is necessary to increase shrinkage in the second step. However too much shrinkage in the second step might form wrinkles on the long film. Hence, performance of the third step of longitudinal stretching of the long film in the traveling direction suppresses wrinkles and simultaneously adjusts an inclination angle of an orientation axis of the long film. That gives the stretched film having a further inclined inclination angle of an orientation axis without wrinkles.

A specific aspect for embodying the above-mentioned aspect includes a method of performing the first step and the second step while holding the both side edges of the long film by a tenter stretching machine capable of adjusting its width, so as to orient the traveling direction of the long film in the same direction before and after all the first steps and the second steps.

This aspect is suitably embodied by performing the first step and the second step with the both side edges of the long film held by the tenter stretching machine capable of adjusting its width. Alternatively, it is also preferable to use a tenter stretching machine capable of changing a traveling direction.

The stretched film produced by each producing method has preferably an inclination angle of its orientation axis with respect to the width direction of the produced stretched film at more than 20 degrees and less than 70 degrees.

Further, the stretched film produced by each producing method preferably satisfies a following formula (1):

$$0.5 \leq (nx-nz)/(nx-ny) \leq 2.5 \quad (1),$$

when "nx" indicates a refractive index in an in-plane slow axis direction of a stretched film, "ny" indicates a refractive index in a direction perpendicular to in-plane slow axis thereof, and "nz indicates a refractive index in a thickness direction thereof.

This aspect produces a stretched film having an orientation axis largely inclined with respect to the width direction and being excellent in optical properties without wrinkles. That provides a high-quality stretched film.

The method for producing a stretched film of this aspect can be embodied by using a well-known tenter stretching machine.

As to the producing method, specific circumstances recommended in stretching the long film will be described below.

It is recommended that the center line of the long film in the first step and the center line of the long film in the second step form an angle at 170 degrees or less.

Herein, the center line of the long film in the first step and the center line of the long film in the second step desirably form an angle at 135 degrees or more. This angle at less than 135 degrees might form wrinkles on the produced stretched film. Thus, in order to suppress wrinkles formed on the stretched film, the angle is desirably 135 degrees or more, more desirably 150 degrees or more, and most desirably 160 degrees or more.

It is preferable that a method for producing a stretched film, when one of the methods for producing a stretched film is used to stretch a long film having an original width Wa so as to produce a stretched film having a final width Wb, the total of a first angle formed by a line parallel to the traveling direction of the long film immediately before the firstly-performed first step and the center line of the long film in the first step and a second angle formed by a line parallel to the traveling direction of the long film immediately before the firstly-performed first step and the center line of the long film in the second step is 1 degree or more larger than that when a reference stretching process specified below is used to produce a stretched film having the same stretching ratio and shrinkage ratio, wherein the reference stretching process includes:

(1) Both side edges in a width direction of a long film having an original width Wa travel in parallel, with the both side edges held;

(2) Subsequently to (1), one side edge continues to travel straight, while the other side edge travels obliquely and in a direction away from the one side edge as a first step;

(3) Subsequently to (2), the one side edge continues to travel straight, while the other side edge travels in a direction approaching the one side edge by changing the traveling direction of the other side edge as a second step; and (4) Subsequently to (3), the one side edge continues to travel straight, while the other side edge travels in parallel to the one side edge by changing the traveling direction when a width between the other side edge and the one side edge becomes a final width Wb.

Herein the above-mentioned processes (1) to (4) are performed in order of (1) to (4). This reference stretching process falls into a below-mentioned B-B pattern.

It is recommended that the long film has an angle formed by a line parallel to the traveling direction of the long film immediately before the firstly-performed first step and the center line of the long film in the first step larger than an angle formed by the line parallel to the traveling direction of the long film immediately before the firstly-performed first step and the center line of the long film in the second step.

It is desired that, when the traveling direction of the long film immediately before the firstly-performed first step is a basic direction, the first step includes a state in which the both side edges of the long film travel as bending to a same first side of the basic direction and the second step includes a state in which the both side edges of the long film travel as bending to a second side of the basic direction opposite to the first side in the first step.

Herein, "the same first side" means a direction having the component of the same intersecting direction, while "the second side opposite to the first side" means a direction having the component of the intersecting direction in opposition to the first side.

A pattern in which the both side edges of the long film travel in this trajectory is referred to as an A-A pattern.

The following is a definition of names of patterns.

A traveling trajectory in which the both side edges in the width direction of the long film travel in a direction having the component of the same intersecting direction is referred to as "A."

A traveling trajectory in which the one side edge in the width direction of the long film travels straightly and the other side edge travels in a direction approaching (or away from) the one side edge traveling straightly is referred to as "B."

A traveling trajectory in which the both side edges of the long film travel in respective directions having components of different intersecting directions is referred to as "C."

The traveling trajectory in the first step is expressed before a hyphen, while the traveling trajectory in the second step is expressed after the hyphen. With this definition, the above-mentioned pattern is identified as the A-A pattern as described above.

It is also possible to have such a traveling trajectory in which, when the traveling direction of the long film immediately before the firstly-performed first step is a basic direction, the first step includes a state in which the both side edges of the long film travel as bending to a same side of the basic direction and the second step includes a state in which the one side edge of the long film travels in parallel to the basic direction and the other side edge of the long film travels as bending toward the one side edge.

Herein, "the same side" means a direction having the component of the same intersecting direction.

With the above-mentioned definition, this traveling trajectory is identified as an A-B pattern.

In the A-B pattern, it is recommended that the long film has an angle formed by the center line of the long film in the first step and the center line of the long film in the second step at 167 degrees or less.

Herein, the lower limit of the angle formed by the center line of the long film in the first step and the center line of the long film in the second step is desirably 135 degrees or more, more desirably 150 degrees or more, and most desirably 160 degrees or more, similarly to the foregoing reason.

It is also possible to have such a traveling trajectory in which, when the traveling direction of the long film immediately before the firstly-performed first step is a basic direction, the first step includes a state in which the both side edges of the long film travel as bending to a same side of the basic direction and the second step includes a state in which the both side edges of the long film bend to sides different from each other with respect to the basic direction and travel to a direction approaching each other.

Herein, "the same side" means a direction having the component of the same intersecting direction.

With the above-mentioned definition, this traveling trajectory is identified as an A-C pattern.

In the A-C pattern, it is recommended that the long film has an angle formed by the center line of the long film in the first step and the center line of the long film in the second step at 170 degrees or less.

Herein, the lower limit of the angle formed by the center line of the long film in the first step and the center line of the long film in the second step is desirably 135 degrees or more, more desirably 150 degrees or more, and most desirably 160 degrees or more, similarly to the foregoing reason.

It is also possible to have such a traveling trajectory in which, when the traveling direction of the long film immediately before the firstly-performed first step is a basic direction, the first step includes a state in which the one side edge of the long film travels in parallel to the basic direction and the other side edge of the long film travels as bending in a direction away from the one side edge and the second step includes a state in which the both side edges of the long film travel as bending to a same side of the basic direction.

Herein, "the same side" means a direction having the component of the same intersecting direction.

With the above-mentioned definition, this traveling trajectory is identified as a B-A pattern.

In the B-A pattern, it is recommended that the long film has an angle formed by the center line of the long film in the first step and the center line of the long film in the second step at 167 degrees or less.

Herein, the lower limit of the angle formed by the center line of the long film in the first step and the center line of the long film in the second step is desirably 135 degrees or more, more desirably 150 degrees or more, and most desirably 160 degrees or more, similarly to the foregoing reason.

It is also possible to have such a traveling trajectory in which, when the traveling direction of the long film immediately before the firstly-performed first step is a basic direction, the first step includes a state in which the both side edges of the long film bend to sides different from each other with respect to the basic direction and travel to a direction away from each other and the second step includes a state in which the both side edges of the long film travel to a same side of the basic direction.

Herein, "the same side" means a direction having the component of the same intersecting direction, while "the sides different from each other" means directions having the components of the intersecting directions in opposition to each other.

With the above-mentioned definition, this traveling trajectory is identified as a C-A pattern.

In the C-A pattern, it is recommended that the long film has an angle formed by the center line of the long film in the first step and the center line of the long film in the second step at 170 degrees or less.

As described above, stretching of the long film with a condition of the angle of the center line aligned facilitates adjustment of a refractive index nx, a refractive index ny, and a refractive index nz, so as to easily adjust the Nz coefficient within a desired range. Further, production equipment is downsized and simultaneously the inclination angle of the orientation axis and the Re (retardation) are enlarged.

The second step is desirably performed immediately after the first step.

It is also possible to include a step of parallel travel after the first step, wherein the step of parallel travel makes the both side edges of the long film travel in parallel to the traveling direction of the long film immediately before the firstly-performed first step, and the second step being performed after the step of parallel travel.

The both side edges of the long film may start the bending travels in the first step at the same position relative to the traveling direction of the long film.

In the first step, the one side edge of the long film may start the bending travel at a position different from that of the bending travel at the other side edge relative to the traveling direction of the long film.

This restriction relates to the "starting position of the bending travel at the side edge" relative to the "traveling direction of the long film" and a position obviously based on the "traveling direction of the long film." Therefore, it does not necessarily correspond to the above-mentioned restriction based on the "longitudinal direction of the long film."

Specifically, when the both side edges of the long film travel in parallel, a position in the "traveling direction of the long film" corresponds to a position in the "longitudinal direction of the long film." However, when the both side edges of the long film are increased or decreased in width therebetween, the film is obliquely deformed, so that a position in the "traveling direction of the long film" and a position in the "longitudinal direction of the long film" do not correspond to each other.

The both side edges of the long film may start the bending travels at the same position relative to the traveling direction of the long film when the method shifts from the first step to the second step.

Herein, the "positions at which the both side edges of the long film start the bending travels" are positions where the respective side edges start to travel in directions different from the immediately preceding traveling direction.

Advantageous Effect of Invention

The method for producing a stretched film of the present invention enlarges at least one of an inclination angle of an orientation axis and an Re (retardation) without having a great difference of traveling distances between the both side edges in the width direction of the long film, thereby having an advantageous effect to set up production equipment even in a small space. Further, the method for producing a stretched film of the present invention facilitates adjustment of a refractive index nx, a refractive index ny, and a refractive index nz, thereby facilitating adjustment of an Nz coefficient within a desired range.

BRIEF DESCRIPTION OF DRAWINGS

FIG. 15 is an explanatory view summarizing results of Example 5 by pattern;

BEST MODE FOR CARRYING OUT THE INVENTION

Now, embodiments of the present invention will be described in detail below, but the present invention is not limited thereto.

In this invention, there is no specific limitation on a raw resin for a polymer film (thermoplastic resin film) for producing a stretched film. A film made of thermoplastic resin can be selected accordingly and appropriately for any purpose. Specific examples include cellulose acetate, polyester, polysulfone, polyethersulfone, polystyrene, polyvinyl alcohol, polyvinyl chloride, polymethylmethacrylate, polyarylate, and polyamide. More preferably, polycarbonate and cyclic olefin-based resin can be used.

A method for producing a stretched film of a first embodiment of this invention conducts the above-mentioned A-A pattern. Each figure following FIG. 1 overestimates the true size of bending angle when a polymer film f travels as bending (hereinafter also referred to as "bending travel") for ease of explanation.

Figure 12:
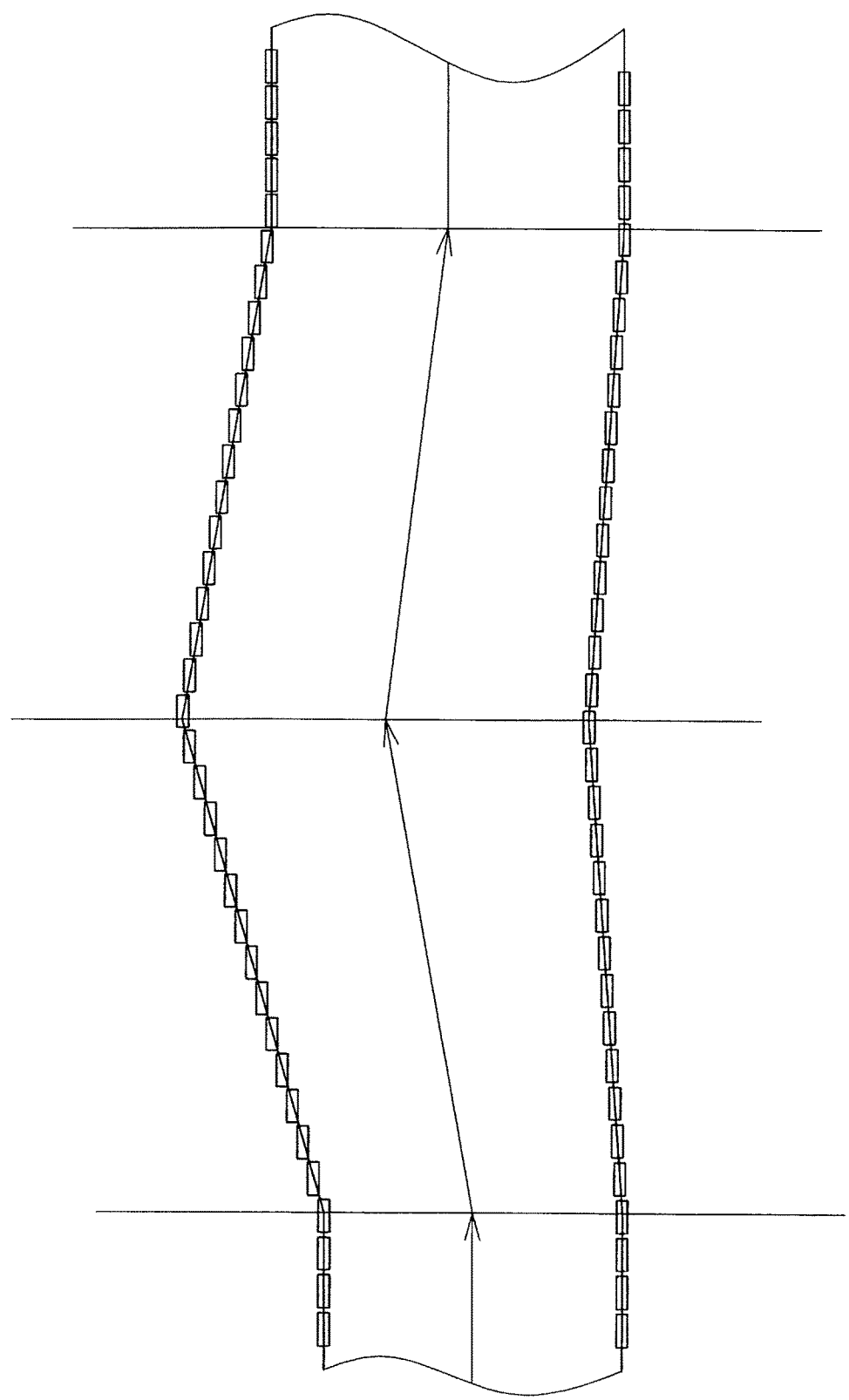
FIG. 12 is a conceptual diagram showing a traveling direction of a film in the film stretching machine, the traveling direction being closer to one actually performed.

The actual A-A pattern, as shown in FIG. 12, has gentler inclination angles at edges in traveling of a long film.

The method for producing a stretched film of the first embodiment of this invention is conducted by conveying a long polymer film f basically continuously fed with the film f pinched (held) and by performing continuously a transverse stretching and a transverse shrinkage in order from upstream of a conveying direction while the polymer film f is conveyed.

In the first embodiment of this invention, an example of producing a stretched film using a tenter stretching machine 1 in FIG. 1 will be described below. However, naturally, it is not indispensable to use the tenter stretching machine 1 in FIG. 1 in this invention.

The tenter stretching machine 1 is a well-known stretching machine and includes at least pinching members 6, a supply roller 8, a take-up roller 9, and rails 10. The polymer film f attached to the supply roller 8 is pulled out, conveyed (traveled) toward the take-up roller 9 with both side edges of the polymer film f pinched by the pinching members 6, released at an appropriate position (immediately after passing through a heating furnace 11 mentioned below, for example), and then taken up by the take-up roller 9.

The tenter stretching machine 1 is adjustable in width.

The pinching members 6 run on the rails 10 integrally with chains not shown with pinching the both side edges in the width direction of the polymer film f pulled out from the supply roller 8. The rails 10 consist of a pair of a rail 10*a* and a rail 10*b*, on which the respective pinching members 6 run at substantially the same speed. This can be said also to other embodiments described below.

In this embodiment, one side edge of the polymer film f is pinched by the pinching member 6 of the rail 10*a*, while the other side edge pairing with the one side edge is pinched by the pinching member 6 of the rail 10*b*. In this specification, the one side edge and the other side edge are relative, so that whichever side edge in the width direction can be the one side edge.

The rail 10*a* at the one side edge has a path, where the pinching member 6 pinching the one side edge runs, traveling as changing its traveling direction at three points P1, P2, and P3, while the rail 10*b* at the other side edge has a path, where the pinching member 6 pinching the other side edge runs, traveling as changing its traveling direction at three points P4, P5, and P6. At this time, the three points P1, P2, and P3, where the traveling direction at the one side edge is changed, and the three points P4, P5, and P6, where the traveling direction of the other side edge is changed, are located at substantially the same positions respectively relative to a direction from the supply roller 8 toward the take-up roller 9 (in a direction indicated by an arrow X in FIG. 1 and hereinafter referred to as a basic traveling direction). Specifically, the first point P1 located at most upstream among the three points P1, P2, and P3 at the one side edge and the first point P4 located at most upstream among the three points P4, P5, and P6 at the other side edge are located at substantially the same position relative to the basic traveling direction. Similarly, the second points P2 and P3 and the third points P5 and P6 are located at substantially the same positions relative to the basic traveling direction, respectively.

Additionally, the path of the rail 10*a* at the one side edge extends along the path of the rail 10*b* at the other side edge. That means, the traveling direction of the path of the rails 10*a* at the one side edge bends at the three points P1, P2, and P3 in substantially the same direction as the traveling direction of the path of the rail 10*b* at the other side edge bends at the three points P4, P5, and P6, respectively.

In this embodiment, based on a "longitudinal direction of the long film," the three points P1, P2, and P3 at the one side edge and the three points P4, P5, and P6 at the other side edge where the traveling direction is changed are located at the same or substantially the same position.

Here is described in detail about the "longitudinal direction of the long film" as a basis. In an area A (area from a starting point of travel to a line segment formed by connecting the points P1 and P4), the "longitudinal direction of the long film" is the same as the basic traveling direction. In an area B (area from the line segment formed by connecting the points P1 and P4 to a line segment formed by connecting the points P2 and P5), the "longitudinal direction of the long film" is inclined to the one side (toward the rail 10*a* in FIG. 1) in the width direction with respect to the basic traveling direction. In an area C (area from the line segment formed by connecting the points P2 and P5 to a line segment formed by connecting the points P3 and P6), the "longitudinal direction of the long film" is inclined to the other side (toward the rail 10*b* in FIG. 1) in the width direction with respect to the basic traveling direction. In an area D (area from the line segment formed by connecting the points P3 and P6 to an end point of travel), the "longitudinal direction of the long film" is the same as the basic traveling direction.

In short, the "longitudinal direction of the long film" is the same as the basic traveling direction in the areas A and D, while the "longitudinal direction of the long film" is different from the basic traveling direction in the areas B and C.

Consequently, the points P1 and P4 at a distal end in the area A are located at the same position relative to the "longitudinal direction of the long film." In contrast, the "longitudinal direction of the long film" in the area B is inclined with respect to the basic traveling direction and the points P2 and P5 at a distal end in the area B are located at different positions relative to the "longitudinal direction of the long film" because a length from the point P1 to the point P2 is different from that from the point P4 to the point P5. More specifically, in the "longitudinal direction of the long film" (in an obliquely upward direction in FIG. 1), the point P5 is located behind the point P2 (near a proximal end of an arrow M2). Similarly, the "longitudinal direction of the long film" in the area C is inclined with respect to the basic traveling direction and the points P3 and P6 at a distal end in the area C are located at different positions relative to the "longitudinal direction of the long film" because a length from the point P2 to the point P3 is different from that from the point P5 to the point P6. More specifically, in the "longitudinal direction of the long film" (in an obliquely downward direction in FIG. 1), the point P3 is located behind the point P6 (near a proximal end of an arrow M3).

As described above, based on the "longitudinal direction of the long film," the three points P1, P2, and P3 at the one side edge and the three points P4, P5, and P6 at the other side edge where the traveling direction is changed are positioned such that a pair of the points P1 and P4 is located at the same position and a pair of the points P2 and P5 and a pair of the points P3 and P6 each are located at different positions with slightly displaced, respectively relative to the "longitudinal direction of the long film." In other words, the pairs of the points P2 and P5 and the point P3 and P6 each are located at substantially the same position relative to the "longitudinal direction of the long film."

The same can be said also to the other embodiments described below.

Here is described about an angle α (alpha) 1 between two line segments at the one side edge (near the rail 10*a*), the line segments consisting of a line segment formed by connecting the first point P1 and the second point P2 and a line segment formed by connecting the second point P2 and the third point P3. The angle α (alpha) 1 is smaller than an angle α (alpha) 2 between two line segments at the other side edge (near the rail 10*b*), the line segments consisting of a line segment formed by connecting the first point P4 and the second point P5 and a line segment formed by connecting the second point P5 and the third point P6.

Thus, the path of the rail 10*a* at the one side edge is slightly longer than that of the rail 10*b* at the other side edge and slightly detours.

Figure 1:
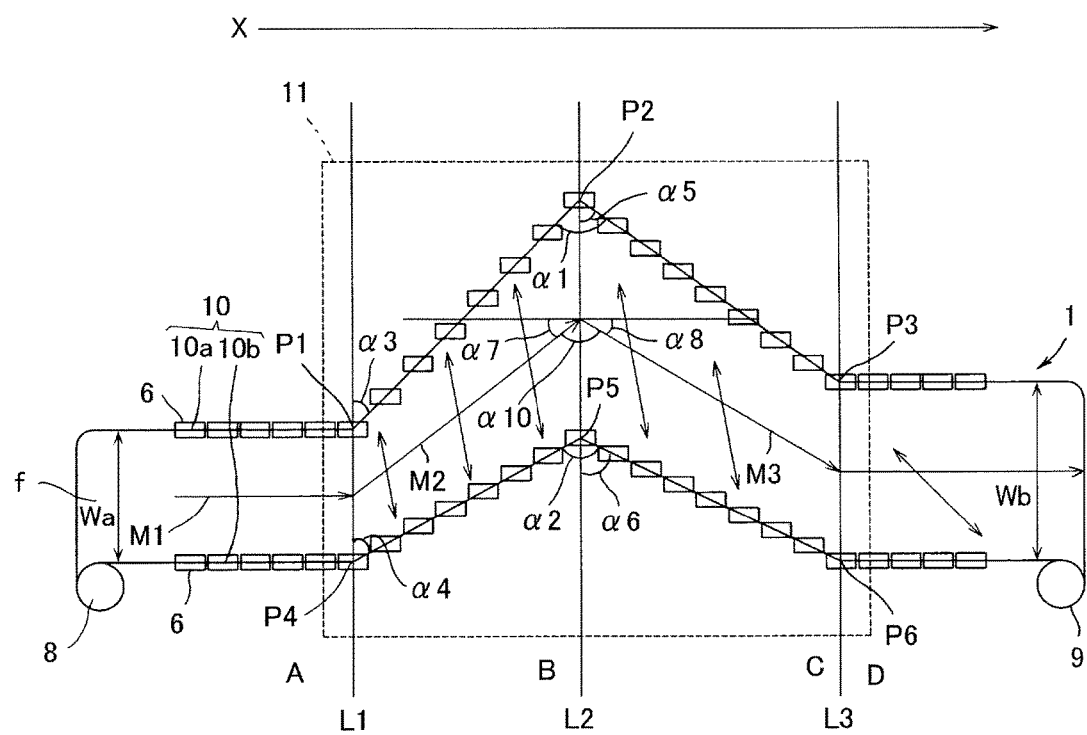
FIG. 1 is a plan view of an example of a film stretching machine usable in a first embodiment of the present invention.

The tenter stretching machine 1 is, as shown in FIG. 1, divided into the four continuous areas A, B, C, and D from the supply roller 8 to the take-up roller 9. The areas have the width between the rails 10 and the traveling direction of the polymer film f different from among others.

In the area A, the rails 10*a* and 10*b* extend along the basic traveling direction and have an equal width therebetween. In this embodiment, the area A is situated before a first step performed firstly. The area A near the boundary with the area B is situated just before performance of the first step.

The area A is situated just before the first step and has a center line of the polymer film f in a direction shown by an arrow M1. In the area A, the center line of the polymer film f is the same direction as the traveling direction of the polymer film f (a direction from a supply side to a take-up side and shown by the arrow X). In the area B, the polymer film f is held at a gradually increased width, so as to be stretched.

In the area B, the rails 10*a* and 10*b* each extend in a direction oblique to the arrow X, which is the traveling direction (the basic traveling direction) in the area A. More specifically, the traveling directions of the rails 10*a* and 10*b* in the area B extend as bending to the left of those of the rails 10*a* and 10*b* in the area A (toward the rail 10*a* in the width direction of the polymer film f and upwardly in FIG. 1). In sum, in this embodiment, the both side edges in the width direction of the long film travel as bending in the same direction in the first step.

At this time, the rail 10*a* at the one side edge bends more steeply than the rail 10*b* at the other side edge. Specifically, a smaller angle α (alpha) 3 (in the area B) among angles formed by a boundary L1 between the area A and the area B and the rail 10*a* is smaller than a smaller angle α (alpha) 4 (in the area B) among angles formed by the boundary L1 between the area A and the area B and the rail 10*b*. Hence, in the area B, a width between the rails 10*a* and 10*b* is increased toward downstream.

Herein, when the rails 10*a* and 10*b* are bent in the area B with respect to the traveling direction in the area A, the respective bending angles of the rails 10*a* and 10*b* are determined based on a predetermined standard. Specifically, the bending angles are altered based on an angle α (alpha) 7 formed by the center line (the arrow M2 in FIG. 1 and hereinafter referred to as an area B center line) connecting the centers in the width direction of the polymer film f traveling in the area B and a line (referred to as an area A center line) parallel to the basic traveling direction, the angle α (alpha) 7 being an inclination angle of the center line in the width direction of the polymer film f and referred to as an area B center line inclination angle. The area B center line inclination angle α (alpha) 7 is altered in accordance with an inclination angle (45 degrees, for example) of a molecular orientation axis of a target stretched film and an area C center line inclination angle α (alpha) 8 (see FIG. 1) describe below. The rails 10*a* and 10*b* are bent with respect to the traveling direction in the area A so that the area B center line inclination angle α (alpha) 7 becomes a desired angle. In this embodiment, the area B near the boundary with the area C is situated just before performance of a second step.

In the area C, the rails 10*a* and 10*b* each extend in a direction oblique to the basic traveling direction. More specifically, the traveling directions of the rails 10*a* and 10*b* in the area C extend as bending to the right of those of the rails 10*a* and 10*b* in the area A (toward the rail 10*b* in the width direction of the polymer film f and downwardly in FIG. 1). In other words, the traveling directions of the rails 10*a* and 10*b* in the area C respectively have components of a direction intersecting with the basic traveling direction (a direction intersecting with a direction shown by the arrow X in FIG. 1 and also a vertical direction in FIG. 1, and hereinafter referred to as an intersecting direction) opposite to the traveling directions of the rails 10*a* and 10*b* in the area B. In this embodiment, in the second step, the both side edges in the width direction of the long film travel as bending in a direction opposite to that in the first step.

At this time, the rail 10*a* at the one side edge bends more steeply than the rail 10*b* at the other side edge. Specifically, a smaller angle α (alpha) 5 among angles formed by a boundary L2 between the area B and the area C and the rail 10*a* located in the area C is smaller than a smaller angle α (alpha) 6 among angles formed by the boundary L2 between the area B and the area C and the rail 10*b* located in the area C. Hence, in the area C, a width between the rails 10*a* and 10*b* is gradually reduced toward downstream. In sum, in the area C, the polymer film f is held at a gradually reduced width, so as to be stretched.

Also herein, when the rails 10*a* and 10*b* are bent with respect to the traveling direction in the area B, the respective bending angles of the rails 10*a* and 10*b* are determined based on a predetermined standard. Specifically, the bending angles are altered based on the angle α (alpha) 8 formed by the center line (the arrow M3 in FIG. 1 and hereinafter referred to as an area C center line) connecting the centers in the width direction of the polymer film f traveling in the area C and the line parallel to the basic traveling direction, the angle α (alpha) 8 being an inclination angle of the center line in the width direction of the polymer film f and referred to as an area C center line inclination angle. The area C center line inclination angle α (alpha) 8 is altered in accordance with an inclination angle (45 degrees, for example) of a molecular orientation axis of a target stretched film and the area B center line inclination angle α (alpha) 7 described above. In other words, the area B center line inclination angle α (alpha) 7 and the area C center line inclination angle α (alpha) 8 are set in accordance with the inclination angle (45 degrees, for example) of the molecular orientation axis of the target stretched film. The rails 10*a* and 10*b* are bent with respect to the traveling direction in the area B so that the angle α (alpha) 8 becomes a desired angle.

At the end, in the area D, the rails 10*a* and 10*b* extend along the basic traveling direction and have an equal width therebetween. At this time, the rails 10*a* and 10*b* have the width larger than the rails 10*a* and 10*b* in the area A. In this embodiment, the area D is situated after the second step lastly performed.

In terms of the area B and the area C, the rails 10*a* and 10*b* each contiguously describe an angle trajectory with a center at the boundary L2 between the area B and the area C. In other words, the area B center line M2 becomes continuous with the area C center line M3 as bending at the boundary L2. The traveling directions of the area B center line M2 and the area C center line M3 are in a direction from upstream to downstream (a direction shown by the arrows M2 and M3 in FIG. 1) and have components of the intersecting direction opposite to each other. Specifically, the area B center line M2 and the area C center line M3 each have components of the basic traveling direction and of the intersecting direction, and while the area B center line M2 has a component of one of the intersecting directions, the area C center line M3 has a component of the other of the intersecting directions.

In terms of the pinching members 6 running on the rails 10*a* and 10*b*, the pinching members 6 run at the same speed in the area A since the rails 10*a* and 10*b* extend in parallel, so that the pinching members 6 running on the rails 10*a* and 10*b* are located at the same position relative to the basic traveling direction. In contrast, the rails 10*a* and 10*b* extend as bending at different angles with respect to the basic traveling direction in the area B. Hence, in the area B, the pinching members 6 running on the rails 10*a* and 10*b* are located at different positions relative to the basic traveling direction. In other words, one of the pinching members 6 running on one of the rails (the rail 10*a* in this embodiment) is located behind the other of the pinching members 6 running on the other rail (the rail 10*b* in this embodiment) relative to the basic traveling direction. That stretches the polymer film f in an oblique direction, thereby forming an inclination angle to the molecular orientation axis of the polymer film f.

Similarly, in the area C, the rails 10*a* and 10*b* extend as bending at different angles with respect to the basic traveling direction. Hence, also in the area C, the pinching members 6 running on the rails 10*a* and 10*b* are located at different positions relative to the basic traveling direction. That shrinks the polymer film f in the width direction.

These can be also said to the other embodiments described below.

The tenter stretching machine 1 is provided with a heating furnace 11, so that the polymer film f is heated by hot air. The heating furnace 11 is placed over the area B and the area C, and more specifically, so as to heat from a vicinity of a downstream end in the area A to a vicinity of an upstream end in the area D.

Next, an example of producing a stretched film using the above-mentioned tenter stretching machine 1 will be described below.

First, a long polymer film f is attached to the supply roller 8, to form in a roll. Then, the polymer film f travels in the area A toward the take-up roller 9, or along the basic traveling direction using a conveyor such as a roller not shown.

As traveling toward the take-up roller 9 for a certain distance, the polymer film f is pinched by the pinching members 6 at its both side edges in the width direction and continues to travel toward the take-up roller 9.

Then, as the polymer film f enters the area B, the heating furnace 11 starts to heat the polymer film f. The pinching members 6 pinching the both side edges of the polymer film f each start to travel obliquely to the left of the immediately preceding traveling direction (to the side near the rail 10*a* in the width direction of the polymer film f and upwardly in FIG. 1). That applies a force to orient toward the left of the immediately preceding traveling directions (force to head from the rail 10*b* to the rail 10*a*) on the both side edges in the width direction of the polymer film f, thereby forming a gentle inclination angle to the orientation axis of the polymer film f. Specifically, the orientation axis of the polymer film f is inclined with respect to the width direction at an angle (five degrees or more and less than 15 degrees, for example) gentler than a target inclination angle (45 degrees, for example) of the orientation axis.

Then, the heating furnace 11 heats the polymer film f, and simultaneously, the pinching members 6 pinching the both side edges of the polymer film f each run in the area B in an oblique direction relative to the traveling direction in the area A. At this time, running directions of one of the pinching members 6 pinching the one side edge and the other of those pinching the other side edge are inclined to a direction having the components of the same intersecting directions with respect to the traveling direction in the area A, but at different inclination angles.

Therefore, a width between the pinching members 6 positioned at the both side edges in the width direction of the polymer film f is increased toward downstream in the area B. Further, the increased width between the pinching members 6 increases a stretch ratio of the polymer film f, thereby increasing a Re (retardation).

Furthermore, when the polymer film f enters the area C, the heating furnace 11 heats the polymer film f, thereby bringing thermal shrinkage to the film f. Then, the pinching members 6 pinching the both side edges of the polymer film f each travel obliquely to the right of the immediately preceding traveling direction (or the basic traveling direction) (to the side near the rail 10*b* in the width direction of the polymer film f and downwardly in FIG. 1). More specifically, the pinching members 6 pinching the both side edges of the polymer film f each run in the area C in an oblique direction relative to the traveling direction in the area A. At this time, running directions of one of the pinching members 6 pinching the one side edge and the other of those pinching the other side edge are inclined to a direction having the same components of the intersecting direction with respect to the traveling direction in the area A, but at different inclination angles. Additionally, the component of the intersecting direction relative to the traveling direction in the area C lies in a direction opposite to the component of the intersecting direction relative to the traveling direction in the area B. Thereby, the polymer film f is shrunk in the width direction, so as to have an increased inclination angle of the orientation axis due to shrinkage. Herein, the shrinkage of the polymer film f may reduce a Re (retardation). However, in this embodiment, since obliquely traveling before thermal shrinkage, the polymer film f is shrunk after a shrinkage direction is inclined, which reduces the reduction of the Re (retardation).

As described above, in this embodiment, the traveling direction in the area B bends to the left of the traveling direction in the area A, while the traveling direction in the area C bends to the right of that.

When the polymer film f enters the area D, the pinching members 6 pinching the both side edges of the polymer film f each start to run along the basic traveling direction. The polymer film f travels toward the take-up roller 9 with no change in width and is taken up by the take-up roller 9. Every process to incline the orientation axis of the polymer film f ends with that, which finishes production of the stretched film. The taken-up stretched film is sent to a next process (such as a cutout process, for example).

In the above-mentioned embodiment, the area B center line M2 and the area C center line M3 have the components of the basic traveling direction and of the intersecting direction. The area B center line M2 has the component toward one of the intersecting directions, whereas the area C center line M3 has the component toward the other of the intersecting directions. However, the embodiments of the method for stretching a film of the present invention are not limited thereto. The area C center line M3 may have only the component of the basic traveling direction.

Next, a second embodiment of the present invention will be described in detail below. A method for producing a stretched film of the second embodiment of this invention further has a process to longitudinally stretch the polymer film f after the stretching and the thermal shrinkage of the polymer film f having been performed in the above-mentioned first embodiment. The first embodiment increases the Re (retardation) by the stretching in the area B in the first step and increases the inclination angle of the molecular orientation axis by the shrinkage in the area C in the second step. In contrast, the second embodiment performs a process to longitudinally stretch the polymer film f in a third step in addition to the first step and the second step. The second embodiment suppresses wrinkles and adjusts the inclination angle of the molecular orientation axis in the third step. In sum, the inclination angle of the orientation axis is adjusted in the second step in the first embodiment, whereas that is adjusted in the second step and the third step in the second embodiment.

As to the second embodiment of this invention, an example of producing a stretched film using a tenter stretching machine 1 and a longitudinal stretching machine 3 in FIG. 2 will be described in detail below. However, naturally, it is not indispensable to use the tenter stretching machine 1 and the longitudinal stretching machine 3 in FIG. 2 in the present invention.

The tenter stretching machine 1 used in the second embodiment may employ the same one as the tenter stretching machine 1 used in the first embodiment.

The longitudinal stretching machine 3 includes at least a supply roller 14, a take-up roller 15, an upstream stretching roller 16 consisting of a pair of rollers, and a downstream stretching roller 17 consisting of a pair of rollers. The polymer film f attached to the supply roller 14 is pulled out, travels toward the take-up roller 15, and is taken up by the take-up roller 15. The upstream stretching roller 16 and the downstream stretching roller 17 are arranged between the supply roller 16 and the take-up roller 15. The upstream stretching roller 16 and the downstream stretching roller 17 rotate with sandwiching the polymer film f from both sides of its thickness direction and rotate at different peripheral speeds.

Further, the longitudinal stretching machine 3 is provided with a heating furnace 18, whereby the polymer film f is heated by hot air. The heating furnace 18 is arranged between the upstream stretching roller 16 and the downstream stretching roller 17.

Now, the example of producing a stretched film using the tenter stretching machine 1 and the longitudinal stretching machine 3 will be described in detail below. The following description illustrates a case where the third step is performed alone, but it is possible to perform the third step following the first step and the second step.

First, the tenter stretching machine 1 stretches the polymer film f, thereby producing a temporary stretched film. A method of stretching the polymer film 1 by the tenter stretching machine 1 is the same as that of the first embodiment described above, and thus an explanation thereof is omitted.

Herein, the temporary stretched film means that the polymer film f having undergone the first step and the second step and before performance of the third step in the method for producing a stretched film in which the first step, the second step, and the third step are sequentially performed.

Then, the polymer film f (temporary stretched film) having been stretched by the tenter stretching machine 1 (having been taken up by the take-up roller 9) is attached to the supply roller 14 of the longitudinal stretching machine 3 and travels toward the take-up roller 15. Meanwhile, the polymer film f is sandwiched by the upstream stretching roller 16 and the downstream stretching roller 17 respectively at upstream and downstream in the traveling direction (a direction from the supply roller 14 to the take-up roller 15, the longitudinal direction of the polymer film f, and a direction shown by an arrow X in FIG. 2). The polymer film f is heated by the heating furnace 18 between the upstream stretching roller 16 and the downstream stretching roller 17 and simultaneously stretched in the traveling direction due to a difference in peripheral speed of the upstream stretching roller 16 and the downstream stretching roller 17.

Then, the polymer film f having been stretched in the traveling direction (i.e., longitudinally stretched) travels toward the take-up roller 15 and is taken up by the take-up roller 15. Every process to incline the molecular orientation axis of the polymer film f and to increase the Re (retardation) ends with that, which finishes production of the stretched film. The taken-up stretched film (the polymer film f) is sent to a next process (such as a cutout process, for example).

Herein, the method of the first embodiment and the method of the second embodiment for inclining the molecular orientation axis of the polymer film f at the same angle are brought under review below. As described above, the first embodiment adjusts the inclination angle of the molecular orientation axis of the polymer film f by the thermal shrinkage in the second step. By this method, the increased shrinkage in the second step is required to increase the inclination angle. However, too much increased shrinkage in the second step may form wrinkles on the polymer film f.

In contrast, the second embodiment adjusts the inclination angle of the orientation axis in the second step and the third step. Specifically, in the second embodiment, the inclination angle of the molecular orientation axis of the polymer film f is increased by the shrinkage in the second step and the stretching by the longitudinal stretching machine 3 in the third step. That makes the inclination angle of the molecular orientation axis of the polymer film f be gentler than the target inclination angle at the moment when the stretching and the shrinkage have finished by the tenter stretching machine 1 in the second embodiment (when the first step and the second step have finished). Thereafter, the inclination angle of the molecular orientation axis of the polymer film f is increased by the stretching by the longitudinal stretching machine 3 in the third step, so that the target inclination angle is obtained. In this way, a tentative angle being gentler than a target angle is formed before inclination of the orientation axis at the target inclination angle, so that the polymer film f is protected from or less subject to get wrinkled even when the inclination angle of the orientation axis is increased. In sum, the two steps increase the inclination angle, thereby being no need to largely increase the shrinkage in the second step compared with the case where the inclination angle is increased only in the second step. That protects the polymer film from getting wrinkled resulting from insufficient shrinkage (or the polymer film is less subject to get wrinkled resulting from insufficient shrinkage).

Herein, paths of two rails of the tenter stretching machine 1 performing stretching in the width direction of the polymer film f in the first step and shrinkage in the width direction of the polymer film f in the second step are not limited to the paths of the rails 10a and 10b of the above-mentioned tenter stretching machine 1. The first step and the second step may be performed by tenter stretching machines each having paths of rails as shown in FIGS. 3 to 10, for example. Now, a third embodiment through a tenth embodiment each will be described below, making reference to FIGS. 3 to 10. The same numerals are assigned to the same members as those in FIGS. 1 and 2, so that the description of those will be omitted. Further, only essential parts will be described for simplification of the description. Still further, the shared numerals such as Wa, Wb, and α (alpha) 1 will be omitted after FIG. 4.

The third embodiment of the present invention conducts the A-A pattern.

Figure 3:
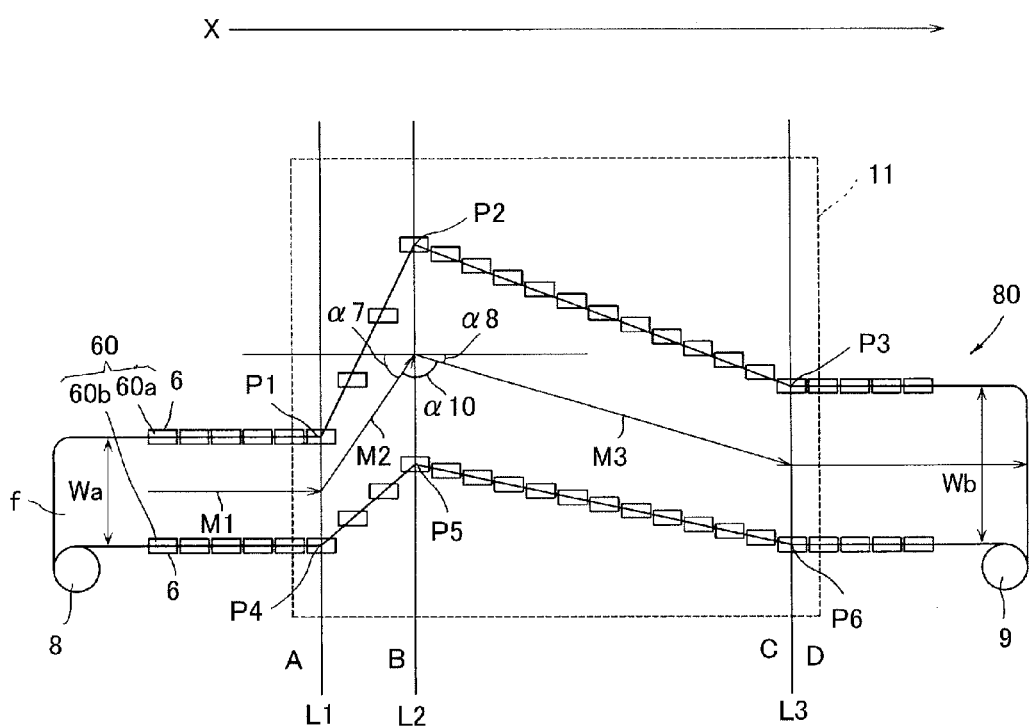
FIG. 3 is a plan view of an example of a film stretching machine usable in a third embodiment of the present invention.

In the third embodiment of the method for producing a stretched film of this invention, as shown in FIG. 3, the area C where a tenter stretching machine 80 performs shrinkage in the second step has a distance relative to the basic traveling direction (distance relative to a direction shown by an arrow X in FIG. 3) larger than that in the area B where the tenter stretching machine 80 performs stretching in the first step. Specifically, in the method for producing a stretched film of this invention, the area B center line inclination angle α (alpha) 7 and the area C center line inclination angle α (alpha) 8 may be the same or different. Further, paths of rails 60a and 60b traveling in the area B and the area C may have the same distance or different distances relative to the basic traveling direction.

The forth embodiment of the present invention conducts the A-A pattern.

Figure 4:
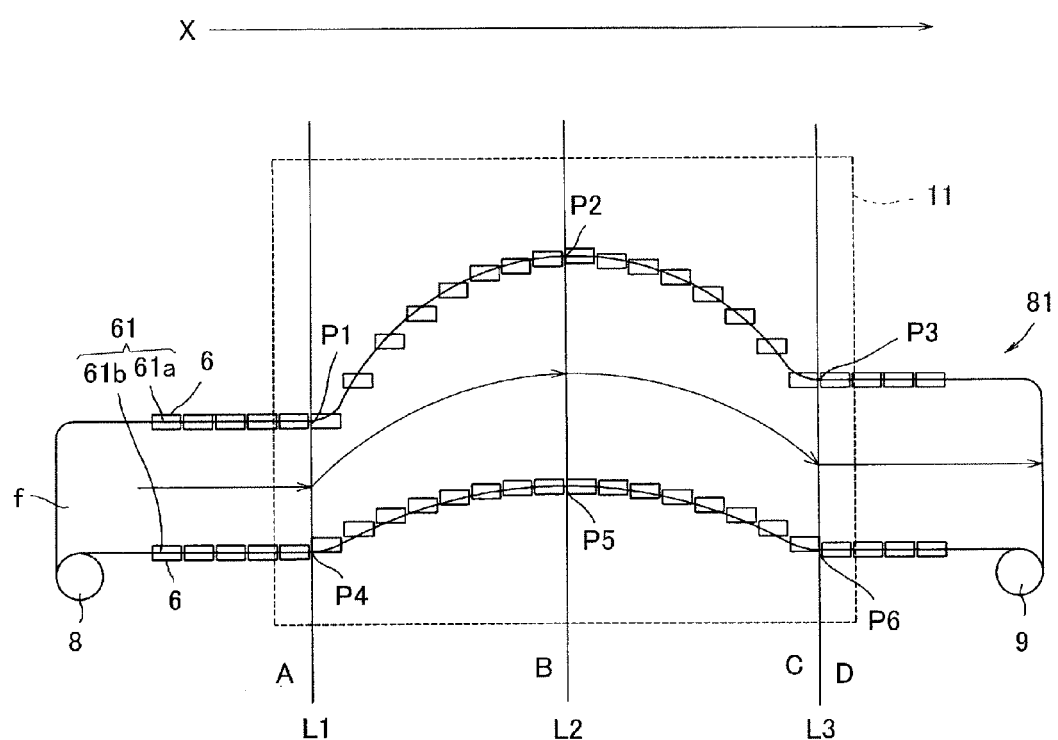
FIG. 4 is a plan view of an example of a film stretching machine usable in a forth embodiment of the present invention.

In the forth embodiment of the method for producing a stretched film of this invention, as shown in FIG. 4, a line formed by connecting three points P1, P2, and P3 where the traveling direction is changed in a path of a rail 61a at one side edge of a tenter stretching machine 81 is a curved line. As well, a line formed by connecting three points P4, P5, and P6 where the traveling direction is changed in a path of a rail 61b in the other side edge is also a curved line. In the tenter stretching machine used in the method for producing a stretched film of this invention, both the rails 61a and 61b may form a curved path as shown in FIG. 4 or either one of the rails 61a and 61b may form a curved path.

The fifth embodiment of the present invention conducts the A-A pattern.

Figure 5:
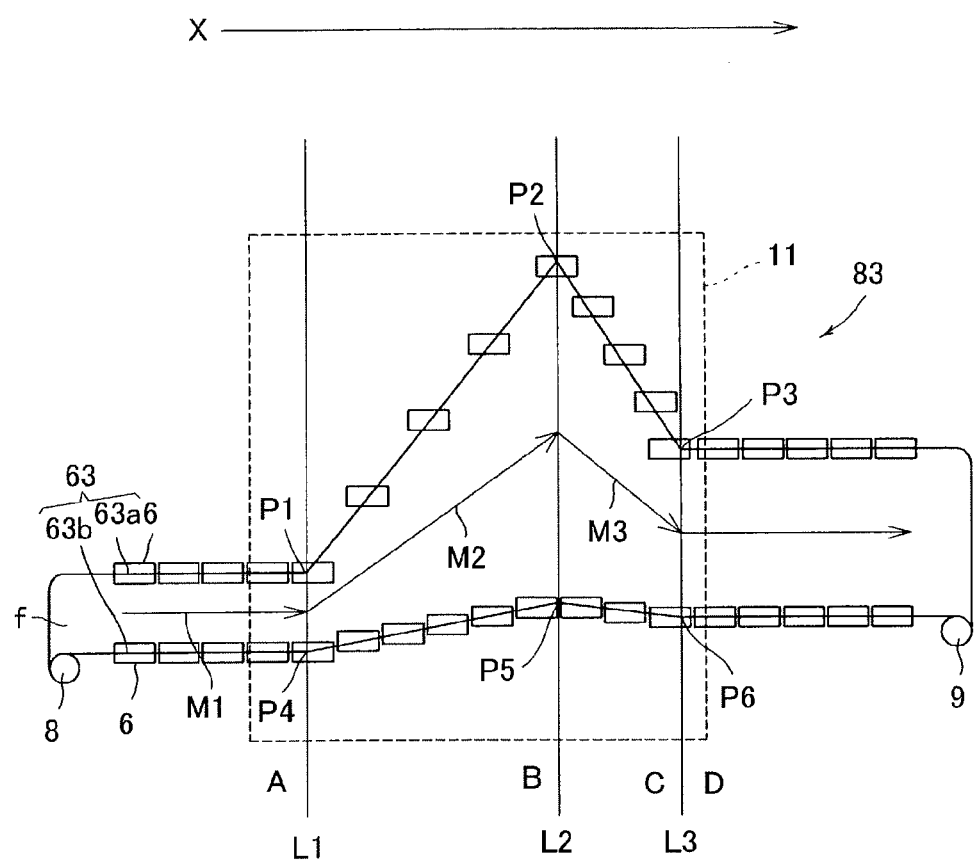
FIG. 5 is a plan view of an example of a film stretching machine usable in a fifth embodiment of the present invention.

In the fifth embodiment of the method for producing a stretched film of this invention, as shown in FIG. 5, the area B where a tenter stretching machine 83 performs stretching in the first step has a distance relative to the basic traveling direction (distance relative to a direction shown by the arrow X in FIG. 5) larger than that in the area C where the tenter stretching machine 83 performs shrinkage in the second step. The method for producing a stretched film of this invention can be conducted using such the tenter stretching machine 83.

The sixth embodiment of the present invention conducts the A-C pattern.

Figure 6:
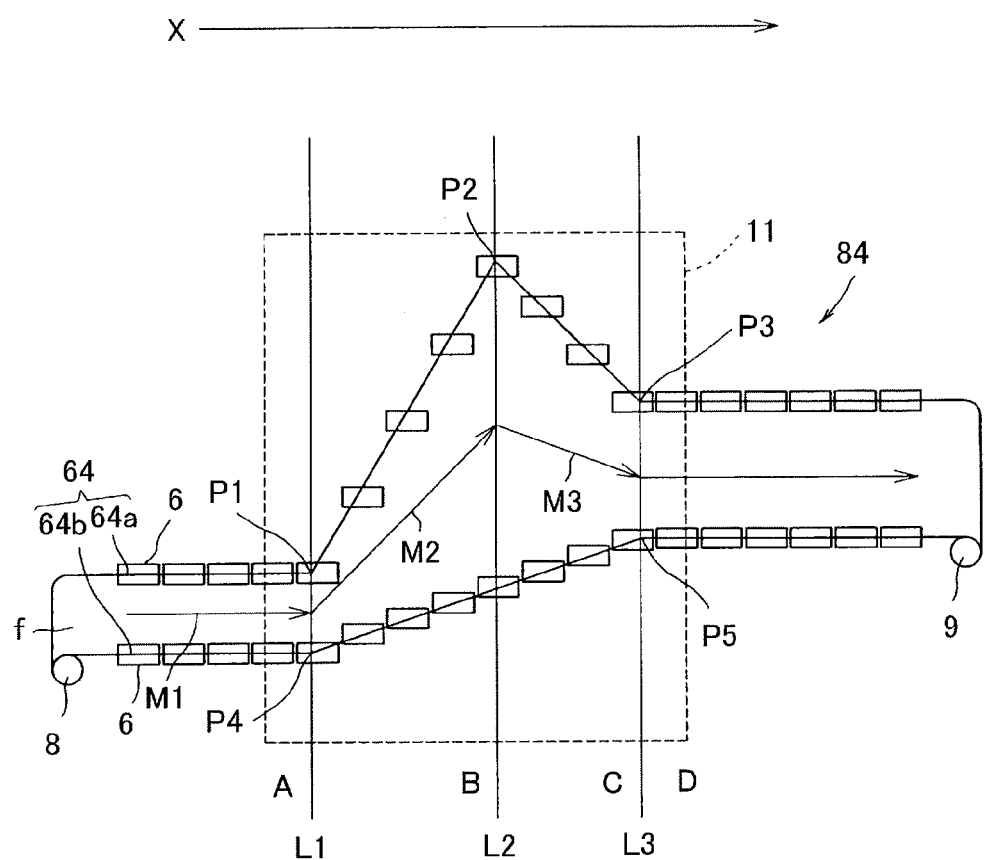
FIG. 6 is a plan view of an example of a film stretching machine usable in a sixth embodiment of the present invention.

In the sixth embodiment of the method for producing a stretched film of this invention, as shown in FIG. 6, a path of a rail 64a at one side edge of a tenter stretching machine 84 travels with changing the traveling direction at three points P1, P2, and P3, while a path of a rail 64b at the other side edge of the tenter stretching machine 84 travels with changing the traveling direction at two points P4 and P5.

The traveling directions of the rails 64a and 64b in the area B extend as bending to the left of the traveling direction in the area A (to the side near the rail 64a in the width direction of the polymer film f and upwardly in FIG. 6). The rail 64a at the one side edge bends more steeply than the rail 64b at the other side edge.

Meanwhile, in the area C, the rail 64a at the one side edge extends as bending to the right of the traveling direction in the area A (to the side near the rail 64b in the width direction of the polymer film f and downwardly in FIG. 6). Hence, the traveling direction of the rail 64a at the one side edge in the area C bends with respect to that in the area B, so that the traveling directions in the area B and in the area C have opposite components of intersecting direction (a direction intersecting with the basic traveling direction shown by an arrow X in FIG. 6 and also a vertical direction in FIG. 6). Therefore, in the area B and the area C, the rail 64a at the one side edge bends with a top on a boundary L2 between the area B and the area C. Further, the path of the rail 64a at the one side edge in the area B and the area C is convexed outwardly in the width direction of the polymer film f.

In contrast, the rail 64b at the other side edge in the area C travels in the same direction as in the area B. Specifically, the rail 64b at the other side edge has the traveling direction without bending on the boundary L2 between the area B and the area C, so that the path of the rail 64b having been bent at an upstream end (P4) in the area B travels straight up to a downstream end (P5) in the area C.

Hence, the rail 64a at the one side edge travels in the direction away from the basic traveling direction and the rail 64b at the other side edge in the area B, and travels in a direction approaching the basic traveling direction and the rail 64b at the other side edge in the area C. Therefore, in the area B, the traveling directions of the rails 64a and 64b extend as bending to the left of the (immediately preceding) traveling direction in the area A, that is; to the same direction relative to the intersecting direction. Then, in the area C, the traveling directions of the rails 64a and 64b extend in a direction approaching each other toward the center line in the width direction of the polymer film f. That stretches the polymer film f in the area B and shrinks the polymer film in the area C.

In the tenter stretching machine 84 used in the producing method in this invention, the rails 64a and 64b may have a different number of changes of their traveling directions. It is only necessary to change the traveling direction of the rail at one side edge at three times or more and that of the rail at the other side edge at twice or more.

The seventh embodiment of the present invention conducts the A-C pattern.

Figure 7:
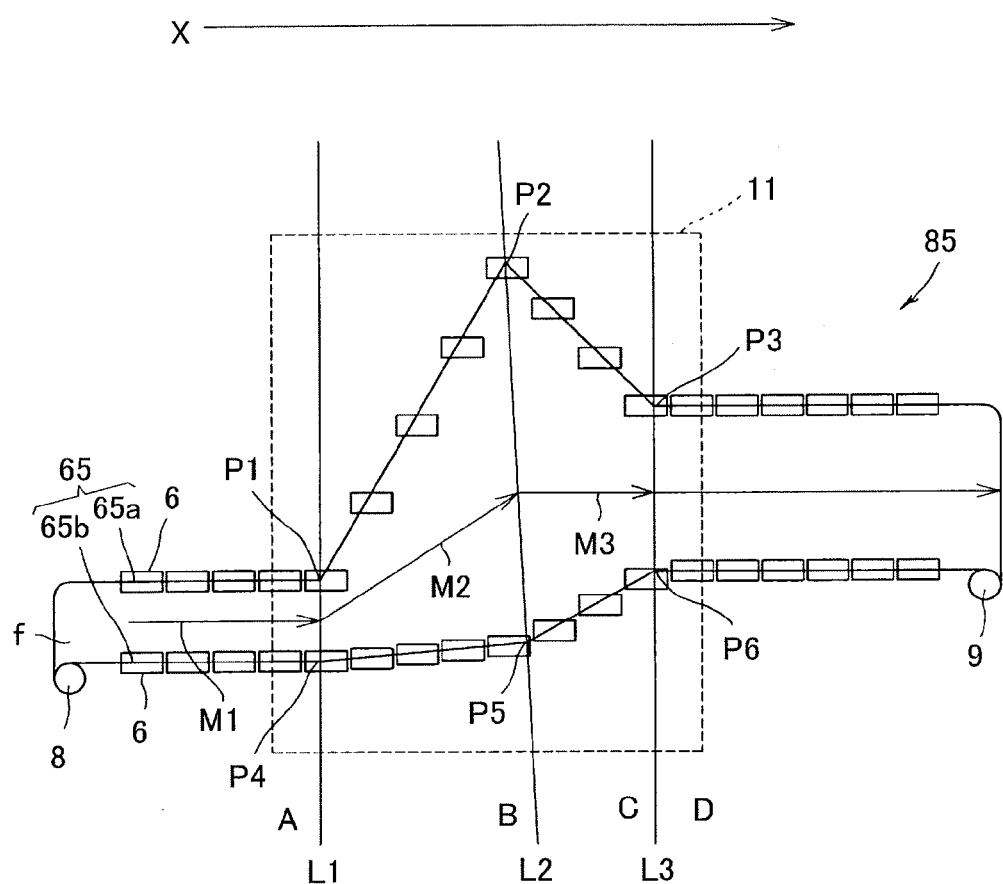
FIG. 7 is a plan view of an example of a film stretching machine usable in a seventh embodiment of the present invention.

In the seventh embodiment of the method for producing a stretched film of this invention, as shown in FIG. 7, a path of a rail 65a at one side edge of a tenter stretching machine 85 travels with changing the traveling direction at three points P1, P2, and P3, while a path of a rail 65b at the other side edge of the tenter stretching machine 85 travels with changing the traveling direction at three points P4, P5, and P6.

The traveling directions of the rails 65a and 65b in the area B extend as bending to the left of the traveling direction in the area A (to the side near the rail 65a in the width direction of the polymer film f and upwardly in FIG. 7). The rail 65a at the one side edge bends more steeply than the rail 65b at the other side edge.

In the area C, the traveling directions of the rails 65a and 65b extend in a direction approaching each other toward the center line in the width direction of the polymer film f. Specifically, the rail 65a at the one side edge extends as bending to the right of the traveling direction in the area A (to the side near the rail 65b in the width direction of the polymer film f and downwardly in FIG. 7), while the rail 65b at the other side edge extends as bending to the left of the traveling direction in the area A (to the side near the rail 65a in the width direction of the polymer film f and upwardly in FIG. 7).

In terms of the boundary L2 between the area B and the area C, though the boundary L1 between the area A and the area B and the boundary L3 between the area C and the area D extend in a direction perpendicular to the basic traveling direction (the direction shown by the arrow X in FIG. 7), the boundary L2 does not extend in the direction perpendicular to the basic traveling direction. Specifically, the second point P2 from upstream among points P1, P2, and P3 in the path of the rail 65a at the one side edge and the second point P5 from upstream among points P4, P5, and P6 in the path of the rail 65b at the other side edge are located at different positions relative to the basic traveling direction.

In the tenter stretching machine 85 used in the producing method in this invention, the rails 65*a* and 65*b* may be bent at the same position relative to the basic traveling direction or may be bent at different positions relative to the basic traveling direction. In other words, the stretching in the first step and/or the shrinkage in the second step may be started and/or finished at a position where the both side edges in the width direction of the polymer film f are located at the same position relative to the basic traveling direction or at a position where they are located at different positions relative to the basic traveling direction.

The eighth embodiment of the present invention conducts the B-A pattern.

Figure 8:
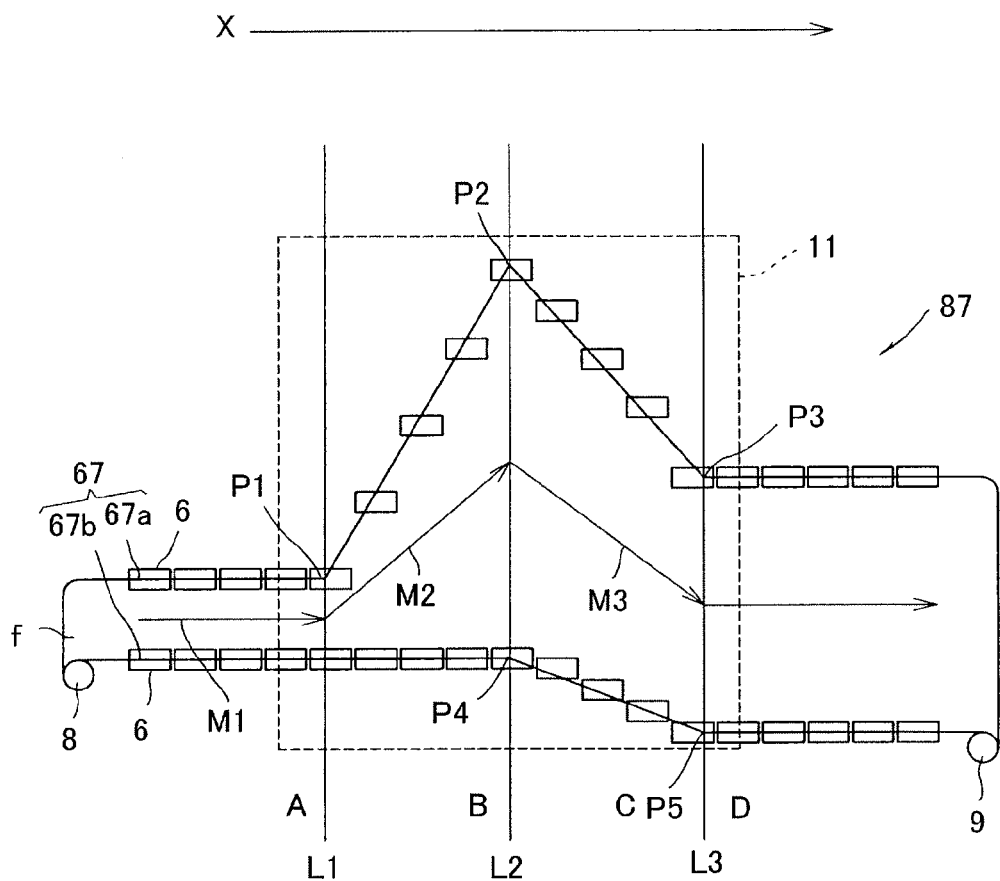
FIG. 8 is a plan view of an example of a film stretching machine usable in an eighth embodiment of the present invention.

In the eighth embodiment of the method for producing a stretched film of this invention, as shown in FIG. 8, in the area B where the first step is performed in a tenter stretching machine 87, while a rail 67*b* at one side edge travels in the same direction as the traveling direction in the immediately preceding area A, a rail 67*a* at the other side edge is inclined to a direction away from the rail 67*b* traveling straight.

Further, in the area C where the second step is performed in the tenter stretching machine 87, the rails 67*a* and 67*b* are inclined to the same direction. The method for producing a stretched film of this invention can be conducted also using such the tenter stretching machine.

Still further, in the area C where the second step is performed in the tenter stretching machine 87, the traveling directions of the rails 67*a* and 67*b* extend as bending to the right of the respective traveling directions of the rails 67*a* and 67*b* in the area A (to the side near the rails 67*b* in the width direction of the polymer film f and downwardly in FIG. 8).

The ninth embodiment of the present invention conducts the A-C pattern. Further, this embodiment illustrates an example of providing a step of parallel travel between the first step and the second step.

Figure 9:
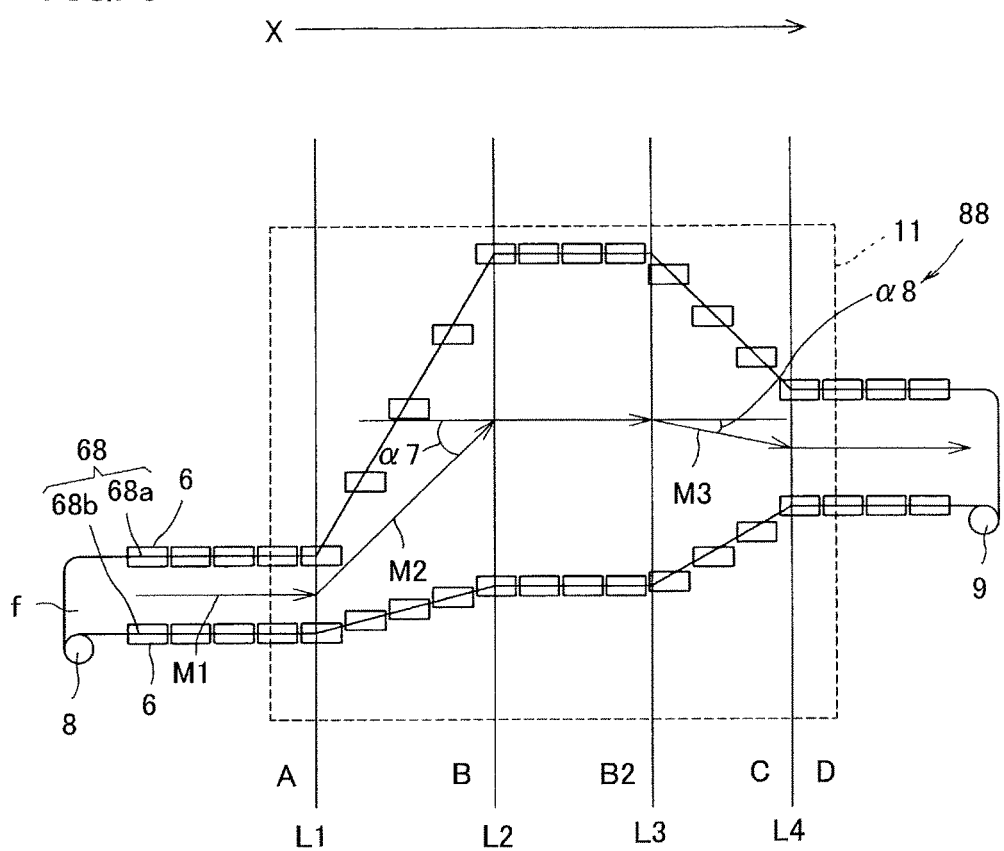
FIG. 9 is a plan view of an example of a film stretching machine usable in a ninth embodiment of the present invention.

In the ninth embodiment of the method for producing a stretched film of this invention, as shown in FIG. 9, a tenter stretching machine 88 has an area B2 where neither stretch nor shrinkage is performed, which is located between the area B where the stretch is performed in the first step and the area C where the shrinkage is performed in the second step. This area B2 conducts the step of parallel travel.

In the area B, rails 68*a* and 68*b* extend as bending to the left of the traveling direction of the immediately preceding area A (to the side near the rail 68*a* in the width direction of the polymer film f and upwardly in FIG. 9). The rail 68*a* at one side edge bends more steeply than the rail 68*b* at the other side edge.

Then, in the area B2, the rails 68*a* and 68*b* bend to the right of the traveling direction in the area B on the boundary L2 with the immediately preceding area B and extend in a direction along the basic traveling direction (the direction shown by the arrow X in FIG. 9). In the area B2, the rails 68*a* and 68*b* have an equal width therebetween.

Then, in the area C, the rails 68*a* and 68*b* are inclined to a direction approaching each other toward the center in the width direction.

As described, it is not necessary to continuously perform the first step and the second step in the method for producing a stretched film of this invention. It is only necessary to perform each the first step and the second step at least once during production of a stretched film.

The tenth embodiment of the present invention conducts the A-A pattern. Further, this embodiment illustrates an example of providing a step of parallel travel between the first step and the second step.

Figure 10:
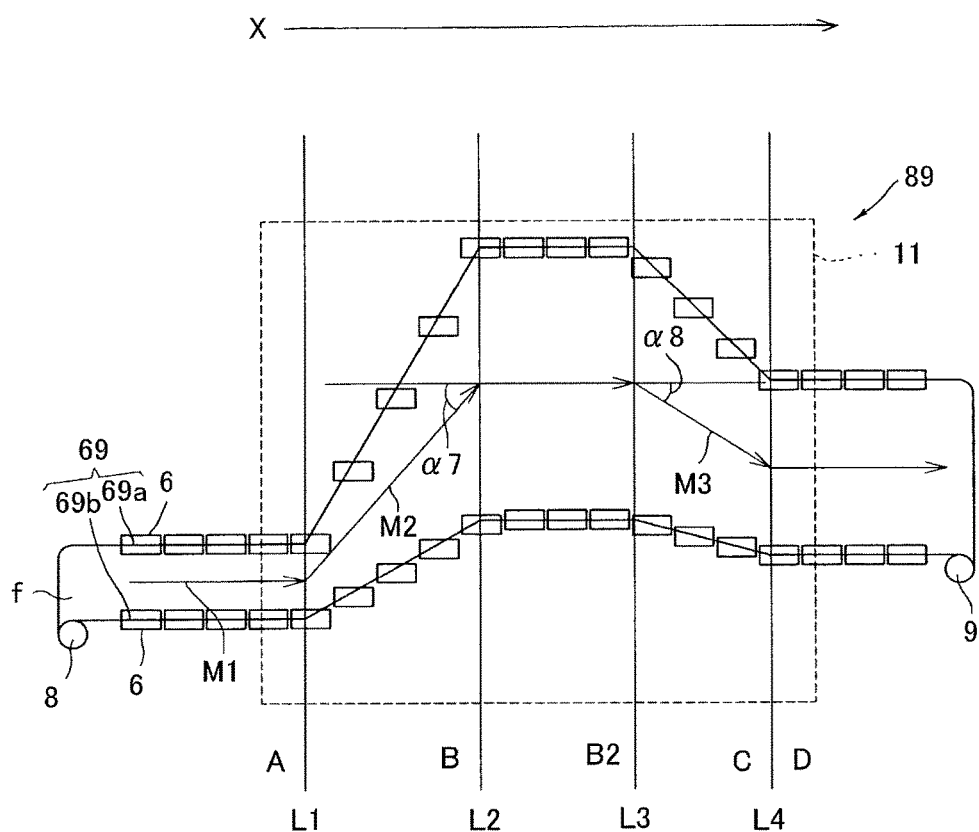
FIG. 10 is a plan view of an example of a film stretching machine usable in a tenth embodiment of the present invention.
Figure 11:
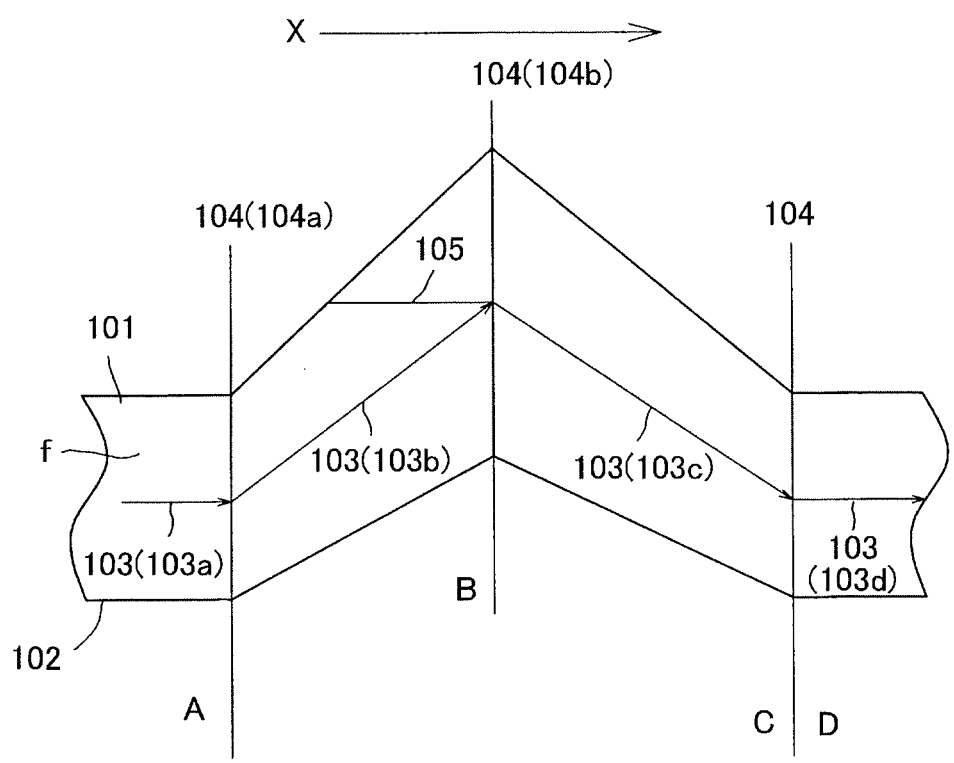
FIG. 11 is an explanatory view showing changes of a line connecting centers in a width direction of a polymer film when a traveling direction of the polymer film is bent.

In the tenth embodiment of the method for producing a stretched film of this invention, as shown in FIG. 10, a tenter stretching machine 89 has an area B2 where neither stretch nor shrinkage is performed, which is located between the area B where the stretch is performed in the first step and the area C where the shrinkage is performed in the second step. This area B2 conducts the step of parallel travel.

In the tenter stretching machine 89 used in this embodiment, the area B and the area B2 are the same as those in the above-mentioned tenth embodiment. In the area C, rails 68*a* and 68*b* extend as bending to the right of the traveling direction in the immediately preceding area B2 (to the side near the rail 69*b* in the width direction of the polymer film f and downwardly in FIG. 10). The method for producing a stretched film of this invention can be conducted also using such the tenter stretching machine 89.

As shown in each of the above-mentioned embodiments, in the tenter stretching machine used in the producing method of this invention, the two rails may extend as bending to the same direction relative to the intersecting direction or to different directions relative to that when the stretch is performed in the first step and the shrinkage is performed in the second step. Alternatively, the rails may travel to a direction approaching each other toward the center line in the width direction of the polymer film f or a direction away from each other. Alternatively, it is also possible that one of the rails travels straight while the other of the rails travels approaching or away from there. In sum, when the stretch is performed in the first step or the shrinkage is performed in the second step, it is only necessary that the two rails extend as bending to the same direction relative to the intersecting direction in at least either of the steps. At this time, it is preferable that the stretching in the first step and the shrinkage in the second step are performed in the area B and the area C respectively, that the area B center line M2 and the area C center line M3 each have a component heading to the basic traveling direction and a component of the intersecting direction, and that the area B center line M2 and the area C center line M3 have the opposite components of the intersecting direction.

The above-mentioned embodiments each illustrate the examples in which the stretching in the area B in the first step and the shrinkage in the area C in the second step each are performed once. However, the method for producing a stretched film of the present invention is not limited thereto. The two steps can be performed as many times as desired. The first step or the second step may be performed after the first step and the second step are performed, for example. Alternatively, the first step and the second step each may be performed once after the first step and the second step are performed. It is only necessary to perform each of the two steps at least once and the number of performance may be appropriately changed.

In each of the above-mentioned embodiments, the second step is performed after the first step. Thus, it is necessary to confirm values such as a measure of the inclination angle of the molecular orientation axis and the Re (retardation) of the polymer film f at the end of the first step in order to determine various conditions such as a measure of the area C center line inclination angle α (alpha) 8 and a shrinkage ratio for performance of the shrinkage in the second step.

The use of a tenter stretching machine in which traveling directions of two rails can be changed is an example of a method of confirming an inclination angle of an orientation axis in the first step. Specifically, the traveling directions of the rails are made changed so that the rails travel at an equal width therebetween throughout the entire extent of downstream of the area B. A polymer film f is conveyed by the tenter stretching machine, whereby a polymer film f having undergone only the first step is produced. Measurement of an inclination angle of an orientation axis and a Re (retardation) of the produced polymer film f tells the inclination angle of the orientation axis and the Re (retardation) in the first step.

After conducting this method, the traveling directions of the rails are made changed to make it possible to shrink the polymer film f in the area C, and whereby a stretched film is produced after confirming the inclination angle of the orientation axis and the Re (retardation) in the first step.

The temporary stopping of a tenter stretching machine is another example of the confirmation method. Specifically, the tenter stretching machine is made temporarily stopped and the polymer film f is cut at the boundary between the area B and the area C. The inclination angle of the orientation axis and the Re (retardation) of the cut polymer film f is confirmed.

Each stretching machine used in each of the above-mentioned embodiments is not particularly limited and may be of an appropriate stretching machine such as a tenter stretching machine, a pantograph stretching machine, and a linear motor-stretching machine.

In the first step in each of the above-mentioned embodiments, the volatile fraction of a film is preferably less than 5% (percent) and more preferably less than 3% (percent).

A thickness of a polymer film f in each of the above-mentioned embodiments is not particularly limited. The thickness of the polymer film f is appropriately determined depending on a purpose of use of a stretched film to be produced. However, in view of production of a stretched film having a uniform quality with heat and shrinkage treatment stabilized, the thickness is preferably 3 mm or less, more preferably 1 µm to 1 mm, and most preferably 5 µm to 500 µm.

A stretched film to be produced by this invention is not particularly limited and may be a plastic film or the like, for example.

Further, lengths in a longitudinal direction and a width direction of a stretched film to be produced by this invention are not particularly limited and may be of appropriate lengths.

In order to improve productivity and/or to efficiently attach to a long polarizing plate or the like, for example, a long plastic film may be continuously stretched by an appropriate stretching machine as described above.

The uses of a stretched film to be produced by this invention are not particularly limited and may be appropriately determined. However, in view of an inclined orientation axis in an oblique direction, the stretched film is suitably used for a retardation plate or the like. More specifically, it is preferable to produce a stretched film having an inclination angle of its orientation axis at 20 to 70 degrees and satisfying a following formula (1):

$$0.5 \leq (nx-nz)/(nx-ny) \leq 2.5 \quad (1)$$

(when "nx" indicates a refractive index in a slow axis direction of a retardation film, in which the slow axis direction means a direction having the largest refractive index in a retardation film plane, "ny" indicates a refractive index in a fast axis direction thereof, and "nz indicates a refractive index in a thickness direction thereof), so as to use the produced film as a retardation plate. It is more preferable to produce a stretched film satisfying a following formula (2):

$$0.5 \leq (nx-nz)/(nx-ny) \leq 2 \quad (2)$$

(when "nx" indicates a refractive index in a slow axis direction of a retardation film, in which the slow axis direction means a direction having the largest refractive index in a retardation film plane, "ny" indicates a refractive index in a fast axis direction thereof, and "nz indicates a refractive index in a thickness direction thereof), so as to use the produced film as a retardation plate.

Further, as a retardation plate, the value of a Re (retardation) measured at a wavelength of 590 nm satisfies preferably a range of 10 to 1000 nm and more preferably a range of 100 to 170 nm or 220 to 290 nm.

Such retardation plates are usable, for example, for various purposes such as adjustment of birefringence characteristic, color protection caused by visual change, and widening of a view angle in a crystal liquid display device. Further, they are also usable for formation of various photonic materials such as an elliptic polarizing plate and a circular polarizing plate by attachment with a polarizing plate.

In a case where a stretched film produced by this invention is used as a retardation plate, it is possible to use a superimposed body formed by laminating a plurality of stretched films.

In this case, any number of stretched films is laminated, but the number of those is preferably two to five in view of optical transmittance.

Further, a combination of stretched films to be laminated can be appropriately changed and inclination angles of their orientation axes, materials, retardations, and the like of the laminated stretched films may be the same or different. They can be appropriately changed.

Herein, in a case where a stretched film of this invention is used as a retardation plate, it is preferable to use a stretched film having an excellent transparency, such as polyolefin like cyclic polyolefin, polycarbonate, polysulfone, acetylcellulose, polyvinyl chloride, and polymethylmethacrylate. A thickness of this retardation plate may be determined at will by conditions such as retardation depending on a propose of use, but is preferably 1 mm or less, more preferably 1 µm to 500 µm, and most preferably 5 µm to 300 µm.

In the above-mentioned cases such as formation of a superimposed body by laminating the stretched films and attachment of a retardation plate (stretched film) to a polarizing plate, it is preferable to firmly fix the stretched films to each other and/or the retardation plate to the polarizing plate in view of inhibition of reflex or optical shifting caused by adjustment of a refractive index between layers, prevention of any foreign matter such as garbage from getting inside, and the like.

Herein, a material such as an adhesive used for fixation is not particularly limited and may suitably employ a transparent adhesive, for example. Besides, a pressure-sensitive adhesive may be suitably used in view of prevention of change in optical characteristic or the like.

Still further, a stretched film (retardation plate) produced by this invention may have an ultraviolet absorption capacity like salicylate ester compound, benzophenol compound, benzotriazole compound, cyanoacrylate compound, nickel-complex compound by being treated with an ultraviolet light absorber.

In the above-mentioned embodiments, the first points P1 and P4, located most upstream, among the points where the traveling directions of the both rails (the rails 10a and 10b, for example, in the first embodiment) are changed, are located at the same position relative to the basic traveling direction.

However, this invention is not limited to such the configuration and the points P1 and P4 may be located at different positions relative to the basic traveling direction.

Figure 24:
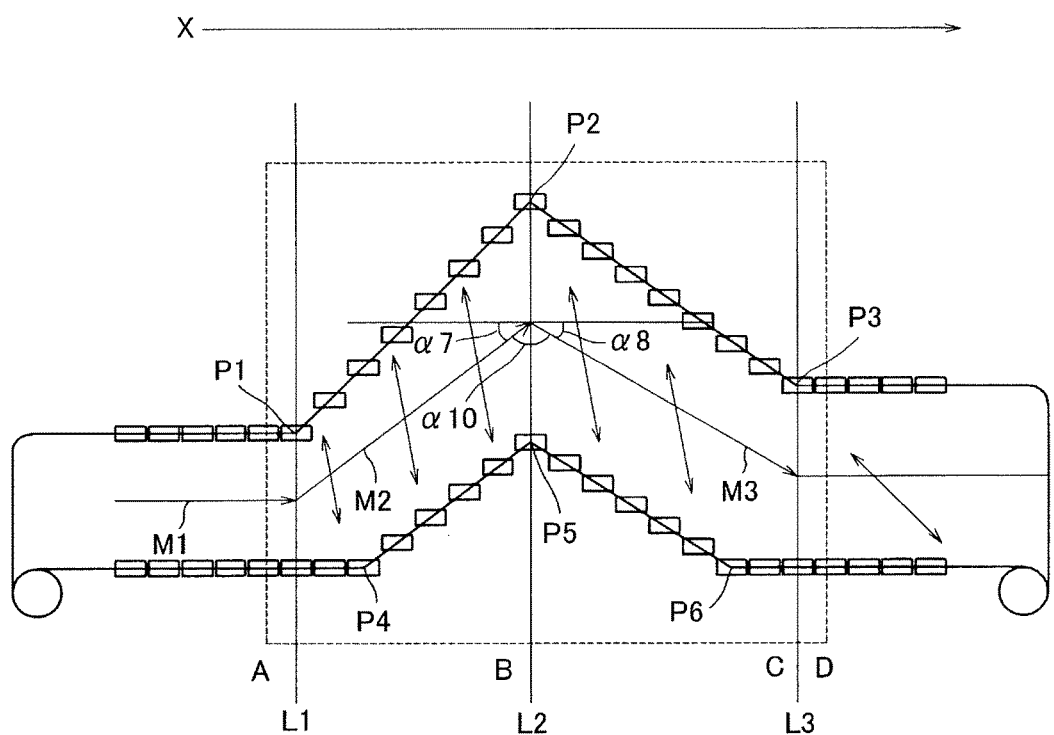
FIG. 24 is a plan view of an example of a film stretching machine that is different from each of the embodiments.

A tenter stretching machine shown in FIG. 24 has an traveling trajectory of the A-A pattern with three points P1, P2, and P3 at one side edge shifted with respect to the respective three points P4, P5, and P6 at the other side edge relative to the basic traveling direction. In such the tenter stretching machine, the first step starts from the point P1 where its path is firstly changed. Then, a degree of stretching per unit distance changes from the point P4 at the other side located behind.

Such a configuration may be employed in not only the A-A pattern but also the other patterns.

The first step in which a long film is stretched with a holding distance in the width direction thereof increased is preferably performed by a so-called A pattern (in which the both side edges in the width direction of the long film travel as bending to the same direction) among the above-mentioned patterns. Specifically, the A-X pattern (X is either A, B, or C) is preferable. More specifically, the A-B pattern is more preferable than the A-C pattern and the A-A pattern is further more preferable than the A-B pattern.

Further, in the A-A pattern among the above-mentioned patterns, a trajectory of the long film in the area B and the area B is preferably formed in a shape similar to a sign of inequality (>, <) of mathematical symbol or to crescendo or decrescendo of music code.

Still further, in each of the above-mentioned embodiments, each of the first step and the second step is performed once, but the present invention is not limited thereto. The first step and the second step may be repeated several times. In this case, it is possible to perform the first step, the second step, the first step, and the second step in this order. Alternatively, it is possible to perform the first step, the first step, and the second step in this order or the first step, the second step, and the second step in this order. In sum, it is possible to repeat a combination of the first step and the second step several times or to repeat continuously either the first step or the second step.

Herein, in a case of repetition of the first step, it is preferable to perform only the first steps without performing another step such as the step of parallel travel between the first step and the first step.

Alternatively, in a case of repetition of a combination of the first step and the second step several times, it is preferable to take up the polymer film f after the second step. Specifically, it is preferable to take the polymer film f off the stretching machine once after first performance of the first step and the second step with the stretching machine, to attach the stretched film (polymer film f) having undergone each of the first step and the second step once to the stretching machine again, and to perform the first step and the second step again.

Yet further, the second embodiment described above illustrates the example of performance of the stretching in the first step, the shrinkage in the second step, and the longitudinal stretching in the third step in this order, but the present invention is not limited thereto. The first step and the second step may be repeated several times. Specifically, it is possible to perform the first step, the second step, the first step, the second step, and the third step in this order. In this way, the third step may be performed after repetition of the first step and the second step several times.

Additionally, it is not necessary to perform the third step after the first step and the second step. Specifically, it is possible to perform the third step, the first step, and the second step in this order. In this way, it is possible to perform the first step and the second step onto the polymer film f having undergone the longitudinal stretching in advance in the third step.

Alternatively, it is possible to perform the third step, the first step, the second step, the first step, and the second step in this order. In this way, it is possible to repeat the first step and the second step several times after first performance of the longitudinal stretching in the third step.

Herein, the performance of the third step after the first step and the second step suppresses wrinkles and simultaneously adjusts the inclination angle of the molecular orientation axis as described above. In contrast, in a case of the performance of the third step before the first step and the second step, the first step and the second step can be performed after adjustment of the inclination angle of the molecular orientation axis.

EXAMPLES

The present invention will be described more specifically below with reference to examples, but the present invention is not limited to the examples.

Herein, measuring methods of various kinds of physical properties and optical properties employed in the examples are as follows.

(1) Measurement of Re (Retardation), Nz coefficient, and Inclination Angle of Orientation Axis The measurements of those were conducted with a retardation film inspection system RETS produced by Otsuka Electronics Co., Ltd. at a measured wavelength of 590 nm and at 5 cm intervals in a width direction. The Nz coefficient was measured at an inclination angle of 45 degrees. The Re, the Nz coefficient, and the inclination angle of the orientation axis were shown by using respective average values. Herein, the Nz coefficient is shown by $Nz=(nx-nz)/(nx-ny)$ (when "nx" indicates a refractive index in a slow axis direction of a retardation film, in which the slow axis direction means a direction having the largest refractive index in a retardation film plane, "ny" indicates a refractive index in a fast axis direction thereof, and "nz indicates a refractive index in a thickness direction thereof).

(2) Thickness

The thickness in the width direction was measured at 1 mm intervals with a thickness tester of contacting type KG601A produced by Anritsu Corp. The thickness was shown by using an average of obtained value.

Example 1

Figure 2:
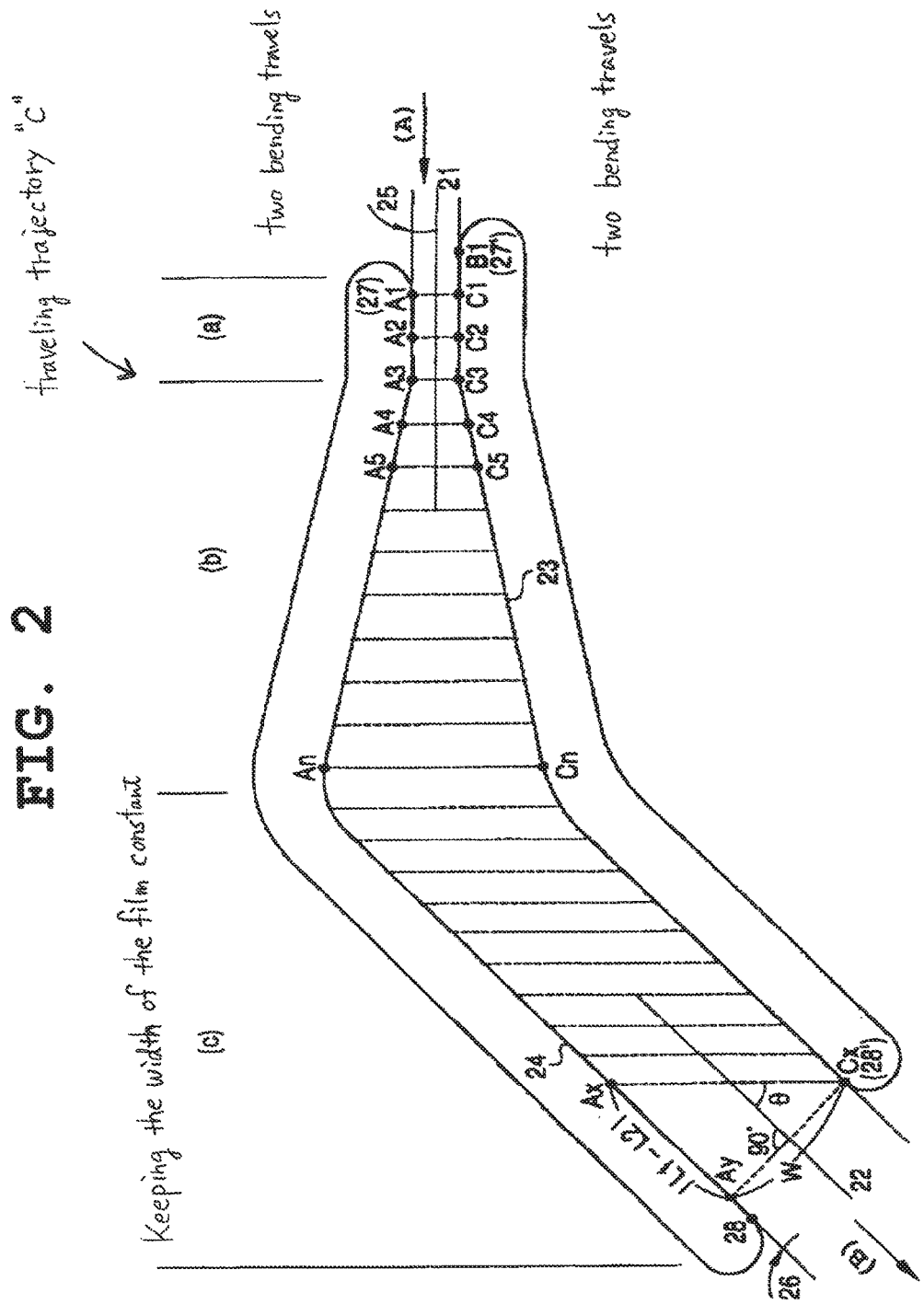
FIG. 2 is a plan view of an example of a film stretching machine usable in a second embodiment of the present invention.

A polycarbonate film ("ELMECH R-film unstretched" produced by Kaneka Corporation) was introduced into a stretching machine corresponding to the tenter stretching machine 1 in FIG. 2 and heated at 160 degrees centigrade, so as to be stretched by 50% (percent) in the width direction. At this time, the film had an inclination angle of a center line (the area B center line inclination angle α (alpha) 7) at 9 degrees. The stretching machine was temporarily stopped to measure the Re, the inclination angle of the orientation axis, the Nz coefficient, and the presence of wrinkles of the film. The conditions are set forth in Table 1 and the results are set forth in Table 2.

Consecutively, in the same stretching machine, the film having been stretched was heated at 162 degrees centigrade, so as to be shrunk by 25% (percent) in the width direction, thereby obtaining a temporary stretched film. The film has an inclination angle of a center line (the area C center line inclination angle α (alpha) 8) at 11 degrees. Then, the Re, the inclination angle of the orientation axis, the Nz coefficient, and the presence of wrinkles of the resulting temporary stretched film were measured. The conditions are set forth in Table 1 and the results are set forth in Table 2.

Further, the temporary stretched film was introduced into a stretching machine corresponding to the longitudinal stretching machine 3 in FIG. 2 and heated at 147 degrees centigrade, so as to be stretched by 1% (percent) in the longitudinal direction, thereby obtaining a target stretched film. Then, the Re, the inclination angle of the orientation axis, the Nz coefficient, and the presence of wrinkles of the target stretched film were measured. The conditions are set forth in Table 1 and the results are set forth in Table 3.

Example 2

A polycarbonate film ("ELMECH R-film unstretched" produced by Kaneka Corporation) was introduced into a stretching machine corresponding to the tenter stretching machine 1 in FIG. 2. A temporary stretched film was obtained according to Example 1 except that the film had an inclination angle of a center line (the area B center line inclination angle) at stretching at 6 degrees and an inclination angle of a center line (the area C center line inclination angle) at shrinkage at 0 degree. After each of the stretching and the shrinkage, the Re, the inclination angle of the orientation axis, the Nz coefficient, and the presence of wrinkles of the film were measured. The conditions are set forth in Table 1 and the results are set forth in Table 2.

Consequently, the temporary stretched film was introduced into a stretching machine corresponding to the longitudinal stretching machine 3 in FIG. 2 and heated at 147 degrees centigrade, so as to be stretched by 2% (percent) in the longitudinal direction, thereby obtaining a target stretched film. Then, the Re, the inclination angle of the orientation axis, the Nz coefficient, and the presence of wrinkles of the target stretched film were measured. The conditions are set forth in Table 1 and the results are set forth in Table 3.

Example 3

A polycarbonate film ("ELMECH R-film unstretched" produced by Kaneka Corporation) was introduced into a stretching machine corresponding to the tenter stretching machine 1 in FIG. 2. A temporary stretched film was obtained according to Example 1 except that the film had an inclination angle of a center line (the area B center line inclination angle) at stretching at 6 degrees. After each of the stretching and the shrinkage, the Re, the inclination angle of the orientation axis, the Nz coefficient, and the presence of wrinkles of the film were measured. The conditions are set forth in Table 1 and the results are set forth in Table 2. Herein, the temporary stretched film was not subject to the stretching in the longitudinal direction (the third step).

Example 4

A polycarbonate film ("ELMECH R-film unstretched" produced by Kaneka Corporation) was introduced into a stretching machine corresponding to the tenter stretching machine 1 in FIG. 2. A temporary stretched film was obtained according to Example 1 except that the film had an inclination angle of a center line (the area C center line inclination angle) at shrinkage at 0 degree. After each of the stretching and the shrinkage, the Re, the inclination angle of the orientation axis, the Nz coefficient, and the presence of wrinkles of the film were measured. The conditions are set forth in Table 1 and the results are set forth in Table 2. Herein, the temporary stretched film was not subject to the stretching in the longitudinal direction (the third step).

Comparative Example 1

A polycarbonate film ("ELMECH R-film unstretched" produced by Kaneka Corporation) was introduced into a stretching machine and heated at 160 degrees centigrade, so as to be stretched by 50% (percent) in the width direction, thereby obtaining a temporary stretched film. At this time, the film had an inclination angle of a center line (the area B center line inclination angle) at 9 degrees. In short, a temporary stretched film was produced by the method for producing a temporary stretched film in Example 1 except that the shrinkage (the second step) was not performed. The conditions are set forth in Table 1 and the results are set forth in Table 2.

Consequently, the temporary stretched film was introduced into a stretching machine corresponding to the longitudinal stretching machine 3 in FIG. 2 and heated at 147 degrees centigrade, so as to be stretched by 8% (percent) in the longitudinal direction, thereby obtaining a target stretched film. Then, the Re, the inclination angle of the orientation axis, the Nz coefficient, and the presence of wrinkles of the target stretched film were measured. The conditions are set forth in Table 1 and the results are set forth in Table 3.

Comparative Example 2

A polycarbonate film ("ELMECH R-film unstretched" produced by Kaneka Corporation) was introduced into a stretching machine corresponding to the tenter stretching machine 1 in FIG. 2. A temporary stretched film was obtained according to Example 1 except that the film had an inclination angle of a center line (the area B center line inclination angle) at stretching at 6 degrees and a shrinkage ratio at the shrinkage was 40% (percent) in the width direction. After each of the stretching and the shrinkage, the Re, the inclination angle of the orientation axis, the Nz coefficient, and the presence of wrinkles of the film were measured. The conditions are set forth in Table 1 and the results are set forth in Table 2. Herein, the temporary stretched film was not subject to the stretching in the longitudinal direction (the third step).

Comparative Example 3

A polycarbonate film ("ELMECH R-film unstretched" produced by Kaneka Corporation) was introduced into a stretching machine corresponding to the tenter stretching machine 1 in FIG. 2. A temporary stretched film was obtained according to Example 1 except that a shrinkage ratio at the shrinkage was 40% (percent) in the width direction. After each of the stretching and the shrinkage, the Re, the inclination angle of the orientation axis, the Nz coefficient, and the presence of wrinkles of the film were measured. The conditions are set forth in Table 1 and the results are set forth in Table 2. Herein, the temporary stretched film was not subject to the stretching in the longitudinal direction (the third step).

Comparative Example 4

A polycarbonate film ("ELMECH R-film unstretched" produced by Kaneka Corporation) was introduced into a stretching machine corresponding to the tenter stretching machine 1 in FIG. 2. A temporary stretched film was obtained according to Example 1 except that the film had both an inclination angle of a center line (the area B center line inclination angle) at stretching and an inclination angle of a center line (the area C center line inclination angle) at shrinkage at 0 degree. After each of the stretching and the shrinkage, the Re, the inclination angle of the orientation axis, the Nz coefficient, and the presence of wrinkles of the film were measured. The conditions are set forth in Table 1 and the results are set forth in Table 2. Herein, the temporary stretched film was not subject to the stretching in the longitudinal direction (the third step).

the stretched films with a high shrinkage ratio in the second step of Comparative Examples 2 and 3 got wrinkled.

Example 5

The present Example appropriately set values such as α (alpha) 3, α (alpha) 4, α (alpha) 5, α (alpha) 6, α (alpha) 7, α (alpha) 8 shown in FIG. 1, so as to produce various stretched films. The Re (retardation), the inclination angle (θ (theta) r) of the orientation axis, and the Nz coefficient of each of the stretched films were measured. As to a part thereof, a width of a required furnace was checked. The

TABLE 1

| | Conditions in first step | | | Conditions in second step | | | Conditions in third step | |
|---|---|---|---|---|---|---|---|---|
| | Temperature (Degrees C.) | Stretching ratio (%) | Inclination angle of center line of film (Degrees) | Temperature (Degrees C.) | Shrinkage ratio (%) | Inclination angle of center line of film (Degrees) | Temperature (Degrees C.) | Stretching ratio (%) |
| Example 1 | 160 | 50 | 9 | 162 | 25 | 11 | 147 | 1 |
| Example 2 | 160 | 50 | 6 | 162 | 25 | 0 | 147 | 2 |
| Example 3 | 160 | 50 | 6 | 162 | 25 | 11 | | |
| Example 4 | 160 | 50 | 9 | 162 | 25 | 0 | | |
| Comparative Example 1 | 160 | 50 | 9 | | | | 147 | 8 |
| Comparative Example 2 | 160 | 50 | 6 | 162 | 40 | 11 | | |
| Comparative Example 3 | 160 | 50 | 9 | 162 | 40 | 11 | | |
| Comparative Example 4 | 160 | 50 | 0 | 162 | 25 | 0 | | |

TABLE 2

| | Characteristic after first step | | | | Characteristic after second step | | | |
|---|---|---|---|---|---|---|---|---|
| | Retardation (nm) | Inclination angle of orientation axis (Degrees) | Nz coefficient (—) | Wrinkles ○: no X: present | Retardation (nm) | Inclination angle of orientation axis (Degrees) | Nz coefficient (—) | Wrinkles ○: no X: present |
| Example 1 | 410 | 9 | 1.6 | ○ | 180 | 39 | 1.2 | ○ |
| Example 2 | 410 | 6 | 1.6 | ○ | 120 | 23 | 1.6 | ○ |
| Example 3 | 410 | 6 | 1.6 | ○ | 150 | 40 | 1.2 | ○ |
| Example 4 | 410 | 9 | 1.6 | ○ | 130 | 30 | 1.6 | ○ |
| Comparative Example 1 | 410 | 9 | 1.6 | ○ | | | | |
| Comparative Example 2 | 410 | 6 | 1.6 | ○ | 125 | 44 | 1.1 | X |
| Comparative Example 3 | 410 | 9 | 1.6 | ○ | 140 | 47 | 1.1 | X |
| Comparative Example 4 | 410 | 0 | 1.6 | ○ | 110 | 0 | 1.6 | ○ |

TABLE 3

| | Characteristic after third step | | | |
|---|---|---|---|---|
| | Retardation (nm) | Inclination angle of orientation axis (Degrees) | Nz coefficient (—) | Wrinkles ○: no X: present |
| Example 1 | 140 | 45 | 1.2 | ○ |
| Example 2 | 100 | 45 | 2.1 | ○ |
| Comparative Example 1 | 90 | 45 | 4.7 | ○ |

As set forth in Tables 2 and 3, each of the stretched films obtained by Examples 1 to 4 had a high Re, a favorable Nz coefficient within a range of 0.5 to 2.5, and no wrinkles.

In contrast, the stretched film without the second step of Comparative Example 1 had a low Re and an unfavorable Nz coefficient beyond the above-mentioned range. Each of conditions such as the stretching and the shrinkage were according to the above-mentioned Examples 1 to 4.

Experiments were conducted with divided roughly into three conditions (Experiments 1 to 3).

Figure 13:
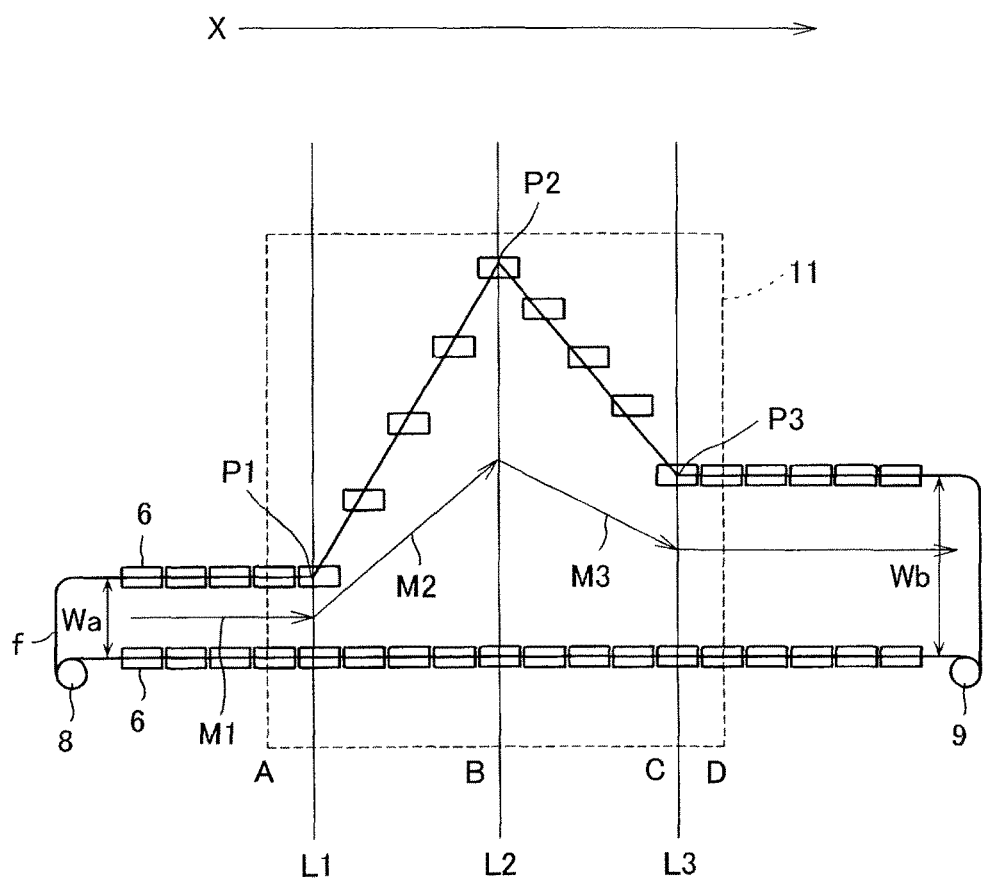
FIG. 13 is an explanatory view showing a traveling trajectory of Comparative Example of Example 5, illustrated like FIG. 1.

In the following Experiments 1 to 3, a film stretched by the traveling trajectory disclosed in Patent Document 1 described above was a standard (Comparative Example). The traveling trajectory of this Comparative Example was shown in FIG. 13. This Comparative Example includes such the traveling trajectory that, in a first step, one side edge in a width direction of a long film travels in parallel to a basic direction, whereas the other side edge thereof travels as bending toward a direction away from the one side edge. Further, it includes such the traveling trajectory that, in a second step, the one side edge in the width direction of the long film travels in parallel to the basic direction, whereas the other side edge thereof travels as bending toward the one side edge. As being applied to a definition of the patterns in this specification, this traveling trajectory corresponds to the B-B pattern. To explain using α (alpha) 3 to α (alpha) 6 in FIG. 1, the traveling trajectory corresponds to the case of "α (alpha) 3<90 degrees, α (alpha) 4=90 degrees, α (alpha) 5<90 degrees, and α (alpha) 6=90 degrees." This Comparative Example conducts the above-mentioned basic stretching step of producing a stretched film having a last width Wb from a long film having an original width Wa.

Each of the stretched films was evaluated by comparing values of the Re and θ (theta) r with the above-mentioned Comparative Example. The evaluation was judged that the high the values of the Re and θ (theta) r were, the more excellent the film characteristic was.

(Experiment 1)

Experiment 1 used a stretched film produced by the B-B pattern and under the condition of "α (alpha) 7=6 degrees and α (alpha) 8=3 degrees" as a standard (Comparative Example). Each of the stretched films was evaluated by comparing with this stretched film. The results are set forth in Tables 4 and 5. In Tables 4 and 5, the word "total angle sum" denotes a total of increments of α (alpha) 7 and α (alpha) 8 incremented respectively from those of the Comparative Example (α (alpha) 7=6 degrees and α (alpha) 8=3 degrees). Herein, parenthesis notations put down with α (alpha) 7 and α (alpha) 8 denote the respective increments from α alpha) 7 and α (alpha) 8 of the Comparative Example. An angle "α (alpha) 10" is formed between the area B center line and the area C center line and equals to "180 degrees−(α (alpha) 7+α (alpha) 8)." The word "pattern" denotes a pattern such as the "A-A pattern" defined in this specification.

Table 5 sorts Table 4 by pattern, thus being substantially the same in content as Table 4.

Experiment 1-2 was to reproduce a film characteristic of Experiment 1-1 (A-A pattern) by the pattern (B-B pattern) of Comparative Example. Similarly, Experiment 1-12 was to reproduce a film characteristic of Experiment 1-3 (A-B pattern) by the pattern (B-B pattern) of Comparative Example. These Experiments intended to compare a furnace width to be required.

As shown in Table 4, the total angle sum at 1 degree or more gave an excellent film characteristic.

By comparison of the results of Experiment 1-1 (A-A pattern) and Experiment 1-2 (B-B pattern), Experiment 1-1 required a smaller furnace width. That showed that employment of the A-A pattern allows a smaller size of a stretching machine in order to produce a film having the same characteristic.

Further, by comparison of the results of Experiment 1-3 (A-B pattern) and Experiment 1-12 (B-B pattern), Experiment 1-3 required a smaller furnace width. That showed that the employment of the A-B pattern allowed a smaller size of a stretching machine in order to produce a film having the same characteristic.

As described, Table 5 sorts Table 4 by pattern. The film characteristic of each film was evaluated by values of the Re and θ (theta) r and the results of evaluation were organized by pattern.

In a case of the A-A pattern, an excellent film characteristic was obtained at α (alpha) 10 of 163 degrees or less or at "α (alpha) 7+α (alpha) 8" of 17 degrees or more.

In a case of the A-B pattern, an excellent film characteristic was obtained at α (alpha) 10 of 167 degrees or less or at "α (alpha) 7+α (alpha) 8" of 13 degrees or more.

In a case of the A-C pattern, an excellent film characteristic was obtained at α (alpha) 10 of 170 degrees or less or at "α (alpha) 7+α (alpha) 8" of 10 degrees or more.

In a case of the B-A pattern, an excellent film characteristic was obtained at α (alpha) 10 of 167 degrees or less or at "α (alpha) 7+α (alpha) 8" of 13 degrees or more.

In a case of the C-A pattern, an excellent film characteristic was obtained at α (alpha) 10 of 170 degrees or less or at "α (alpha) 7+α (alpha) 8" of 10 degrees or more.

TABLE 4

| | | | First step | | | | Second step | | | |
|---|---|---|---|---|---|---|---|---|---|---|
| Experiment | Pattern | Width in entry (mm) | Stretching ratio (%) | α (alpha) 3 (Degrees) | α (alpha) 4 (Degrees) | Area B center line inclination angle α (alpha) 7 (Degrees) | Shrinkage ratio (%) | α (alpha) 5 (Degrees) | α (alpha) 6 (Degrees) | Area C center line inclination angle α (alpha) 8 (Degrees) |
| Comparative Example | B-B | 840 | 50 | 78 | 90 | 6 | 25 | 84 | 90 | 3 |
| 1-1 | A-A | 840 | 50 | 74 | 86 | 10(+4) | 25 | 80 | 86 | 7(+4) |
| 1-2 | B-B | 840 | 83 | 78 | 90 | 6 | 58 | 84 | 90 | 3 |
| 1-3 | A-B | 840 | 50 | 74 | 86 | 10(+4) | 25 | 84 | 90 | 3(0) |
| 1-4 | A-C | 840 | 50 | 74 | 86 | 10(+4) | 25 | 85 | 91 | 2(−1) |
| 1-5 | A-C | 840 | 50 | 76 | 88 | 8(+2) | 25 | 85 | 91 | 2(−1) |
| 1-6 | A-C | 840 | 50 | 76 | 88 | 8(+2) | 25 | 89 | 95 | −2(−5) |
| 1-7 | A-C | 840 | 50 | 73 | 85 | 11(+5) | 25 | 88 | 94 | −1(−4) |
| 1-8 | A-C | 840 | 50 | 74 | 86 | 10(+4) | 25 | 87 | 93 | 0(−3) |
| 1-9 | A-C | 840 | 50 | 75 | 87 | 9(+3) | 25 | 86 | 92 | 1(−2) |
| 1-10 | A-C | 840 | 50 | 76 | 88 | 8(+2) | 25 | 85 | 91 | 2(−1) |
| 1-11 | A-C | 840 | 50 | 77 | 89 | 7(+1) | 25 | 86 | 92 | 1(−2) |
| 1-12 | B-B | 840 | 72 | 78 | 90 | 6 | 48 | 84 | 90 | 3 |
| 1-13 | B-A | 840 | 50 | 78 | 90 | 6(0) | 25 | 80 | 86 | 7(44) |
| 1-14 | C-A | 840 | 50 | 79 | 91 | 5(−1) | 25 | 80 | 86 | 7(44) |
| 1-15 | C-A | 840 | 50 | 79 | 91 | 5(−1) | 25 | 82 | 88 | 5(+2) |

TABLE 4-continued

| | | | Film characteristic after stretching | | | | |
|---|---|---|---|---|---|---|---|
| Experiment | | Total angle sum (Degrees) | α (alpha) 10 (Degrees) | Re (nm) | θ (theta) r (Degrees) | Nz coefficient (—) | Furnace width required (mm) |
| Comparative Example | | 0 | 171 | 140 | 33 | 1.4 | — |
| 1-1 | | +8 | 163 | 145 | 37 | 1.3 | 1400 |
| 1-2 | | 0 | 171 | 145 | 37 | 1.3 | 1540 |
| 1-3 | | +4 | 167 | 143 | 36 | 1.3 | 1400 |
| 1-4 | | +3 | 168 | 142 | 35 | 1.3 | — |
| 1-5 | | +1 | 170 | 141 | 34 | 1.4 | — |
| 1-6 | | −3 | 174 | 137 | 31 | 1.4 | — |
| 1-7 | | +1 | 170 | 141 | 36 | 1.3 | — |
| 1-8 | | +1 | 170 | 141 | 35 | 1.3 | — |
| 1-9 | | +1 | 170 | 141 | 34 | 1.4 | — |
| 1-10 | | +1 | 170 | 141 | 34 | 1.4 | — |
| 1-11 | | −1 | 172 | 139 | 33 | 1.4 | — |
| 1-12 | | 0 | 171 | 143 | 35 | 1.3 | 1447 |
| 1-13 | | +4 | 167 | 143 | 35 | 1.3 | — |
| 1-14 | | +3 | 168 | 142 | 34 | 1.4 | — |
| 1-15 | | +1 | 170 | 141 | 33 | 1.4 | — |

TABLE 5

| | | First step | | | | | Second step | | | |
|---|---|---|---|---|---|---|---|---|---|---|
| Experiment | Pattern | Width in entry (mm) | Stretching ratio (%) | α (alpha) 3 (Degrees) | α (alpha) 4 (Degrees) | Area B center line inclination angle α (alpha) 7 (Degrees) | Shrinkage ratio (%) | α (alpha) 5 (Degrees) | α (alpha) 6 (Degrees) | Area C center line inclination angle α (alpha) 8 (Degrees) |
| Comparative Example | B-B | 840 | 50 | 78 | 90 | 6 | 25 | 84 | 90 | 3 |
| 1-1 | A-A | 840 | 50 | 74 | 86 | 10(+4) | 25 | 80 | 86 | 7(+4) |
| 1-3 | A-B | 840 | 50 | 74 | 86 | 10(+4) | 25 | 84 | 90 | 3(0) |
| 1-4 | A-C | 840 | 50 | 74 | 86 | 10(+4) | 25 | 85 | 91 | 2(−1) |
| 1-5 | A-C | 840 | 50 | 76 | 88 | 8(+2) | 25 | 85 | 91 | 2(−1) |
| 1-6 | A-C | 840 | 50 | 76 | 88 | 8(+2) | 25 | 89 | 95 | −2(−5) |
| 1-7 | A-C | 840 | 50 | 73 | 85 | 11(+5) | 25 | 88 | 94 | −1(−4) |
| 1-8 | A-C | 840 | 50 | 74 | 86 | 10(+4) | 25 | 87 | 93 | 0(−3) |
| 1-9 | A-C | 840 | 50 | 75 | 87 | 9(+3) | 25 | 86 | 92 | 1(−2) |
| 1-10 | A-C | 840 | 50 | 76 | 88 | 8(+2) | 25 | 85 | 91 | 2(−1) |
| 1-11 | A-C | 840 | 50 | 77 | 89 | 7(+1) | 25 | 86 | 92 | 1(−2) |
| 1-13 | B-A | 840 | 50 | 78 | 90 | 6(0) | 25 | 80 | 86 | 7(+4) |
| 1-2 | B-B | 840 | 83 | 78 | 90 | 6 | 58 | 84 | 90 | 3 |
| 1-12 | B-B | 840 | 72 | 78 | 90 | 6 | 48 | 84 | 90 | 3 |
| 1-14 | C-A | 840 | 50 | 79 | 91 | 5(−1) | 25 | 80 | 86 | 7(+4) |
| 1-15 | C-A | 840 | 50 | 79 | 91 | 5(−1) | 25 | 82 | 88 | 5(+2) |

| | | | Film characteristic after stretching | | | | |
|---|---|---|---|---|---|---|---|
| Experiment | | Total angle sum (Degrees) | α (alpha) 10 (Degrees) | Re (ma) | θ (theta) r (Degrees) | Nz coefficient (—) | Furnace width required (mm) |
| Comparative Example | | 0 | 171 | 140 | 33 | 1.4 | — |
| 1-1 | | +8 | 163 | 145 | 37 | 1.3 | 1400 |
| 1-3 | | +4 | 167 | 143 | 36 | 1.3 | 1400 |
| 1-4 | | +3 | 168 | 142 | 35 | 1.3 | — |
| 1-5 | | +1 | 170 | 141 | 34 | 1.4 | — |
| 1-6 | | −3 | 174 | 137 | 31 | 1.4 | — |
| 1-7 | | +1 | 170 | 141 | 36 | 1.3 | — |
| 1-8 | | +1 | 170 | 141 | 35 | 1.3 | — |
| 1-9 | | +1 | 170 | 141 | 34 | 1.4 | — |
| 1-10 | | +1 | 170 | 141 | 34 | 1.4 | — |
| 1-11 | | −1 | 172 | 139 | 33 | 1.4 | — |
| 1-13 | | +4 | 167 | 143 | 35 | 1.3 | — |
| 1-2 | | 0 | 171 | 145 | 37 | 1.3 | 1540 |
| 1-12 | | 0 | 171 | 143 | 35 | 1.3 | 1447 |

TABLE 5-continued

| | | | | | | |
|---|---|---|---|---|---|---|
| 1-14 | +3 | 168 | 142 | 34 | 1.4 | — |
| 1-15 | +1 | 170 | 141 | 33 | 1.4 | — |

(Experiment 2)

Experiment 2 used a stretched film produced by the B-B pattern and under the condition of "α (alpha) 7=8 degrees and α (alpha) 8=3 degrees" as a standard (Comparative Example). Each of the stretched films was evaluated by comparing with this stretched film. The results are set forth in Tables 6 and 7. The words "total angle sum," "α (alpha) 10," and "pattern" in Tables 6 and 7 denote the same as those in Tables 4 and 5. Table 7 sorts Table 6 by pattern, thus being substantially the same as Table 6.

Experiment 2-2 was to reproduce a film characteristic of Experiment 2-1 (A-A pattern) by the pattern (B-B pattern) of Comparative Example. This Experiment intended to compare a furnace width to be required.

As shown in Table 6, the total angle sum at 1 degree or more gave an excellent film characteristic.

By comparison of the results of Experiment 2-1 (A-A pattern) and Experiment 2-2 (B-B pattern), Experiment 2-1 required a smaller furnace width. That showed that the employment of the A-A pattern allowed a smaller size of a stretching machine in order to produce a film having the same characteristic.

As described, Table 7 sorts Table 6 by pattern. The film characteristic of each film was evaluated by values of the Re and θ (theta) r and the results of evaluation were organized by pattern.

In a case of the A-A pattern, an excellent film characteristic was obtained at α (alpha) 10 of 161 degrees or less or at "α (alpha) 7+α (alpha) 8" of 19 degrees or more.

In a case of the A-B pattern, an excellent film characteristic was obtained at α (alpha) 10 of 165 degrees or less or at "α (alpha) 7+α8" of 15 degrees or more.

In a case of the A-C pattern, an excellent film characteristic was obtained at α (alpha) 10 of 168 degrees or less or at "α (alpha) 7+α (alpha) 8" of 12 degrees or more.

In a case of the B-A pattern, an excellent film characteristic was obtained at α (alpha) 10 of 165 degrees or less or at "α (alpha) 7+α (alpha) 8" of 15 degrees or more.

In a case of the C-A pattern, an excellent film characteristic was obtained at α (alpha) 10 of 167 degrees or less or at "α (alpha) 7+α (alpha) 8" of 13 degrees or more.

TABLE 6

| | | | | First step | | | Second step | | | |
|---|---|---|---|---|---|---|---|---|---|---|
| Experiment | Pattern | Width in entry (mm) | Stretching ratio (%) | α (alpha) 3 (Degrees) | α (alpha) 4 (Degrees) | Area B center line inclination angle α (alpha) 7 (Degress) | Shrinkage ratio (%) | α (alpha) 5 (Degrees) | α (alpha) 6 (Degrees) | Area C center line inclination angle α (alpha) 8 (Degrees) |
| Comparative Example | B-B | 840 | 67 | 74 | 90 | 8 | 25 | 84 | 90 | 3 |
| 2-1 | A-A | 840 | 67 | 70 | 86 | 12(+4) | 25 | 80 | 86 | 7(+4) |
| 2-2 | B-B | 840 | 100 | 74 | 90 | 8 | 59 | 84 | 90 | 3 |
| 2-3 | A-B | 840 | 67 | 70 | 86 | 12(+4) | 25 | 84 | 90 | 3(0) |
| 2-4 | A-C | 840 | 67 | 69 | 85 | 13(+5) | 25 | 88 | 94 | −1(−4) |
| 2-5 | A-C | 840 | 67 | 70 | 86 | 12(+4) | 25 | 87 | 93 | 0(−3) |
| 2-6 | A-C | 840 | 67 | 71 | 87 | 11(+3) | 25 | 86 | 92 | 1(−2) |
| 2-7 | A-C | 840 | 67 | 72 | 88 | 10(+2) | 25 | 85 | 91 | 2(−1) |
| 2-8 | B-A | 840 | 67 | 74 | 90 | 8(0) | 25 | 80 | 86 | 7(+4) |
| 2-9 | C-A | 840 | 67 | 75 | 91 | 7(−1) | 25 | 81 | 87 | 6(+3) |
| 2-10 | C-A | 840 | 67 | 76 | 92 | 6(−2) | 25 | 80 | 86 | 7(+4) |

| | | | Film characteristic after stretching | | | |
|---|---|---|---|---|---|---|
| Experiment | Total angle sum (Degrees) | α (alpha) 10 (Degrees) | Re (nm) | θ (theta) r (Degrees) | Nz coefficient (—) | Furnace width required (mm) |
| Comparative Example | 0 | 169 | 236 | 31 | 1.4 | — |
| 2-1 | +8 | 161 | 243 | 37 | 1.3 | 1540 |
| 2-2 | 0 | 169 | 243 | 37 | 1.3 | 1680 |
| 2-3 | +4 | 165 | 239 | 36 | 1.3 | — |
| 2-4 | +1 | 168 | 236 | 35 | 1.3 | — |
| 2-5 | +1 | 168 | 236 | 35 | 1.3 | — |
| 2-6 | +1 | 168 | 236 | 34 | 1.4 | — |
| 2-7 | +1 | 168 | 236 | 33 | 1.4 | — |
| 2-8 | +4 | 165 | 239 | 33 | 1.4 | — |
| 2-9 | +2 | 167 | 237 | 32 | 1.4 | — |
| 2-10 | +2 | 167 | 237 | 31 | 1.4 | — |

TABLE 7

| | | | First step | | | | Second step | | | |
|---|---|---|---|---|---|---|---|---|---|---|
| Experiment | Pattern | Width in entry (mm) | Stretching ratio (%) | α (alpha) 3 (Degrees) | α (alpha) 4 (Degrees) | Area B center line inclination angle α (alpha) 7 (Degrees) | Shrinkage ratio (%) | α (alpha) 5 (Degrees) | α (alpha) 6 (Degrees) | Area C center line inclination angle α (alpha) 8 (Degrees) |
| Comparative Example | B-B | 840 | 67 | 74 | 90 | 8 | 25 | 84 | 90 | 3 |
| 2-1 | A-A | 840 | 67 | 70 | 86 | 12(+4) | 25 | 80 | 86 | 7(+4) |
| 2-3 | A-B | 840 | 67 | 70 | 86 | 12(+4) | 25 | 84 | 90 | 3(0) |
| 2-4 | A-C | 840 | 67 | 69 | 85 | 13(+5) | 25 | 88 | 94 | −1(−4) |
| 2-5 | A-C | 840 | 67 | 70 | 86 | 12(+4) | 25 | 87 | 93 | 0(−3) |
| 2-6 | A-C | 840 | 67 | 71 | 87 | 11(+3) | 25 | 86 | 92 | 1(−2) |
| 2-7 | A-C | 840 | 67 | 72 | 88 | 10(+2) | 25 | 85 | 91 | 2(−1) |
| 2-8 | B-A | 840 | 67 | 74 | 90 | 8(0) | 25 | 80 | 86 | 7(+4) |
| 2-2 | B-B | 840 | 100 | 74 | 90 | 8 | 59 | 84 | 90 | 3 |
| 2-9 | C-A | 840 | 67 | 75 | 91 | 7(−1) | 25 | 81 | 87 | 6(+3) |
| 2-10 | C-A | 840 | 67 | 76 | 92 | 6(−2) | 25 | 80 | 86 | 7(+4) |

| | | Film characteristic after stretching | | | | |
|---|---|---|---|---|---|---|
| Experiment | Total angle sum (Degrees) | α (alpha) 10 (Degrees) | Re (nm) | θ (theta) r (Degrees) | Nz coefficient (—) | Furnace width required (mm) |
| Comparative Example | 0 | 169 | 236 | 31 | 1.4 | — |
| 2-1 | +8 | 161 | 243 | 37 | 1.3 | 1540 |
| 2-3 | +4 | 165 | 239 | 36 | 1.3 | — |
| 2-4 | +1 | 168 | 236 | 35 | 1.3 | — |
| 2-5 | +1 | 168 | 236 | 35 | 1.3 | — |
| 2-6 | +1 | 168 | 236 | 34 | 1.4 | — |
| 2-7 | +1 | 168 | 236 | 33 | 1.4 | — |
| 2-8 | +4 | 165 | 239 | 33 | 1.4 | — |
| 2-2 | 0 | 169 | 243 | 37 | 1.3 | 1680 |
| 2-9 | +2 | 167 | 237 | 32 | 1.4 | — |
| 2-10 | +2 | 167 | 237 | 31 | 1.4 | — |

(Experiment 3)

Experiment 3 used a stretched film produced by the B-B pattern and under the condition of "α (alpha) 7=10 degrees and α (alpha) 8=2 degrees" as a standard (Comparative Example). Each of the stretched films was evaluated by comparing with this stretched film. The results are set forth in Tables 8 and 9. The words "total angle sum," "α (alpha) 10," and "pattern" in Tables 8 and 9 denote the same as those in Tables 4 and 5. Table 9 sorts Table 8 by pattern, thus being substantially the same as Table 8.

Experiment 3-2 was to reproduce a film characteristic of Experiment 3-1 (A-A pattern) by the pattern (B-B pattern) of Comparative Example. This Experiment intended to compare a furnace width to be required.

As shown in Table 8, the total angle sum at 1 degree or more gave an excellent film characteristic.

By comparison of the results of Experiment 3-1 (A-A pattern) and Experiment 3-2 (B-B pattern), Experiment 3-1 required a smaller furnace width. That showed that the employment of the A-A pattern allowed a smaller size of a stretching machine in order to produce a film having the same characteristic.

As described, Table 9 sorts Table 8 by pattern. The film characteristic of each film was evaluated by values of the Re and θ (theta) r and the results of evaluation were organized by pattern.

In a case of the A-A pattern, an excellent film characteristic was obtained at α (alpha) 10 of 160 degrees or less or at "α (alpha) 7+α (alpha) 8" of 20 degrees or more.

In a case of the A-B pattern, an excellent film characteristic was obtained at α (alpha) 10 of 164 degrees or less or at "α (alpha) 7+α (alpha) 8" of 16 degrees or more.

In a case of the A-C pattern, an excellent film characteristic was obtained at α (alpha) 10 of 167 degrees or less or at "α (alpha) 7+α (alpha) 8" of 13 degrees or more.

In a case of the B-A pattern, an excellent film characteristic was obtained at α (alpha) 10 of 164 degrees or less or at "α (alpha) 7+α (alpha) 8" of 16 degrees or more.

In a case of the C-A pattern, an excellent film characteristic was obtained at α (alpha) 10 of 167 degrees or less or at "α (alpha) 7+α (alpha) 8" of 13 degrees or more.

TABLE 8

| Experiment | Pattern | Width in entry (mm) | First step | | | | Second step | | | |
|---|---|---|---|---|---|---|---|---|---|---|
| | | | Stretching ratio (%) | α (alpha) 3 (Degrees) | α (alpha) 4 (Degrees) | Area B center line inclination angle α (alpha) 7 (Degrees) | Shrinkage ratio (%) | α (alpha) 5 (Degrees) | α (alpha) 6 (Degrees) | Area C center line inclination angle α (alpha) 8 (Degrees) |
| Comparative Example | B-B | 840 | 83 | 70 | 90 | 10 | 17 | 86 | 90 | 2 |
| 3-1 | A-A | 840 | 83 | 66 | 86 | 14(+4) | 17 | 82 | 86 | 6(+4) |
| 3-2 | B-B | 840 | 117 | 70 | 90 | 10 | 51 | 86 | 90 | 2 |
| 3-3 | A-B | 840 | 83 | 66 | 86 | 14(+4) | 17 | 86 | 90 | 2(0) |
| 3-4 | A-B | 840 | 83 | 65 | 85 | 15(+5) | 17 | 90 | 94 | −2(−4) |
| 3-5 | A-C | 840 | 83 | 66 | 86 | 14(+4) | 17 | 89 | 93 | −1(−3) |
| 3-6 | A-C | 840 | 83 | 67 | 87 | 13(+3) | 17 | 88 | 92 | 0(−2) |
| 3-7 | A-C | 840 | 83 | 68 | 88 | 12(+2) | 17 | 87 | 91 | 1(−1) |
| 3-8 | B-A | 840 | 83 | 70 | 90 | 10(0) | 17 | 82 | 86 | 6(+4) |
| 3-9 | C-A | 840 | 83 | 71 | 91 | 9(−1) | 17 | 83 | 87 | 5(+3) |
| 3-10 | C-A | 840 | 83 | 71 | 91 | 9(−1) | 17 | 84 | 88 | 4(+2) |

| Experiment | Film characteristic after stretching | | | | | |
|---|---|---|---|---|---|---|
| | Total angle sum (Degrees) | α (alpha) 10 (Degrees) | Re (nm) | θ (theta) r (Degrees) | Nz coefficient (—) | Furnace width required (mm) |
| Comparative Example | 0 | 168 | 376 | 30 | 1.5 | — |
| 3-1 | +8 | 160 | 381 | 35 | 1.3 | 1680 |
| 3-2 | 0 | 168 | 381 | 35 | 1.3 | 1825 |
| 3-3 | +4 | 164 | 378 | 34 | 1.4 | — |
| 3-4 | +1 | 167 | 377 | 34 | 1.4 | — |
| 3-5 | +1 | 167 | 377 | 33 | 1.4 | — |
| 3-6 | +1 | 167 | 377 | 33 | 1.4 | — |
| 3-7 | +1 | 167 | 377 | 32 | 1.4 | — |
| 3-8 | +4 | 164 | 378 | 31 | 1.4 | — |
| 3-9 | +2 | 166 | 377 | 30 | 1.5 | — |
| 3-10 | +1 | 167 | 377 | 30 | 1.5 | — |

TABLE 9

| Experiment | Pattern | Width in entry (mm) | First step | | | | Second step | | | |
|---|---|---|---|---|---|---|---|---|---|---|
| | | | Stretching ratio (%) | α (alpha) 3 (Degrees) | α (alpha) 4 (Degrees) | Area B center line inclination angle α (alpha) 7 (Degrees) | Shrinkage ratio (%) | α (alpha) 5 (Degrees) | α (alpha) 6 (Degrees) | Area C center line inclination angle α (alpha) 8 (Degrees) |
| Comparative Example | B-B | 840 | 83 | 70 | 90 | 10 | 17 | 86 | 90 | 2 |
| 3-1 | A-A | 840 | 83 | 66 | 86 | 14(+4) | 17 | 82 | 86 | 6(+4) |
| 3-3 | A-B | 840 | 83 | 66 | 86 | 14(+4) | 17 | 86 | 90 | 2(0) |
| 3-4 | A-B | 840 | 83 | 65 | 85 | 15(+5) | 17 | 90 | 94 | −2(−4) |
| 3-5 | A-C | 840 | 83 | 66 | 86 | 14(+4) | 17 | 89 | 93 | −1(−3) |
| 3-6 | A-C | 840 | 83 | 67 | 87 | 13(+3) | 17 | 88 | 92 | 0(−2) |
| 3-7 | A-C | 840 | 83 | 68 | 88 | 12(+2) | 17 | 87 | 91 | 1(−1) |
| 3-8 | B-A | 840 | 83 | 70 | 90 | 10(0) | 17 | 82 | 86 | 6(+4) |
| 3-2 | B-B | 840 | 117 | 70 | 90 | 10 | 51 | 86 | 90 | 2 |
| 3-9 | C-A | 840 | 83 | 71 | 91 | 9(−1) | 17 | 83 | 87 | 5(+3) |
| 3-10 | C-A | 840 | 83 | 71 | 91 | 9(−1) | 17 | 84 | 88 | 4(+2) |

| Experiment | Film characteristic after stretching | | | | | |
|---|---|---|---|---|---|---|
| | Total angle sum (Degrees) | α (alpha) 10 (Degrees) | Re (nm) | θ (theta) r (Degrees) | Nz coefficient (—) | Furnace width required (mm) |
| Comparative Example | 0 | 168 | 376 | 30 | 1.5 | — |
| 3-1 | +8 | 160 | 381 | 35 | 1.3 | 1680 |
| 3-3 | +4 | 164 | 378 | 34 | 1.4 | — |
| 3-4 | +1 | 167 | 377 | 34 | 1.4 | — |

TABLE 9-continued

| | | | | | | |
|---|---|---|---|---|---|---|
| 3-5 | +1 | 167 | 377 | 33 | 1.4 | — |
| 3-6 | +1 | 167 | 377 | 33 | 1.4 | — |
| 3-7 | +1 | 167 | 377 | 32 | 1.4 | — |
| 3-8 | +4 | 164 | 378 | 31 | 1.4 | — |
| 3-2 | 0 | 168 | 381 | 35 | 1.3 | 1825 |
| 3-9 | +2 | 166 | 377 | 30 | 1.5 | — |
| 3-10 | +1 | 167 | 377 | 30 | 1.5 | — |

Figure 14:
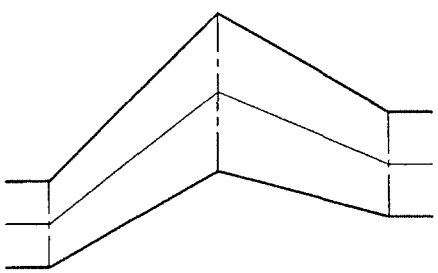
FIG. 14 is an explanatory view summarizing results of Example 5 by pattern.
Figure 14:
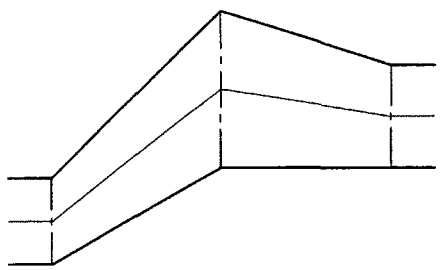
Figure 14:
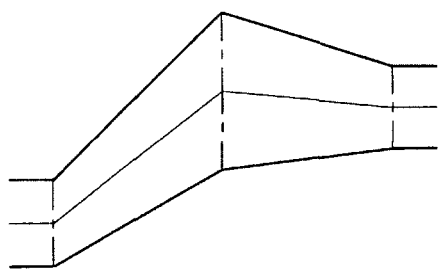

FIGS. 14 and 15 summarily show explanatory views of all the patterns and the above-mentioned favorable upper limits of α (alpha) 10.

Now, a relationship between each pattern and α (alpha) 3 to α (alpha) 6 in FIG. 1 will be described below.

The A-A pattern typically has angles including "α (alpha) 3<90 degrees, α (alpha) 4<90 degrees, α (alpha) 5<90 degrees, and α (alpha) 6<90 degrees."

The A-B pattern typically has angles including "α (alpha) 3<90 degrees, α (alpha) 4<90 degrees, α (alpha) 5<90 degrees, and α (alpha) 6=90 degrees."

The A-C pattern typically has angles including "α (alpha) 3<90 degrees, α (alpha) 4<90 degrees, α (alpha) 5<90 degrees, and α (alpha) 6>90 degrees."

The B-A pattern typically has angles including "α (alpha) 3<90 degrees, α (alpha) 4=90 degrees, α (alpha) 5<90 degrees, and α (alpha) 6<90 degrees."

The C-A pattern typically has angles including "α (alpha) 3<90 degrees, α (alpha) 4>90 degrees, α (alpha) 5<90 degrees, and α (alpha) 6<90 degrees."

This is the end of the description of Examples of this invention and Comparative Example thereof.

Incidentally, the above-mentioned second embodiment illustrates the example in which the polymer film f is longitudinally stretched after the stretching and the thermal shrinkage of the polymer film f performed in the first embodiment. However, another thermal shrinkage of the polymer film f after the stretching and the thermal shrinkage increases the inclination angle of the orientation axis.

Specifically, after preliminary stretching of the long film by each of the above-mentioned embodiments, the film is shrunk with heat, so as to have an increased inclination angle of the orientation axis. This technique will be described in detail below.

This technique is characterized in that a preliminarily stretched film, which is a long film having the inclination angle of the orientation axis at 5 degrees or more and less than 20 degrees by the preliminary stretching, is held at its both side edges in a width direction and gradually reduced in holding distance of the both side edges while being heated so as to be shrunk.

This technique includes a step of preliminary stretching to incline an orientation axis at a gentler angle before inclining the orientation axis at a target angle by the thermal shrinkage.

That shares burden on the polymer film when the orientation axis is changed. Consequently, it is possible to incline the orientation axis at an angle larger than that inclined by a rapid inclination of an orientation axis of a polymer film at one time. Additionally, it is possible to easily uniform the produced stretched film in quality because the polymer film intergrades in property.

This technique thermally shrinks a polymer film, thereby rendering the inclination angle of the orientation axis steep. This idea will be described below.

Figure 16A:
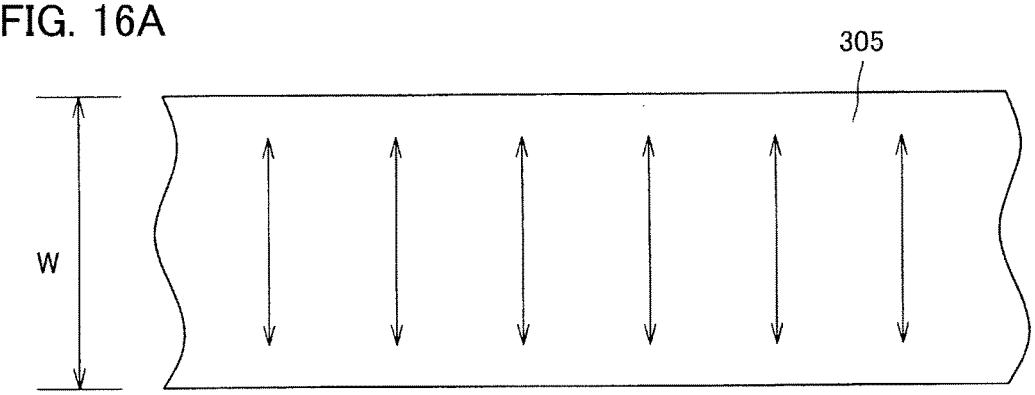
FIGS. 16A and 16B are explanatory views showing changes of an orientation axis when a polymer film having been uniaxially stretched in a width direction is shrunk, FIG. 16A showing the polymer film before shrinking and FIG. 16B showing the polymer film after shrinking.
Figure 16B:
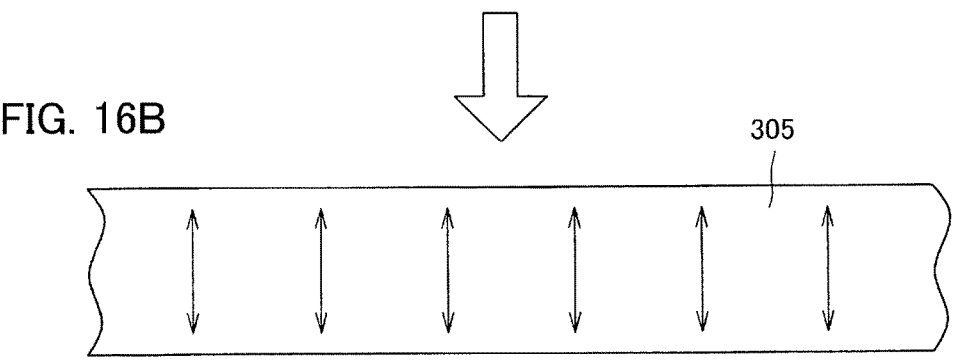

Referring to FIGS. 16A and 16B, for example, on the assumption that a film 305 stretched in the width direction and with no inclination angle of its orientation axis (arrows) is used to be shrunk at its width W as from FIG. 16A to FIG. 16B, the inclination angle of the molecular orientation axis has no change.

Figure 17A:
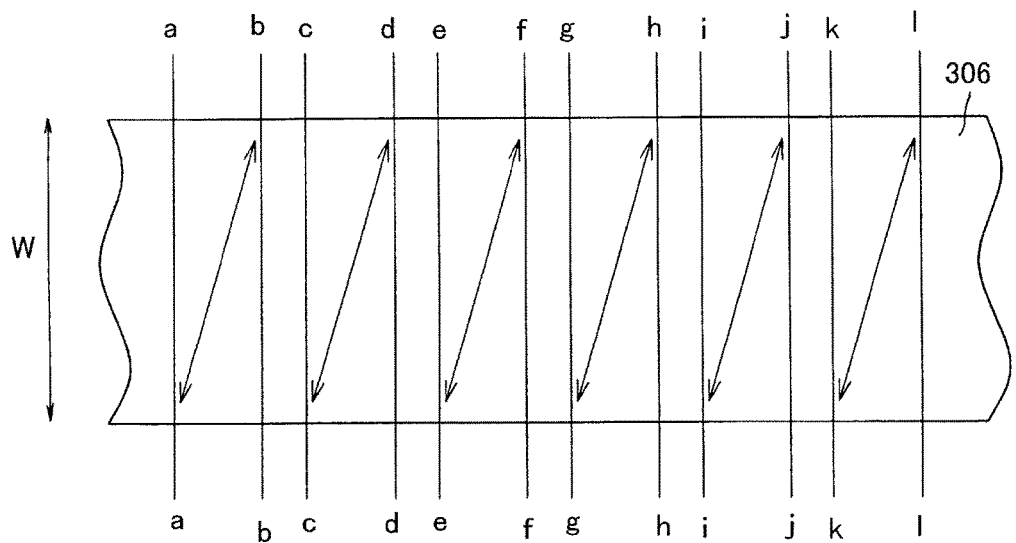
FIGS. 17A and 17B are explanatory views showing changes of an orientation axis when a polymer film having been stretched in a direction inclined to a width direction is shrunk, FIG. 17A showing the polymer film before shrinking and FIG. 17B showing the polymer film after shrinking.
Figure 17B:
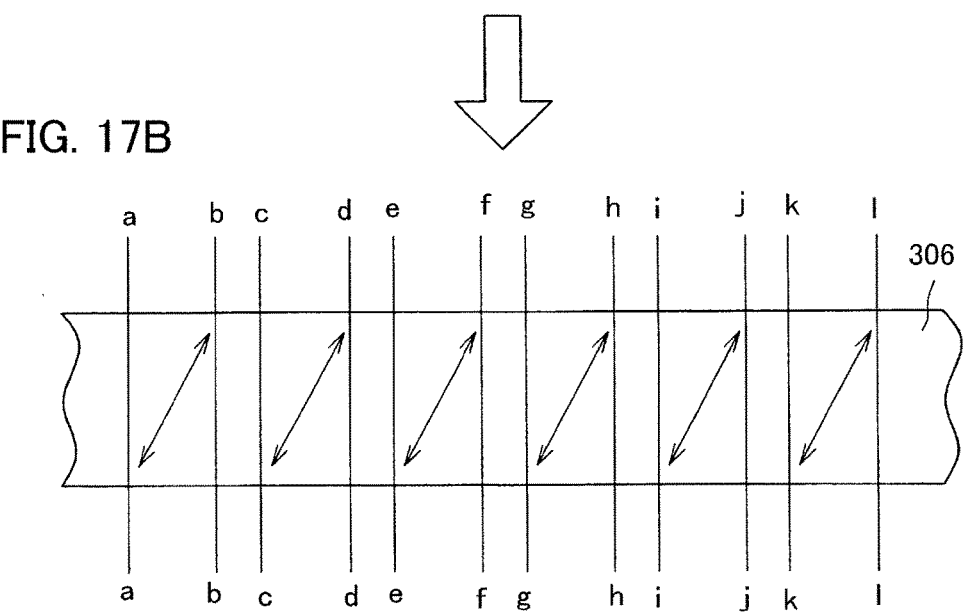

However, referring to FIGS. 17A and 17B, on the assumption that a film 306 stretched in the width direction and with the orientation axis (arrows) slightly inclined is used to be shrunk at a width W of the film 306 as from FIG. 17A to FIG. 17B, the inclination angle of the orientation axis becomes steep.

Specifically, the film 306 originally has a direction of inclination shown as arrows a-b, c-d, e-f, and so on in FIG. 17A.

When the width W of the film 306 is shrunk with held at points a, b, c, d, and so on in FIG. 17A, the points a, b, c, d, and so on in FIG. 17A are not shifted in location in the longitudinal direction, which makes the orientation axis be inclined to a direction further inclined to the horizontal as shown in FIG. 17B, and whereby the inclination angle is made steep.

Hence, while the preliminarily stretched film, which is stretched preliminarily at a small inclination angle, held at its both side edges in the width direction is thermally shrunk, the holding distance of the both side edged are narrowed. That makes the inclination angle of the orientation axis be steeply inclined. Adjustment of the holding distance of the both side edges of the film gives the stretched film having the orientation axis inclined at a desired inclination angle.

This technique is characterized in continuously performing a step of forming a preliminarily stretched film by stretching a long film at the inclination angle of its orientation axis of 5 degrees or more and less than 20 degrees with respect to the width direction and a step of narrowing the holding distance of the both side edges while the resulting preliminarily stretched film is heated so as to be thermally shrunk.

This technique performs thermal shrinkage immediately after formation of the preliminarily stretched film. That reduces time required for production of a stretched film, thereby ensuring more efficient production.

It is preferable to move the both side edges of the preliminarily stretched film equally relative to the center line in the width direction when the holding distance of the both side edges is gradually narrowed with thermal shrinkage.

This technique performs thermal shrinkage equally relative to the center line in the width direction, thereby reducing characteristic variation in the width direction of the stretched film.

Further, in this technique, it is recommended to incline the molecular orientation axis of the preliminarily stretched film at 20 degrees or more and less than 70 degrees by thermal shrinkage by heating the preliminarily stretched film.

This technique produces a stretched film having the molecular orientation axis greatly inclined with respect to the width direction.

In stretching of a polymer film by this technique, it is desired to perform thermal shrinkage by heating the preliminarily stretched film with a tenter stretching machine being adjustable in width. In other words, a tenter stretching machine being adjustable in width can be used so as to suitably perform this technique.

A film stretched by this technique is desired to have an inclination angle of its orientation axis with respect to the width direction of the stretched film at 20 degrees or more and less than 70 degrees.

It is desired for a stretched film produced by this technique that a refractive index nx in an in-plane slow axis direction of the retardation film, a refractive index ny in a direction perpendicular to the in-plane slow axis, and a refractive index nz in a thickness direction thereof satisfy a following formula (1):

$$0.5 \le (nx-nz)/(nx-ny) \le 2.5 \qquad (1).$$

The stretched film of this technique is produced by the above-mentioned methods. Therefore, it is possible to provide a stretched film having an orientation axis greatly inclined with respect to the width direction and/or a stretched film being excellent in optical properties.

Beside, a retardation plate including at least one stretched film produced herein is also useful. The stretched film produced by this technique can be used as a retardation plate by being laminated.

This technique has such an advantageous effect that an inclination angle of an orientation axis is changed without excessive burden on a polymer film. Therefore, there is such an advantageous effect that the inclination angle of the orientation axis can be enlarged. Additionally, there is such an advantageous effect as facilitating quality equalization of the produced stretched film.

Now, a brief summary of this technique will be described in detail below, with exemplifying a method for producing a stretched film mainly relating to an eleventh embodiment, a first specific example, and a second specific example.

The method for producing a stretched film relating to the eleventh embodiment and the specific examples 1 and 2 is a method of stretching a long polymer film f to a direction inclined with respect to a conveying direction of the polymer film f while the polymer film supplied continuously in basically is conveyed with pinched (held). The method includes three steps below mentioned as characteristic steps:
(1) a step of inclining the orientation axis at an angle (at 5 degrees or more and less than 20 degrees) gentler than a target inclination angle (20 degrees or more and less than 70 degrees, and 45 degrees, for example), hereinafter referred to as a preliminary stretching step;
(2) a step of temporarily taking up the stretched film (preliminarily stretched film) with its orientation axis gently inclined through the preliminary stretching step, hereinafter referred to as a temporary take-up step; and
(3) a step of shrinking the taken-up stretched film by heating so as to adjust an angle, hereinafter referred to as an angle adjusting step.

Now, a method for producing a stretched film of the eleventh embodiment of the present invention will be described in detail below.

Figure 18:
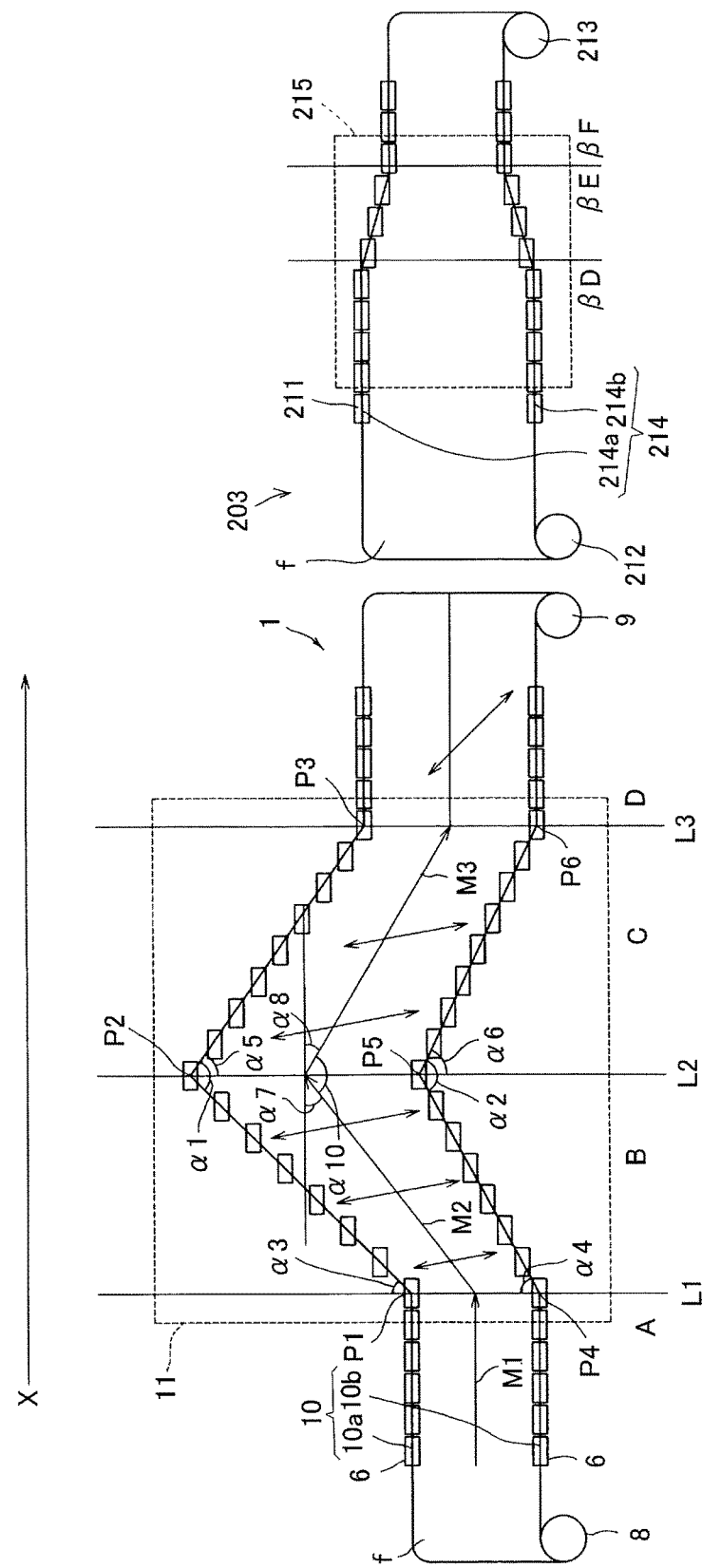
FIG. 18 is a plan view of an example of a film stretching machine usable in an eleventh embodiment of the present invention.

The method for producing a stretched film of the eleventh embodiment of the present invention is, as shown in FIG. 18, performed with a tenter stretching machine 1 corresponding to the first embodiment and a thermal shrinkage machine 203 for angle adjustment described in detail below.

Specifically, a polymer film f is stretched and then shrunk by the tenter stretching machine 1. At this moment, the polymer film f after shrinkage is stretched with respect to the polymer film f before stretching (the polymer film attached to the tenter stretching machine 1 and not stretched nor shrunk). The polymer film f having been stretched and shrunk by the tenter stretching machine 1 has an orientation axis inclined with respect to the width direction of the polymer film f at an angle (5 degrees or more and less than 20 degrees) gentler than a target inclination angle (20 degrees or more and less than 70 degrees, and 45 degrees, for example) of its orientation axis. This is the end of the preliminary stretching step by the tenter stretching machine 1.

Next, upon stretching and shrinkage by the tenter stretching machine 1, the polymer film f is temporarily taken up (temporary take-up step), so as to be attached to the thermal shrinkage machine 203 for angle adjustment.

Then, the polymer film f having undergone the preliminary stretching step by the tenter stretching machine 1 is thermally shrunk by the thermal shrinkage machine 203. The angle adjusting step by the thermal shrinkage machine 203 will be described in detail below. This is the end of production of the stretched film.

Now, the first specific example of the above-mentioned technique will be described below, with making reference to FIG. 19.

Figure 19:
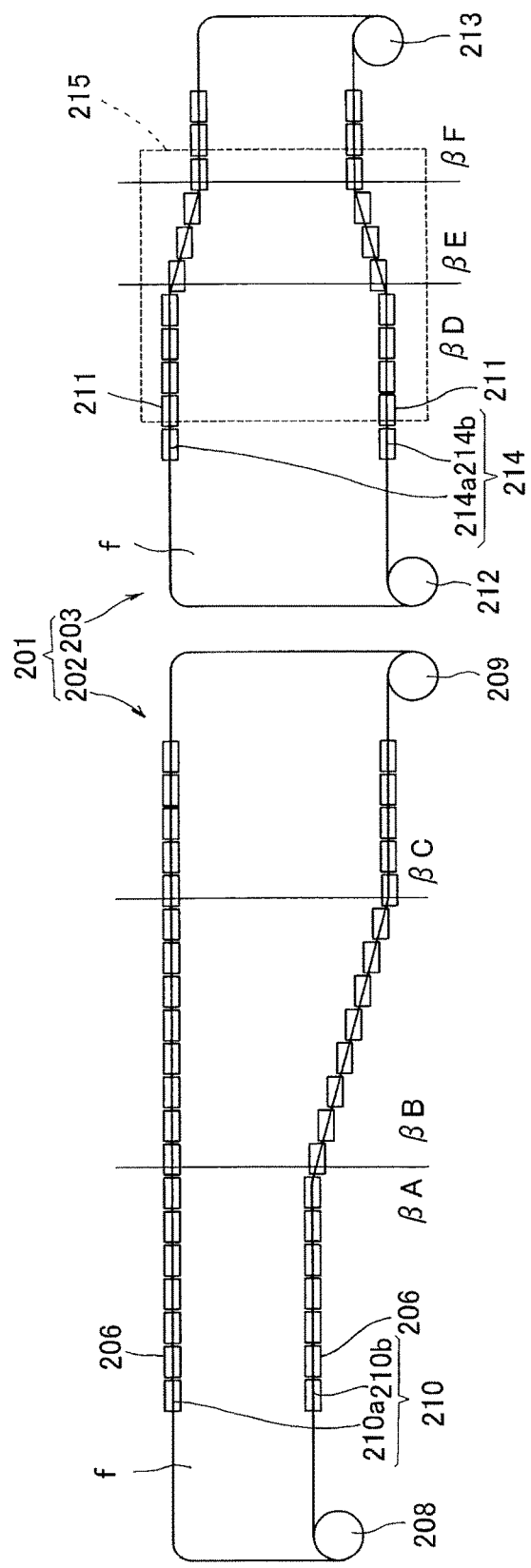
FIG. 19 is a plan view of an example of a film stretching machine usable in a first specific example of a technique relating to the present invention.

A stretched film production equipment 201 shown in FIG. 19 roughly consists of a stretching machine 202 for preliminary stretching and a thermal shrinkage machine 203 for angle adjustment.

The stretching machine 202 for the preliminary stretching of this specific example may use a well-known stretching machine or the like. Herein, the stretching machine 202 used in this specific example employs one having a shorter distance difference from a starting point to a releasing point of holding of the both side edges and a smaller stretching angle of the film than those of the well-known stretching machine.

Specifically, the stretching machine 202 includes at least pinching members 206, a supply roller 208, a take-up roller 209, and a pair of rails 210. A polymer film f attached to the supply roller 208 is pulled out, traveled toward the take-up roller 209 with the both side edges of the polymer film f pinched by the pinching members 206, released just behind the take-up roller 209, and taken up by the take-up roller 209.

Herein, the pinching members 206 run on the pair of rails 210 integrally with chains not shown while pinching the both side edges of the polymer film f pulled out from the supply roller 208. The pair of rails 210 consists of a pair of a rail 210a and a rail 210b, on which the respective pinching members 206 run.

A path on which one of the pinching members 206 pinching one side edge runs is longer than a path on which the other of the pinching members 206 pinching the other side edge. Specifically, the rail 210b takes a path deviating relative to the rail 210a. Herein, the pinching members 206 run on the rails at substantially the same speed at both sides.

More specifically, the stretching machine 202 is, as shown in FIG. 19, divided into three continuous areas βA, βB, and βC from the supply roller 208 to the take-up roller 209. The width between the rails 210 is different in areas.

The area βA has an equal width between the rails 210a and 210b, while the area βB has the deviating rail (rail 210b) at the one side, and while the area βC has again an equal width between the rails. Though the area βA and the area βC each have the same width between the rails, the width between the rails 210 in the area βC is longer than that in the area βA.

Alternatively, the stretching machine 202 may be provided with a heating furnace, and in this case, the heating furnace is preferably arranged over the area βA and the area βB.

The thermal shrinkage machine 203 for angle adjustment includes at least pinching members 211, a supply roller 212, a take-up roller 213, a pair of rails 214, and a heating furnace 215. The polymer film f attached to the supply roller 212 is pulled out, traveled toward the take-up roller 213 with the both side edges of the polymer film f pinched by the pinching members 211, and taken up by the take-up roller 213.

Herein, the pinching members 211 run on the pair of rails 214 with pinching the both side edges of the polymer film f pulled out from the supply roller 212. Herein, the pair of rails 214 consists of a pair of a rail 214a and a rail 214b, on which the respective pinching members 211 run.

The pinching members 211 at the both side edges of the polymer film f move in a direction approaching each other as approaching the take-up roller 213, so as to have a reduced width therebetween. In other words, the width between the rail 214a and the rail 214b is narrowed from the supply roller 212 to the take-up roller 213.

More specifically, the thermal shrinkage machine 203 is divided into three continuous areas βD, βE, and βF from the supply roller 212 to the take-up roller 213. The width between the rails is different in area. The area βD has an equal width between the rails 214. Meanwhile, the area βE has a width between the rails being narrowed with the rail 214a and the rail 214b each gradually inclined to a center in the width direction along the traveling direction. Meanwhile, the area βF has again an equal width between the rails 214.

Though the area βD and the area βF each have the same width between the rails 214, the width between the rails 214 in the area βF is narrower than that in the area βD. Additionally, the rails 214 at the both sides in the area βE each are inclined to the center in the width direction and have the same starting point and ending point of inclination relative to the traveling direction and the same angle inclined with respect to the traveling direction. Hence, the rails 214 are arranged symmetrically in the width direction along the traveling direction.

The heating furnace 215 is disposed over the areas βD to βF, thereby heating the polymer film f by hot air.

Now, an example of producing a stretched film using the above-mentioned stretched film production equipment 201 will be described below.

First, a long polymer film f is attached to the supply roller 208, to form in a roll. Then, the polymer film f travels in the area βA toward the take-up roller 209 using a conveyor such as a roller not shown.

As traveling toward the take-up roller 209 for a certain distance, the polymer film f is pinched by the pinching members 206 at its both side edges in the width direction and continues to travel toward the take-up roller 209.

Then, as the polymer film f enters the area βB, the "preliminary stretching step" is started. Specifically, one of the pinching members 206 pinching one side edge moves in a direction away from the other of the pinching members 206 pinching the other side edge. More specifically, the one of the pinching members 206 runs straight toward the take-up roller 209, whereas the other of the pinching members 206 runs toward the take-up roller 209 with expanding the width of the polymer film f. In other words, the one of the pinching members 206 runs in an oblique direction relative to the traveling direction.

That makes a stretching direction of the polymer film f having been stretched in a direction perpendicular to the traveling direction be inclined with respect to that direction, so that the polymer film f has a gentle inclination angle of its orientation axis. Specifically, the orientation axis of the polymer film f is made inclined with respect to the width direction at an angle (5 degrees or more and less than 20 degrees) gentler than a target inclination angle (20 degrees or more and less than 70 degrees, and 45 degrees, for example) of the orientation axis.

Further, the increased width between the pinching members 206 placed opposite to each other in the area βA (where the polymer film f has the equal width) as traveling increases a force to stretch the polymer film f. The increased force to stretch the polymer film f increases the Re (retardation). This is the end of the "preliminary stretching step."

In this specific example, the inclination angle of the orientation axis is made gentler than the target inclination angle of the orientation axis by "the preliminary stretching step" in the area βB. Thereafter, the inclination angle of the orientation axis is made to be at the target inclination angle of the orientation axis by the "angle adjusting step" described below. The provision of the step of making the orientation axis be at a tentative angle gentler than the target angle before the orientation axis is inclined at the target inclination angle in this way allows the inclination angle of the orientation axis to be inclined without rapid inclination of the orientation axis of the polymer film f, compared to a stretching method of making the orientation axis to be inclined at a target inclination angle at one time. That has the advantage of causing less problem such as tightening (streaky lacking in uniformity resulting from uneven stretching stress), wrinkles, or lopsided film (regional uneven thickness).

Lastly, the polymer film f enters the area βC, travels toward the take-up roller 209 with no change in width, and is taken up by the take-up roller 209. This is the end of the "temporary taking-up step."

Next, the polymer film f having undergone the preliminary stretching step (having been taken up by the take-up roller 209) is attached to the supply roller 212 of the thermal shrinkage machine 203 for angle adjustment.

Then, the polymer film f travels in the βD area toward the take-up roller 213 using a conveyor such as a roller not shown.

As traveling toward the take-up roller 213 for a certain distance, the polymer film f is pinched by the pinching members 211 at its both side edges in the width direction and continues to travel toward the take-up roller 213.

Then, as the polymer film f enters the area βE, the pinching members 206 pinching the both side edges move in a direction approaching each other. At this time, the polymer film f is thermally shrunk by heating treatment. Specifically, the thermal shrinkage of the polymer film f by heating by the heating furnace 215 and the narrowed width of the polymer film f toward the center in the width direction from its both sides according to shrinkage of the thermal shrinkage adjust an angle of the orientation axis of the polymer film f.

This is the end of the "angle adjusting step."

At the end, the polymer film f enters the area βF. In the area βF, the polymer film f travels toward the take-up roller 213 with no change in width and is taken up by the take-up roller 213. Every process to incline the orientation axis of the polymer film f ends with that, which finishes production of the stretched film. The taken-up stretched film is sent to a next process (such as a cutout process, for example).

The above-mentioned specific example performs the preliminary stretching (stretching to orient the polymer film in a direction slightly inclined with respect to the width direction in advance) using the stretching machine 202 for preliminary stretching, but the method and the stretching machine for performing the preliminary stretching are not limited thereto. The method and the stretching machine used in the preliminary stretching are not particularly limited only if the orientation axis is made inclined at 5 degrees or more with respect to the width direction of the film and employ a well-known method and stretching machine.

Herein, in a case where the inclination angle of the orientation axis of a film before thermal shrinkage is at less than 5 degrees, a substantial shrinkage in the width direction is required for adjusting the inclination angle of the orientation axis within a range from 20 to 70 degrees, resulting in a higher rate of loosening or wrinkles of the film after shrinkage. That is not preferable in this specific example.

Now, a second specific example of the above-mentioned technique will be described below. A method for producing a stretched film of the second specific example is designed to continuously perform the "preliminary stretching step" and the "angle adjusting step" performed in the first specific example.

As to the second specific example, an example of producing a stretched film using a stretching machine 221 in FIG. 20 will be described below. However, naturally, it is not indispensable to use the stretching machine 221 in FIG. 20 in the above-mentioned technique.

Figure 20:
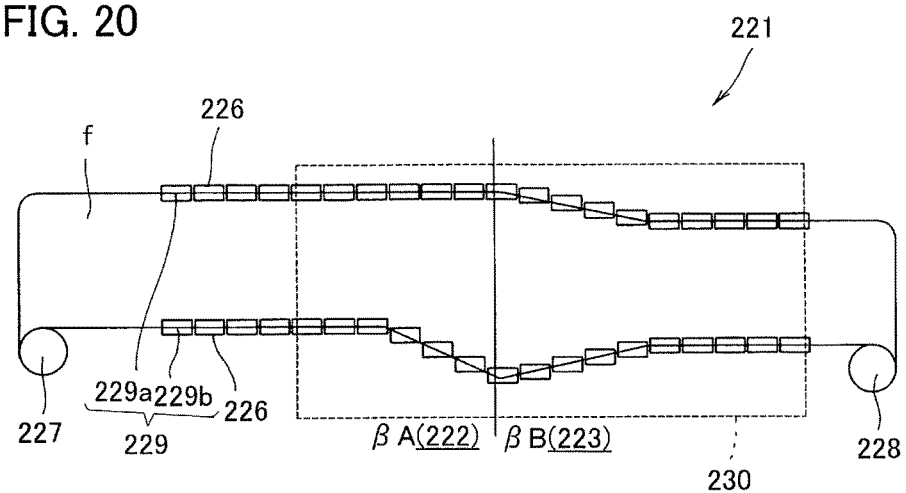
FIG. 20 is a plan view of an example of a film stretching machine usable in a second specific example of a technique relating to the present invention.

The stretching machine 221 in FIG. 20 includes at least pinching members 226, a supply roller 227, a take-up roller 228, rails 229, and a heating furnace 230. A polymer film f attached to the supply roller 227 is pulled out, traveled toward the take-up roller 228 with the both side edges of the polymer film f pinched by the pinching members 226, released at an outlet of the heating furnace 230, and taken up by the take-up roller 228.

Herein, the pinching members 226 run on the rails 229 integrally with chains not shown with pinching the both side edges of the polymer film f pulled out from the supply roller 227, thus rendering the both side edges to run at the same speed. Herein, the rails 229 consist of a pair of a rail 229a and a rail 229b, on which the respective pinching members 226 run. The pinching members 226 pinching the both side edges of the polymer film f have paths different at a first half part and a last half part of the stretching machine 221.

Specifically, the stretching machine 221 is roughly divided in a preliminary stretching area 222 (area βA in FIG. 20) at the first half part and a thermal shrinkage area 223 (area βB in FIG. 20) at the last half part.

First, in the preliminary stretching area 222, the rails 229a and 229b, on which the pinching members 226 run, travel from the supply roller 227 to the take-up roller 228 at equal width therebetween. Then, the rail 229a at one side edge travels straight, whereas the rail 229b at the other side edge travels in a direction away from the rail 229a traveling straight and a direction from the supply roller 227 toward the take-up roller 228. In sum, only the rail 229b at the one side edge obliquely travels with respect to the traveling direction.

Next, in the thermal shrinkage area 223, the rails 229a and 229b, on which the pinching members 226 run, gradually inclines to the center in the width direction from the both side edges, so as to have a narrowed width therebetween. In other words, the rails 229a and 229b at the both side edge gently inclines to a direction approaching each other along the traveling direction of the polymer film f. The rails 229 travel toward the take-up roller 228 with maintaining the equal narrowed width.

Herein, a part from a starting point (where the rails 229a and 229b start to incline to a direction approaching each other) of the thermal shrinkage area 223 to an ending point where the rails finish inclining to the width direction, or a part where the rails 229a and 229b incline is sufficiently long in the traveling direction.

The heating furnace 230 is provided in the thermal shrinkage area 223, thereby heating the polymer film f by hot air.

Now, an example of producing a stretched film using the above-mentioned stretching machine 221 will be described below.

First, a long polymer film f is attached to the supply roller 227, to form in a roll. Then, the polymer film f travels in the preliminary stretching area 222 toward the take-up roller 228 using a conveyor such as a roller not shown.

As traveling toward the take-up roller 228 for a certain distance, the polymer film f is pinched by the pinching members 226 at its both side edges in the width direction and continues to travel toward the take-up roller 228.

Then, as the polymer film f with its both side edges pinched by the pinching members 226 travels toward the take-up roller 228 for a certain distance, one of the pinching members 226 pinching one side edge moves in a direction away from the other of the pinching members 226 pinching the other side edge.

That makes a stretching direction of the polymer film f having been stretched in a direction perpendicular to the traveling direction be inclined with respect to that direction, so that the orientation axis of the polymer film f inclines at a gentle angle (5 degrees or more and less than 20 degrees) with respect to the width direction.

Further, the one of the pinching members 226 pinching the one side edge and having firstly traveled at an equal width in a width direction of the polymer film f runs obliquely (moves in a direction away from the other of the pinching members 226 pinching the other side edge), so that a force to stretch the polymer film f is increased. That increases the Re (retardation). This is the end of the "preliminary stretching step."

Then, the polymer film f travels in the thermal shrinkage area 223. The thermal shrinkage area 223 is designed to perform the "angle adjusting step" after the preliminary stretching.

The thermal shrinkage area 223 performs thermal shrinkage for angle adjustment on the polymer film f having been stretched (having undergone the preliminary stretching) in a direction inclined with respect to the traveling direction in the preliminary stretching area 222. That orients the polymer film f at a target inclination angle (20 degrees or more and less than 70 degrees with respect to the width direction, and 45 degrees, for example) of its orientation axis.

Specifically, the polymer film f is heated by the heating furnace 230, so as to be thermally shrunk. At this time, the pinching members 226 pinching the both side edges are moved to a direction approaching each other, so as to narrow a width of the polymer film f toward the center in the width direction from its both sides according to shrinkage of the thermal shrinkage. That adjusts an angle so as to make the orientation axis of the polymer film f be at a target inclination angle (20 degrees or more and less than 70 degrees, and 45 degrees, for example) of the orientation axis.

When the orientation axis of the polymer film f is made to be at the target inclination angle, the pinching members 226 pinching the both side edges stop moving to the direction approaching each other. The pinching members 226 run toward the take-up roller 228 with maintaining the equal width in the width direction of the polymer film f.

Then, the pinching members 226 release the polymer film f just before the take-up roller 228. The released polymer film f is taken up by the take-up roller 228. The process to incline the orientation axis of the polymer film f ends with that, which finishes production of the stretched film. The taken-up stretched film is sent to a next process (such as a cutout process, for example).

Herein, in a case of continuous performance of the "preliminary stretching step" and the "angle adjusting step" as in the second specific example, it is necessary to confirm in advance whether the inclination angle of the orientation axis is made to be at a predetermined angle by the "preliminary stretching step". Since there is no step to temporarily detach the polymer film f after the "preliminary stretching step" unlike in the first specific example, it is necessary to produce the stretched film after confirming whether a predetermined inclination angle of the orientation axis is obtained by the "preliminary stretching step" in a test run of the stretching machine or the like.

Figure 21:
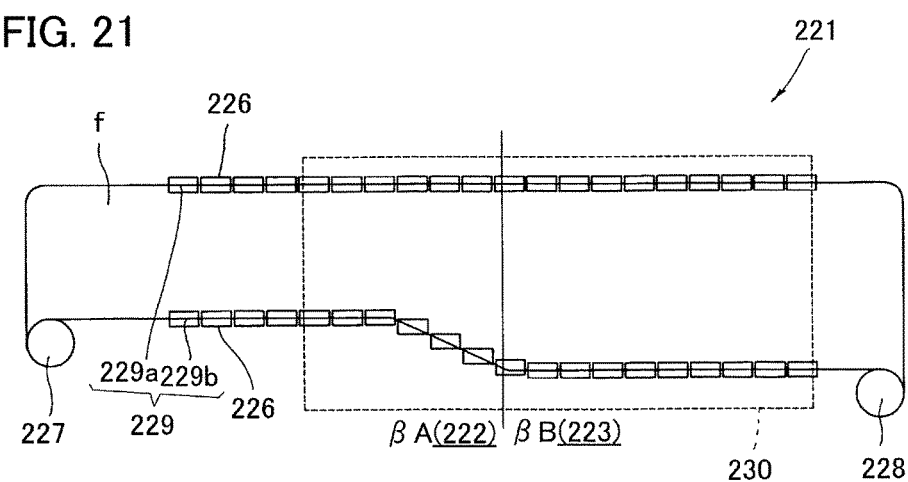
FIG. 21 is a plan view of an example of the film stretching machine in FIG. 20 under trial run.

A way to confirm the inclination angle of the orientation axis obtained by the "preliminary stretching step" includes the use of a tenter stretching machine that can change the width between the rails. Specifically, the stretching machine 221 in FIG. 20 is modified to one in FIG. 21 in a trial run. The rails 229 of the stretching machine 221 are made at equal width therebetween in the thermal shrinkage area 223. Thereafter, the stretching machine 221 conducts a trial run so as to perform only the "preliminary stretching step" on the polymer film f until the polymer film f is conveyed outside the stretching machine 221. The measurement of the inclination angle of the orientation axis allows confirmation of that of the film obtained by the "preliminary stretching step".

Having been confirmed that the "preliminary stretching step" gives the predetermined inclination angle of the orientation axis, the rails 229a and 229b are gradually inclined to the center in the width direction from the both side edges in a front part of the thermal shrinkage area 223. In sum, the stretching machine 221 is modified to the same state in FIG. 20. Then, production of the stretched film of the above-mentioned second specific example is performed. This way allows production of the stretched film after confirmation of the angle of the film obtained by the "preliminary stretching step."

The way also includes the temporary stop of the stretching machine. Specifically, the stretching machine 221 in FIG. 20 is temporarily stopped. The polymer film f is cut out in the front part of the thermal shrinkage area 223 (near the preliminary stretching area 222), so that the inclination angle of its orientation axis is confirmed.

In the "preliminary stretching step" of the above-mentioned first and second specific examples, the volatile fraction of a film is preferably less than 5% (percent) and more preferably less than 3% (percent).

Figure 22:
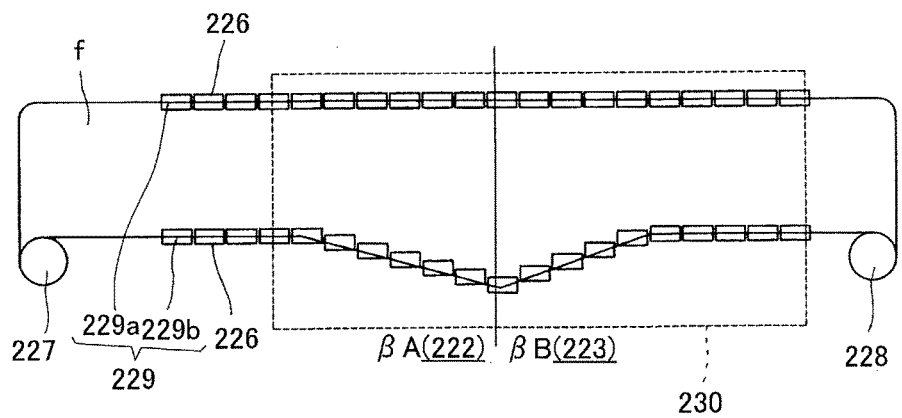
FIG. 22 is a plan view of an example of a film stretching machine usable in a method for producing a retardation film that is different from the above-mentioned embodiments.

In the second specific example, the both side edges of the polymer film f are equally shrunk in the width direction in the "angle adjusting step," but the method of shrinkage is not limited thereto only if the holding distance of the both side edges are decreased. As shown in FIG. 22, for example, the shrinkage is performed only from one side edge. However, in view of less characteristic variation in the width direction of the polymer film f, it is preferable to equally shrink the both side edges.

Further, in the above-mentioned first and second specific examples, the angle adjustment by the thermal shrinkage ("angle adjusting step") is performed by regulating conditions such as a shrinkage ratio, a temperature change, and a time for shrinkage in shrinking in the width direction. Consequently, they are appropriately modified depending on the target inclination angle of the orientation axis and the like.

However, the stretching in the longitudinal direction of the polymer film (longitudinal stretching) in the thermal shrinkage in the width direction may express a high biaxiality in the stretched film to be produced. Therefore, it is preferable not to perform the longitudinal stretching.

The first and second specific examples of the above-mentioned technique will be described specifically below with reference to Examples and Comparative Examples, but the Examples do not limit this technique.

Herein, measuring methods of various kinds of physical properties and optical properties employed in the examples are as follows.

(1) Measurement of Re (Retardation), Nz Coefficient, and Inclination Angle of Orientation Axis The measurements of those were conducted with a retardation film inspection system RETS produced by Otsuka Electronics Co., Ltd. at a measured wavelength of 590 nm and at 5 cm intervals in a width direction. The Nz coefficient was measured at an inclination angle of 45 degrees. The Re, the Nz coefficient, and the inclination angle of the orientation axis were shown by using respective average values.

Nz=(nx−nz)/(nx−ny) (when "nx" indicates a refractive index in a slow axis direction of a retardation film, in which the slow axis direction means a direction having the largest refractive index in a retardation film plane, "ny" indicates a refractive index in a fast axis direction thereof, and "nz indicates a refractive index in a thickness direction thereof).

(2) Thickness

The thickness in the width direction was measured at 1 mm intervals with a thickness tester of contacting type KG601A produced by Anritsu Corp. The thickness was shown by using an average of obtained values.

[Example 1 of the Above-mentioned Technique]

A polycarbonate film ("ELMECH R-film unstretched" produced by Kaneka Corporation) was introduced into a stretching machine corresponding to the stretching machine 202 for preliminary stretching in FIG. 19, so as to obtain a polycarbonate film having a Re (retardation) of 570 nm measured at a wavelength of 590 nm, an orientation axis inclined at 6 degrees with respect to the width direction, a thickness of 40 μm, and a width of 1000 mm. The resulting polycarbonate film was introduced into a tenter stretching machine corresponding to the thermal shrinkage machine 203 for angle adjustment in FIG. 19. The film was heated at 160 degrees centigrade and equally decreased in width between the pinching members in the width direction, so as to undergo shrinkage by 40% (percent) in the width direction, and whereby a stretched film was obtained. Then, the retardation film inspection system RETS produced by Otsuka Electronics Co., Ltd. was used so as to measure characteristics of the resulting stretched film. The result had a Re (retardation) of 69 to 71 nm measured at a wavelength of 590 nm, the inclination angle of the orientation axis with respect to the width direction at 44 to 46 degrees, and the formula (nx−nz)/(nx−ny) of 1.0 to 1.1 when "nx" indicates a refractive index in an in-plane slow axis direction, "ny" indicates a refractive index in a direction perpendicular to in-plane slow axis, and "nz indicates a refractive index in a thickness direction.

[Example 2 of the Above-mentioned Technique]

A polycarbonate film having the orientation axis inclined at 6 degrees with respect to the width direction was heated at 160 degrees centigrade and equally decreased in width between the pinching members in the width direction, so as to undergo shrinkage by 35% (percent) in the width direction, and whereby a stretched film was obtained. In sum, the stretched film was obtained by a method corresponding to Example 1 of the above-mentioned technique except that the shrinkage ratio was made at 35%. The result of measurement of characteristics of the resulting stretched film had a Re (retardation) of 119 to 122 nm measured at a wavelength of 590 nm, the inclination angle of the orientation axis with respect to the width direction at 26 to 29 degrees, and the formula (nx−nz)/(nx−ny) of 1.4 to 1.5 when "nx" indicates a refractive index in an in-plane slow axis direction, "ny" indicates a refractive index in a direction perpendicular to in-plane slow axis, and "nz indicates a refractive index in a thickness direction.

[Example 3 of the Above-mentioned Technique]

A polycarbonate film having the orientation axis inclined at 6 degrees with respect to the width direction was heated at 160 degrees centigrade and decreased in width between the pinching members in the width direction by shifting only one side edge toward the center, so as to undergo shrinkage by 40% (percent) in the width direction, and whereby a stretched film was obtained. In sum, the stretched film was obtained by a method corresponding to Example 1 of the above-mentioned technique except that the width between the pinching members in the width direction is decreased by shifting only one side edge toward the center so that. The result of measurement of characteristics of the resulting stretched film had a Re (retardation) of 67 to 74 nm measured at a wavelength of 590 nm, the inclination angle of the orientation axis with respect to the width direction at 42 to 47 degrees, and the formula (nx−nz)/(nx−ny) of 0.9 to 1.1 when "nx" indicates a refractive index in an in-plane slow axis direction, "ny" indicates a refractive index in a direction perpendicular to in-plane slow axis, and "nz indicates a refractive index in a thickness direction.

[Comparative Example 1 to Examples of the Above-mentioned Technique]

A stretched film was obtained by a method corresponding to Example 1 of the above-mentioned technique except that the shrinkage ratio was made at 0% (percent). The result of measurement of characteristics of the resulting stretched film had a Re (retardation) of 540 to 550 nm measured at a wavelength of 590 nm, the inclination angle of the orientation axis with respect to the width direction at 6 degrees, and the formula (nx−nz)/(nx−ny) of 1.5 when "nx" indicates a refractive index in an in-plane slow axis direction, "ny" indicates a refractive index in a direction perpendicular to in-plane slow axis, and "nz indicates a refractive index in a thickness direction.

[Comparative Example 2 to Examples of the Above-mentioned Technique]

A stretched film was obtained by a method corresponding to Example 1 of the above-mentioned technique except that the used polycarbonate film had the orientation axis not inclined with respect to the width direction, or the orientation axis of 0 degree. The result of measurement of characteristics of the resulting stretched film had a Re (retardation) of 88 to 92 nm measured at a wavelength of 590 nm, the inclination angle of the orientation axis with respect to the width direction at 0 to 1 degree, and the formula (nx−nz)/(nx−ny) of 1.1 when "nx" indicates a refractive index in an in-plane slow axis direction, "ny" indicates a refractive index in a direction perpendicular to in-plane slow axis, and "nz indicates a refractive index in a thickness direction.

[Comparative Example 3 to Examples of the Above-mentioned Technique]

Figure 23:
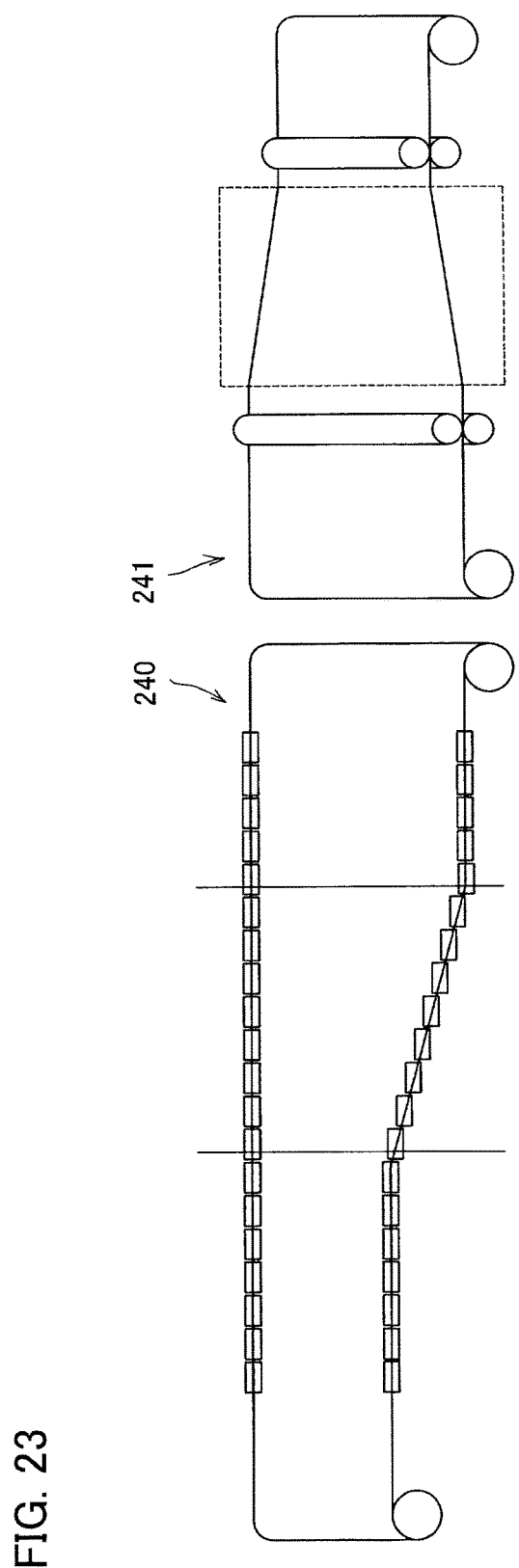
FIG. 23 is a plan view of an example of a film stretching machine usable in Comparative Example 3 of the techniques relating to the present invention.

A stretching machine 240 in FIG. 23 was used to obtain a polycarbonate film having a Re (retardation) of 570 nm measured at a wavelength of 590 nm, an orientation axis inclined at 6 degrees with respect to the width direction, a thickness of 40 μm, and a width of 1000 mm. The resulting polycarbonate film was heated at 150 degrees centigrade and introduced into a longitudinal stretching machine 241 having rollers with different circumferential speeds so as to longitudinally stretch by 5% (percent), thereby obtaining a stretched film. The result of measurement of the resulting stretched film had a Re (retardation) of 57 to 71 nm measured at a wavelength of 590 nm, the inclination angle of the orientation axis with respect to the width direction at 44 to 46 degrees, and the formula (nx−nz)/(nx−ny) of 7.0 to 7.3 when "nx" indicates a refractive index in an in-plane slow axis direction, "ny" indicates a refractive index in a direction perpendicular to in-plane slow axis, and "nz" indicates a refractive index in a thickness direction.

The invention claimed is:

1. A method for producing a stretched film, the method comprising stretching a long film in a desired direction by moving both side edges in a width direction of the long film along respective constant trajectories with the film held at the both side edges in the width direction, the both side edges consisting of a pair of one side edge and the other side edge, wherein the method performs at least once each a first step of stretching the long film by increasing a holding distance in the width direction of the film and a second step of shrinking by heating the long film having been stretched in the first step by decreasing the holding distance, and wherein when the first step is performed several times, the first time the first step is performed is the firstly-performed first step and when the second step is performed several times, the last time the second step is performed is the lastly-performed second step, the one side edge of the long film having a traveling direction with at least three bending travels, the other side edge thereof having a traveling direction with at least two bending travels, both the first step and the second step including a bending travel at either one or both of the side edges, at least one of the first step and the second step including such a traveling trajectory that the both side edges of the long film travel as bending to either the right or the left of the traveling direction, wherein the long film has a center line formed by connecting centers in the width direction of the long film and the center line of the long film in the at least one first step and the center line of the long film in the at least one second step form an angle of 160° to 174°, and the traveling direction of the long film before the firstly-performed first step being a direction angle difference of 0±3 degrees as that after the lastly-performed second step.

2. The method according to claim 1, wherein the long film has a center line formed by connecting centers in the width direction of the long film, the center line of the long film in the first step bending with respect to the center line of the long film before the firstly-performed first step, and the stretched film having undergone the first step and the second step having a width larger than a width of the long film before the firstly-performed first step.

3. A method for producing a stretched film, the method comprising stretching a long film in a desired direction by moving both side edges in a width direction of the long film along respective constant trajectories with the film held at the both side edges in the width direction, the both side edges consisting of a pair of one side edge and the other side edge,
wherein the method performs at least once each a first step of stretching the long film by increasing a holding distance in the width direction of the film and a second step of shrinking by heating the long film having been stretched at the first step by decreasing the holding distance,
the one side edge of the long film having a traveling direction with at least three bending travels,
the other side edge thereof having a traveling direction with at least two bending travels,
both the first step and the second step including a bending travel at either one or both of the side edges,
at least one of the first step and the second step including such a traveling trajectory that the both side edges of the long film travel as bending to either the right or the left of the traveling direction, and
wherein the long film has a center line formed by connecting centers in the width direction of the long film,
the center line of the long film in the firstly-performed first step bending with respect to the center line of the immediately preceding long film,
the stretched film having undergone all the first steps and the second steps having a width larger than a width of the long film before the firstly-performed first step,
the traveling direction of the long film immediately before the firstly-performed first step of all the first steps being a direction angle difference of 0±3 degrees as that of the long film immediately after performing all the first steps and the second steps, and
wherein the center line of the long film in the at least one first step and the center line of the long film in the at least one second stets form an angle of 160° to 174°.

4. The method according to claim 1,
wherein the long film has a center line formed by connecting centers in the width direction of the long film,
the center line of the long film in the second step bending with respect to at least one of the center line of the long film immediately before the firstly-performed first step and a line parallel to the latter center line,
the center line of the long film in the first step bending to either one of the both side edges of the long film immediately before the firstly-performed first step, and
the center line of the long film in the second step bending to the other of the both side edges of the long film immediately before the firstly-performed first step.

5. The method according to claim 1,
performing the bending travels three times at each of the both side edges of the long film,
the bending travels at the one side edge having three starting points located respectively at the same position as or in the vicinity of those at the other side edge relative to a longitudinal direction of the long film.

6. The method according to claim 1,
performing a third step of longitudinal stretching of the long film in the traveling direction after the second step.

7. The method according to claim 1,
performing the first step and the second step while holding the both side edges of the long film by a tenter stretching machine capable of adjusting its width.

8. The method according to claim 1,
wherein the center line of the long film in the at least one first step and the center line of the long film in the at least one second step form an angle of 160° to 170°.

9. The method according to claim 1,
wherein the long film has a center line formed by connecting centers in the width direction of the long film,
the long film having an angle formed by a line parallel to the traveling direction of the long film immediately before the firstly-performed first step and the center line of the long film in the first step larger than an angle formed by the line parallel to the traveling direction of the long film immediately before the firstly-performed first step and the center line of the long film in the second step.

10. The method according to claim 1,
wherein the traveling direction of the long film immediately before the firstly-performed first step is a basic direction,
the first step including a state in which the both side edges of the long film travel as bending to a same first side of the basic direction, and
the second step including a state in which the both side edges of the long film travel as bending to a second side of the basic direction opposite to the first side in the first step.

11. The method according to claim 1,
wherein the traveling direction of the long film immediately before the firstly-performed first step is a basic direction,
the first step including a state in which the both side edges of the long film travel as bending to a same side of the basic direction,
the second step including a state in which the one side edge of the long film travels in parallel to the basic direction and the other side edge of the long film travels as bending toward the one side edge, and
wherein the center line of the long film in the at least one first step and the center line of the long film in the at least one second step form an angle of 160° to 167°.

12. The method according to claim 1,
wherein the traveling direction of the long film immediately before the firstly-performed first step is a basic direction,
the first step including a state in which the both side edges of the long film travel as bending to a same side of the basic direction,
the second step including a state in which the both side edges of the long film bend to sides different from each other with respect to the basic direction and travel to a direction approaching each other, and
wherein the center line of the long film in the at least one first step and the center line of the long film in the at least one second step form an angle of 160° to 170°.

13. The method according to claim 1,
wherein the traveling direction of the long film immediately before the firstly-performed first step is a basic direction, the first step including a state in which the one side edge of the long film travels in parallel to the basic direction and the other side edge of the long film travels as bending in a direction away from the one side edge, the second step including a state in which the both side edges of the long film travel as bending to a same side of the basic direction, and wherein the center line of the long film in the at least one first step and the center line of the long film in the at least one second step form an angle of 160° to 167°.

14. The method according to claim 1,
wherein the traveling direction of the long film immediately before the firstly-performed first step is a basic direction, the first step including a state in which the both side edges of the long film bend to sides different from each other with respect to the basic direction and travel to a direction away from each other, the second step including a state in which the both side edges of the long film travel to a same side of the basic direction, and wherein the center line of the long film in the at least one first step and the center line of the long film in the at least one second step form an angle of 160° to 170°.

15. The method according to claim 1,
the second step being performed immediately after the first step.

16. The method according to claim 1,
including a step of parallel travel after the first step,
wherein the step of parallel travel makes the both side edges of the long film travel in parallel to the traveling direction of the long film immediately before the firstly-performed first step, and the second step being performed after the step of parallel travel.

17. The method according to claim 1,
wherein the both side edges of the long film start the bending travels in the first step at the same position relative to the traveling direction of the long film.

18. The method according to claim 1,
wherein, in the first step, the one side edge of the long film starts the bending travel at a position different from that of the bending travel at the other side edge relative to the traveling direction of the long film.

19. The method according to claim 1,
wherein the both side edges of the long film start the bending travels at the same position relative to the traveling direction of the long film when the method shifts from the first step to the second step.

20. The method according to claim 3,
wherein the long film has a center line formed by connecting centers in the width direction of the long film,
the center line of the long film in the second step bending with respect to at least one of the center line of the long film immediately before the firstly-performed first step and a line parallel to the latter center line, the center line of the long film in the first step bending to either one of the both side edges of the long film immediately before the firstly-performed first step, and the center line of the long film in the second step bending to the other of the both side edges of the long film immediately before the firstly-performed first step.

21. The method according to claim 3,
performing the bending travels three times at each of the both side edges of the long film,
the bending travels at the one side edge having three starting points located respectively at the same position as or in the vicinity of those at the other side edge relative to a longitudinal direction of the long film.

22. The method according to claim 3,
performing a third step of longitudinal stretching of the long film in the traveling direction after the second step.

23. The method according to claim 3,
performing the first step and the second step while holding the both side edges of the long film by a tenter stretching machine capable of adjusting its width.

24. The method according to claim 3,
wherein the center line of the long film in the at least one first step and the center line of the long film in the at least one second step form an angle of 160° to 170°.

25. The method according to claim 3,
wherein the long film has a center line formed by connecting centers in the width direction of the long film,
the long film having an angle formed by a line parallel to the traveling direction of the long film immediately before the firstly-performed first step and the center line of the long film in the first step larger than an angle formed by the line parallel to the traveling direction of the long film immediately before the firstly-performed first step and the center line of the long film in the second step.

26. The method according to claim 3,
wherein the traveling direction of the long film immediately before the firstly-performed first step is a basic direction,
the first step including a state in which the both side edges of the long film travel as bending to a same first side of the basic direction, and
the second step including a state in which the both side edges of the long film travel as bending to a second side of the basic direction opposite to the first side in the first step.

27. The method according to claim 3,
wherein the traveling direction of the long film immediately before the firstly-performed first step is a basic direction,
the first step including a state in which the both side edges of the long film travel as bending to a same side of the basic direction,
the second step including a state in which the one side edge of the long film travels in parallel to the basic direction and the other side edge of the long film travels as bending toward the one side edge, and
wherein the the center line of the long film in the at least one first step and the center line of the long film in the at least one second step form an angle of 160° to 167°.

28. The method according to claim 3,
wherein the traveling direction of the long film immediately before the firstly-performed first step is a basic direction,
the first step including a state in which the both side edges of the long film travel as bending to a same side of the basic direction,
the second step including a state in which the both side edges of the long film bend to sides different from each other with respect to the basic direction and travel to a direction approaching each other, and wherein the center line of the long film in the at least one first step and the center line of the long film in the at least one second step form an angle of 160° to 170°.

29. The method according to claim 3,
wherein the traveling direction of the long film immediately before the firstly-performed first step is a basic direction,
the first step including a state in which the one side edge of the long film travels in parallel to the basic direction and the other side edge of the long film travels as bending in a direction away from the one side edge,
the second step including a state in which the both side edges of the long film travel as bending to a same side of the basic direction, and
wherein the long film has a center line formed by connecting centers in the width direction of the long film,
the long film having an angle formed by the center line of the long film in the at least one first step and the center line of the long film in the at least one second step form an angle of 160° to 167°.

30. The method according to claim 3,
wherein the traveling direction of the long film immediately before the firstly-performed first step is a basic direction,
the first step including a state in which the both side edges of the long film bend to sides different from each other with respect to the basic direction and travel to a direction away from each other,
the second step including a state in which the both side edges of the long film travel to a same side of the basic direction, and
wherein the center line of the long film in at least one first step and the center line of the long film in at least one second step form an angle of 160° to 170°.

31. The method according to claim 3,
the second step being performed immediately after the first step.

32. The method according to claim 3,
including a step of parallel travel after the first step,
wherein the step of parallel travel makes the both side edges of the long film travel in parallel to the traveling direction of the long film immediately before the firstly-performed first step, and
the second step being performed after the step of parallel travel.

33. The method according to claim 3,
wherein the both side edges of the long film start the bending travels in the first step at the same position relative to the traveling direction of the long film.

34. The method according to claim 3,
wherein, in the first step, the one side edge of the long film starts the bending travel at a position different from that of the bending travel at the other side edge relative to the traveling direction of the long film.

35. The method according to claim 3,
wherein the both side edges of the long film start the bending travels at the same position relative to the traveling direction of the long film when the method shifts from the first step to the second step.

* * * * *